(12) United States Patent
Peck-Walden et al.

(10) Patent No.: US 11,411,907 B2
(45) Date of Patent: Aug. 9, 2022

(54) SYSTEMS AND METHODS FOR CONSOLIDATING MULTIPLE FEED DATA

(71) Applicant: Chicago Mercantile Exchange Inc., Chicago, IL (US)

(72) Inventors: Pearce Peck-Walden, Chicago, IL (US); Rosa Frenkel, Chicago, IL (US); Arkadiusz Koziol, Chicago, IL (US); José Antonio Acuña-Rohter, Chicago, IL (US); Fred Malabre, Chicago, IL (US); Melissa Jenner, Chicago, IL (US); Priteshkumar Soni, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 1586 days.

(21) Appl. No.: 15/155,565

(22) Filed: May 16, 2016

(65) Prior Publication Data

US 2017/0331774 A1 Nov. 16, 2017

(51) Int. Cl.
*H04L 51/18* (2022.01)
*G06F 16/00* (2019.01)
(Continued)

(52) U.S. Cl.
CPC .............. *H04L 51/18* (2013.01); *G06F 16/00* (2019.01); *G06Q 40/04* (2013.01); *G06Q 40/06* (2013.01)

(58) Field of Classification Search
CPC ......... H04L 51/18; H04L 67/10; G06F 16/00; G06Q 40/04; G06Q 30/0633; G06Q 40/06

See application file for complete search history.

(56) References Cited

U.S. PATENT DOCUMENTS 7,356,569 B1 * 4/2008 Kembel ................ G06F 3/0484
709/217
7,389,422 B2 6/2008 Banerjee et al.
(Continued)

FOREIGN PATENT DOCUMENTS

EP 1225717 A2 7/2002

OTHER PUBLICATIONS

Extended Search Report, from EP Application No. 13749436.5, dated Sep. 18, 2015.
(Continued)

*Primary Examiner* — Patrice L Winder
*Assistant Examiner* — Aye M Aung
(74) *Attorney, Agent, or Firm* — Lempia Summerfield Katz LLC

(57) ABSTRACT

The disclosed embodiments relate generally to efficient data transmission and receipt. Specifically, the disclosed embodiments provide systems and methods for selectively combining multiple, disparate message types and transmitting same via one data feed. A consolidation system determines whether data resulting from an event can be combined or merged based on pre-determined message characteristics and state or environment information, or should be sent via two separate feeds. The merged message may be backwards-compatible so that data recipient computing systems can easily and selectively decide which portion of the merged data is relevant to the data recipient computing system, only read the relevant portions. Thus, multiple data receivers, which typically consume different message types, can receive and consume the same merged or consolidated message.

20 Claims, 16 Drawing Sheets

(51) Int. Cl.
  *G06Q 40/06* (2012.01)
  *G06Q 40/04* (2012.01)

(56) References Cited

U.S. PATENT DOCUMENTS

| | | | |
|---|---|---|---|
| 7,426,721 B1 | 9/2008 | Saulpaugh et al. | |
| 8,184,805 B2 | 5/2012 | Yokota et al. | |
| 2002/0097878 A1 | 7/2002 | Ito et al. | |
| 2003/0009411 A1* | 1/2003 | Ram | G06F 17/246 |
| | | | 705/37 |
| 2011/0071958 A1 | 3/2011 | Grody et al. | |
| 2012/0221462 A1 | 8/2012 | De Verdier | |
| 2012/0246055 A1 | 9/2012 | Schlifstein et al. | |
| 2012/0250865 A1 | 10/2012 | Terpstra et al. | |
| 2013/0218739 A1* | 8/2013 | Kmiec | G06Q 40/04 |
| | | | 705/37 |
| 2014/0215007 A1* | 7/2014 | Rash | H04L 67/1002 |
| | | | 709/217 |
| 2014/0359036 A1* | 12/2014 | Blake | H04L 51/26 |
| | | | 709/206 |
| 2015/0088720 A1 | 3/2015 | Acuna-Rohter et al. | |
| 2015/0088723 A1 | 3/2015 | Acuna-Rohter et al. | |
| 2017/0244720 A1* | 8/2017 | Kurian | H04L 67/10 |
| 2017/0315735 A1* | 11/2017 | Leggette | G06F 3/0613 |

OTHER PUBLICATIONS

Extended Search Report, from EP Application No. 14186095.7, dated Jan. 29, 2015, EP.
International Preliminary Report on Patentability in PCT/US2013/025665, dated Aug. 19, 2014, 9 pages.
International Search Report and Written Opinion in PCT/US13/25665, dated Mar. 14, 2013, 11 pages.
International Search Report and Written Opinion in PCT/US14/68710, dated Mar. 12, 2015, 7 pages.

* cited by examiner

Consolidated Message — 900

Header — 902 (906 Field | Size | 908 Example Data | Total Size)

| Field | Size | Example Data | Total Size |
|---|---|---|---|
| Message Sequence | 8 | | 24 Bytes |
| Sending Time | 4 | | |
| Message Type | 0 | | |
| Transact Time | 8 | | |
| Event Indicator | 1 | | |
| Number of Entries | 3 | | |

Body — 904

Data relevant to first data feed 910:

| Field | Size | Example Data | Total Size |
|---|---|---|---|
| Value | 8 | 29.45 | 48 Bytes |
| Quantity | 4 | 10 | |
| Security ID | 4 | CLH6 | |
| Sequence number | 4 | 2222 | |
| Number of orders | 4 | 1 | |
| Value level | 1 | 1 | |
| Action | 1 | Add | |
| Side | 1 | B | |

Data relevant to second data feed 912:

| Field | Size | Example Data |
|---|---|---|
| Order Action | 1 | Add |
| Order Quantity | 1 | 10 |
| Order ID | 8 | 123 |
| Priority | 8 | 1234 |
| Unused | 3 | |

| | Consolidated Message with Multi-order Data | | | |
|---|---|---|---|---|
| | Field | Size | Example | Total Size |
| Header | Message Sequence | 6 | | 24 Bytes |
| | Sending Time | 4 | | |
| | Message Type | 0 | | |
| | Transact Time | 8 | | |
| | Event Indicator | 1 | | |
| | Number of Entries | 3 | | |
| Body | Value | 8 | 29.45 | 32 Bytes |
| | Quantity | 4 | 22 | |
| | Security ID | 4 | CLH6 | |
| | Sequence number | 4 | 2222 | |
| | Number of orders | 4 | 2 | |
| | Value level | 1 | 1 | |
| | Side | 1 | B | |
| | Action | 1 | Modify | |
| | | 5 | | |
| | Number of Entries | 8 | 2 | 8 |
| | Order Action | 1 | Modify | 24 Bytes Per Order |
| | Order Quantity | 1 | 10 | |
| | Order ID | 8 | 123 | |
| | Priority | 8 | 1234 | |
| | Reference to Value Entry | 1 | 1 | |
| | - | 5 | | |
| | Order Action | 1 | Add | |
| | Order Quantity | 1 | 12 | |
| | Order ID | 8 | 456 | |
| | Priority | 8 | 1245 | |
| | Reference to Value Entry | 1 | 1 | |
| | - | 5 | | |

Data relevant to a first order 1052

Data relevant to a second order 1054

Fig. 10D

SYSTEMS AND METHODS FOR CONSOLIDATING MULTIPLE FEED DATA

BACKGROUND

Data generators may publish messages of different types via different data feeds. A data recipient computing system may identify and decipher the messages. A data generator and corresponding data recipient computing system are specifically configured to communicate and decipher the transmitted data. Certain data generators publish or transmit related but different data via different message types. Different message types, which are typically published over different (e.g., parallel) data feeds increases infrastructure costs.

BRIEF DESCRIPTION OF THE DRAWINGS

FIG. 9 illustrates an example consolidated message in accordance with the disclosed embodiments.

FIG. 10D depicts another example consolidated message in accordance with the disclosed embodiments.

DETAILED DESCRIPTION

Figure 1A:
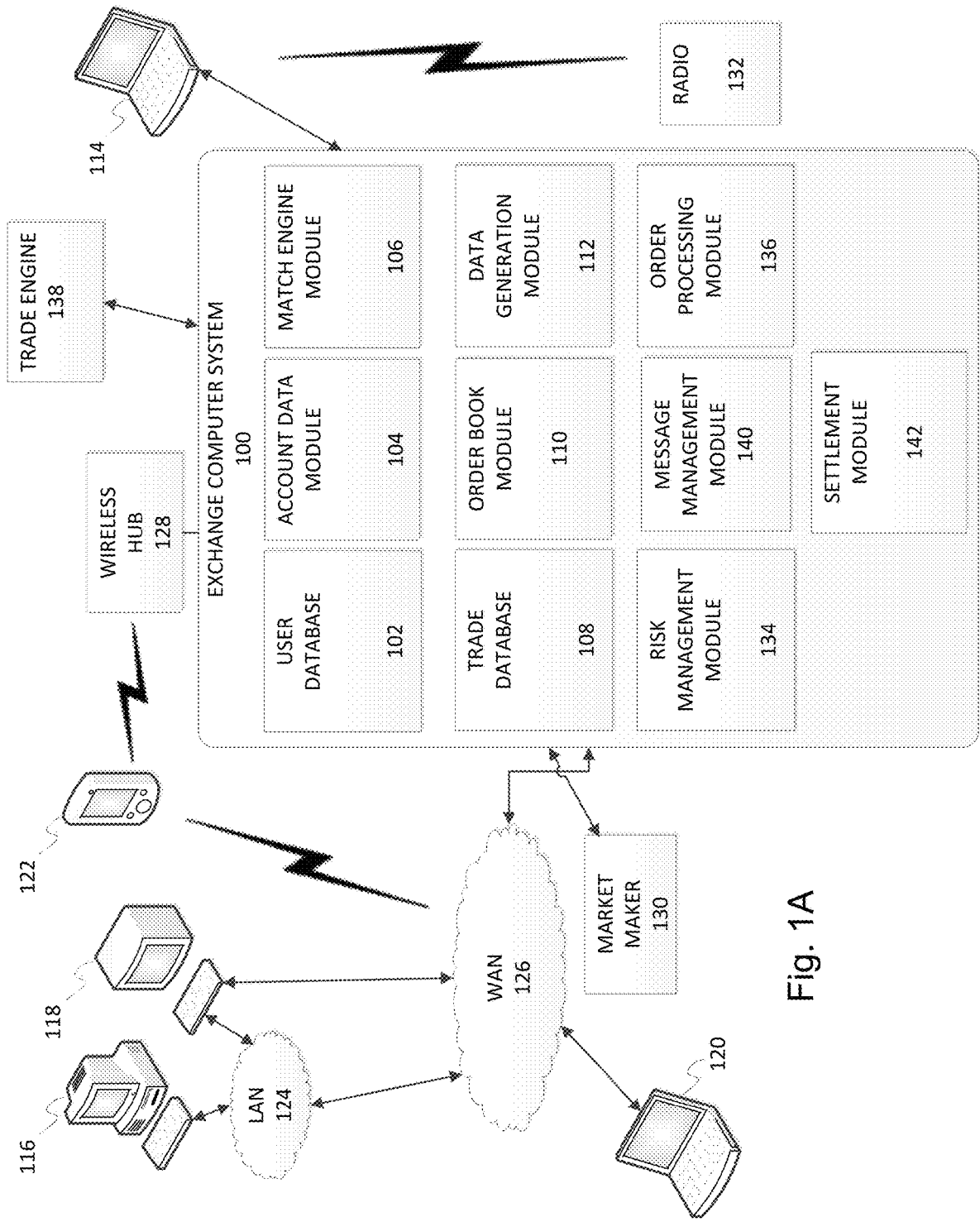
FIG. 1A depicts an illustrative computer network system that may be used to implement aspects of the disclosed embodiments.

The disclosed embodiments relate generally to efficient data transmission and receipt. Specifically, the disclosed embodiments provide systems and methods for selectively combining multiple, disparate message types, having redundant message fields therebetween and transmitted via separate feeds, into a single non-redundant message type, and transmitting same via one data feed. A consolidation system determines whether messages of the disparate message types can be combined or merged into a message of the consolidated message type based on pre-determined message characteristics and state or environment information. The merged message may be backwards-compatible so that data recipient computing systems can, without being modified, receive and consume the merged message and easily and selectively decide which portion of the merged data is relevant to the data recipient computing system, and thereafter only read or use the relevant portions, or otherwise ignore the non-relevant portions. Thus, multiple data receivers, which typically consume different message types, can receive the same merged or consolidated message.

The consolidated message generation and deciphering involves the use of particularly configured messages transmitted over a single data feed so that data recipient computing systems can read only the data relevant to the data recipient computing system's receiver application. The disclosed consolidation system improves upon the technical field of data processing by facilitating the communication of messages by reducing the total number of messages transmitted, reducing the overall volume of data being communicated and the resources necessary in support thereof.

The disclosed embodiments are directed to lessening the computational load of a messaging system, while communicating the appropriate and required information for the context of the system.

An exchange computing system which publishes multiple data feeds may need to implement additional computing power and logic to synchronize, or attempt to synchronize, the multiple data feeds, to publish information in a fair manner, e.g., so that variances in the transmission latencies between the data feeds do not provide an unfair informational advantage to some recipients over others. Reducing the number of data feeds publishing related information may reduce the amount of synchronization and message timing controls that may otherwise be necessary to disseminate related information at the same, or nearly the same, time. For example, in one embodiment, the reduced data feeds of the disclosed consolidation system may reduce or eliminate opportunities to use information received from one feed type to alter positions or action related to the second feed type, referred to as "inter-feed arbitrage." For example, two separate data feeds publishing data may experience different latencies, e.g. due to network topologies, routing algorithms, network congestion, and traffic conditions. As such, the same information, or related information, that is conveyed via the two feeds could reach a data recipient computing system at different times. A data recipient computing system could attempt to take advantage of this timing difference by using information it has received but others might not have yet received. Publishing data via a single feed eliminates such opportunities for inter-feed arbitrage.

Moreover, the disclosed consolidation system generates messages in a data feed that is backwards-compatible, i.e., existing recipient systems configured to read two different data feeds can read the single, merged data feed with little to no modification.

At least some of the problems solved by the disclosed consolidation system are specifically rooted in technology, specifically in data communications where multiple messages are communicated over a computer network but may contain related information, and are solved by means of a technical solution, namely, the identification and selective combination of data into one backwards-compatible data feed that can be deciphered by differently configured data recipient computing systems. For example, the disclosed embodiments relate to generating data related to separate data objects and minimizing the data set that is generated and published. The disclosed embodiments solve a communications network-centric problem of sending large amount of related data sets that are separately interpreted, and in particular, modify how communications are transmitted in order to solve a transmission problem as well as include systems for interpreting the messages by recipients of messages communicated via the network.

Accordingly the resulting problem is a problem arising in computer systems due to the high volume of disparate messages processed by an exchange computing system. The solutions disclosed herein are, in one embodiment, implemented as automatic responses and actions by an exchange computing system computer.

As detailed in U.S. patent application Ser. No. 14/100,788 (published as 2015-0161727, entitled "Exchange Feed For Trade Reporting Having Reduced Redundancy"), the entirety of which is incorporated by reference herein and relied upon, it may be recognized that trade notifications sent to all market participants may include redundant information repeated for each participating trade. However, U.S. patent application Ser. No. 14/100,788 discusses summary messages that report on trades, not messages reflecting information about resting positions in exchange computing system books, or messages that provide different views or books of a market (e.g., a summary of open positions, or resting orders) for a financial product. U.S. patent application Ser. No. 14/100,788 discusses reducing redundancies within a message, not between two separates messages typically sent out over two different feeds.

One exemplary environment where reduced data feed deployment and messaging is desirable is in financial markets, and in particular, electronic financial exchanges, such as a futures exchange, such as the Chicago Mercantile Exchange Inc. (CME).

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancelations, etc., in a manner as expected by the market participants, such as based on market data, e.g., prices, available counter-orders, etc., to provide an expected level of certainty that transactions will occur in a consistent and predictable manner and without unknown or unascertainable risks. In addition, it should be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

As was discussed above, electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

In one embodiment, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple MSGs, one for each market/product implemented thereby. For more detail on deterministic operation in a trading system, see U.S. patent application Ser. No. 14/074,667 entitled "Transactionally Deterministic High Speed Financial Exchange Having Improved, Efficiency, Communication, Customization, Performance, Access, Trading Opportunities, Credit Controls, And Fault Tolerance" and filed on Nov. 7, 2013, the entire disclosure of which is incorporated by reference herein and relied upon.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

In one embodiment, if a participant wishes to modify a previously sent request, e.g., a prior order which has not yet been processed or traded, they may send a request message comprising a request to modify the prior request.

In particular, in one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

In one exemplary embodiment, the incoming request itself, e.g., the inbound order entry, may be referred to as an iLink message. iLink is a bidirectional communications/message protocol/message format implemented by the Chicago Mercantile Exchange Inc.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1A. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the example computer 200 described below with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A data generation module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant.

The risk management module 134 may be configured to administer, manage or maintain one or more margining mechanisms implemented by the exchange computer system 100. Such administration, management or maintenance may include managing a number of database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described below.

An order processing module 136 may be included to decompose delta-based, spread instrument, bulk and other types of composite orders for processing by the order book module 110 and/or the match engine module 106. The order processing module 136 may also be used to implement one or more procedures related to clearing an order.

A message management module 140 may be included to, among other things, receive, and extract orders from, electronic messages as is indicated with one or more aspects of the disclosed embodiments.

A settlement module 142 (or settlement processor or other payment processor) may be included to provide one or more functions related to settling or otherwise administering transactions cleared by the exchange. Settlement module 142 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 142 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 142 may be used to determine a mark to market amount on a daily basis during the term of the financial instrument. Such determinations may also be made on a settlement date for the financial instrument for the purposes of final settlement.

In some embodiments, the settlement module 142 may be integrated to any desired extent with one or more of the other modules or processors of the exchange computer system 100. For example, the settlement module 142 and the risk management module 134 may be integrated to any desired extent. In some cases, one or more margining procedures or other aspects of the margining mechanism(s) may be implemented by the settlement module 142.

It should be appreciated that concurrent processing limits may be defined by or imposed separately or in combination, as was described above, on one or more of the trading system components, including the user database 102, the account data module 104, the match engine module 106, the trade database 108, the order book module 110, the data generation module 112, the risk management module 134, the order processing module 136, the message management module 140, settlement module 142, or other component of the exchange computer system 100.

In an embodiment, the message management module 140, as coupled with the order book module 110, may be configured for receiving a plurality of electronic messages, each of the plurality of messages having an associated action to be executed within a designated period of time having a beginning time and an ending time, wherein at least one electronic message of the plurality of electronic messages comprises data representative of a particular time between the beginning and end of the period of time at which the action associated with the at least one electronic message is to be executed. The exchange computer system 100 may then be further configured to execute the action associated with the at least one temporally specific message at the particular time.

Figure 1B:
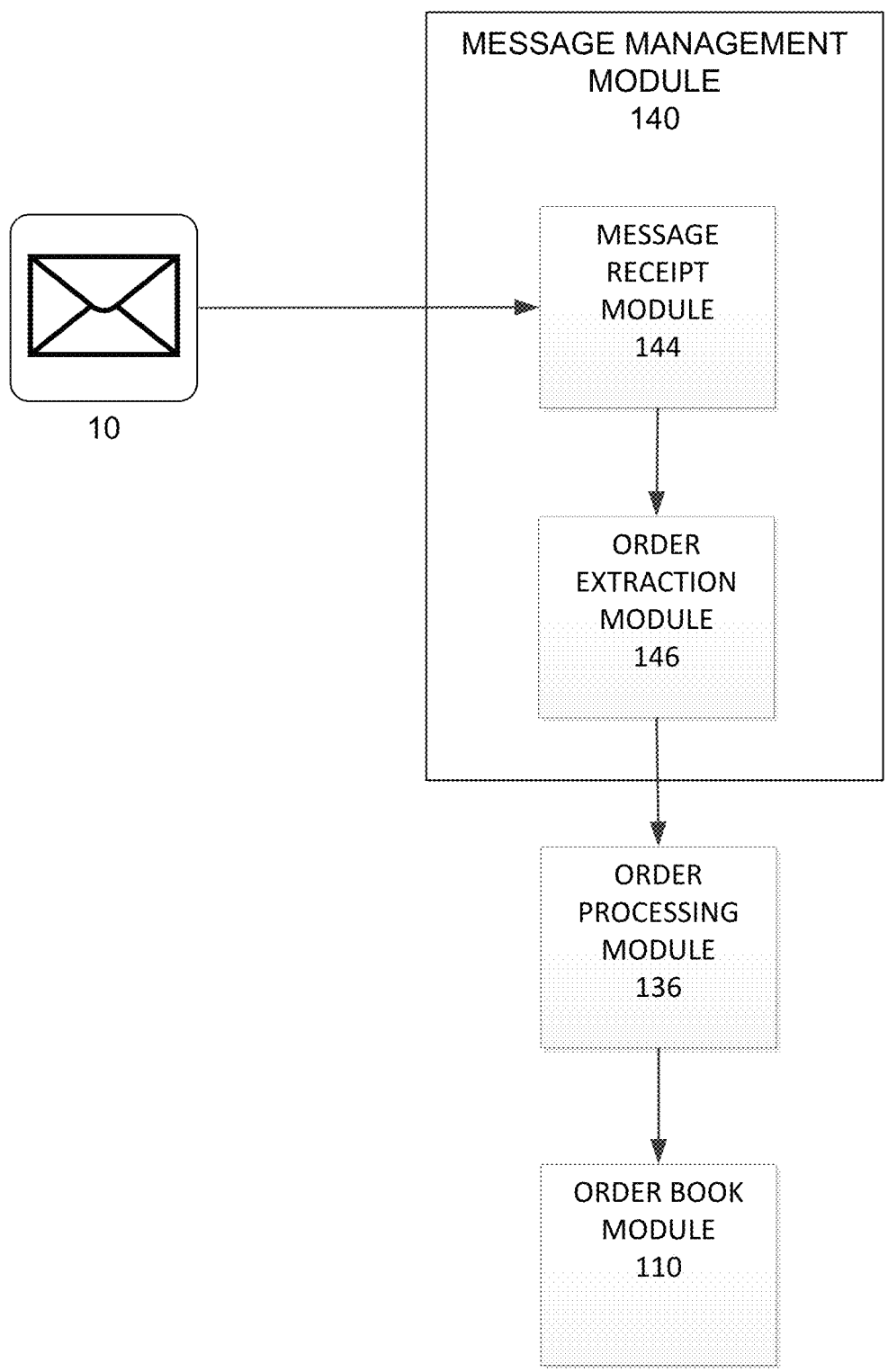
FIG. 1B depicts an example market order message management system for implementing the disclosed embodiments.

The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. FIG. 1B provides additional details for the message management module 140.

As will be described, the disclosed consolidation system may be implemented as part of the data generation module 112. However, it will be appreciated that the disclosed mechanisms may be implemented at any logical and/or physical point(s), or combinations thereof, at which the relevant information/data may be monitored or is otherwise accessible or measurable, including one or more gateway devices, modems, the computers or terminals of one or more market participants, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described above, the disclosed embodiments may be implemented as a centrally accessible system or as a distributed system, e.g., where some of the disclosed functions are performed by the computer systems of the market participants.

As shown in FIG. 1A, the exchange computer system 100 further includes a message management module 140 which may implement, in conjunction with the data generation module 112, the disclosed mechanisms for managing electronic messages containing financial data sent between an exchange and a plurality of market participants, or vice versa. However, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

FIG. 1B illustrates an embodiment of market order message management as implemented using the message management module 140 and order book module 110 of the exchange computer system 100. As such, a message 10 may be received from a market participant at the exchange computer system 100 by a message receipt module 144 of the message management module 140. The message receipt module 144 processes the message 10 by interpreting the content of the message based on the message transmit protocol, such as the transmission control protocol ("TCP"), to provide the content of the message 10 for further processing by the exchange computer system.

Further processing may be performed by the order extraction module 146. The order extraction module 146 may be configured to detect, from the content of the message 10 provided by the message receipt module 144, characteristics of an order for a transaction to be undertaken in an electronic marketplace. For example, the order extraction module 146 may identify and extract order content such as a price, product, volume, and associated market participant for an order. The order extraction module 146 may also identify and extract data indicating an action to be executed by the exchange computer system 100 with respect to the extracted order. The order extraction module may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buy or sell) or time in force (e.g., a good until end of day order that is good for the full trading day, a good until canceled ordered that rests on the order book until matched, or a fill or kill order that is canceled if not filled immediately).

The order may be communicated from the order extraction module 146 to an order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 136 may be configured in various arrangements, and may be configured as part of the order book module 110, part of the message management module 140, or as an independent functioning module.

The embodiments described herein utilize trade related electronic messages such as mass quote messages, individual order messages, modification messages, cancelation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange 100 includes a place or system that receives and/or executes orders.

In an embodiment, a plurality of electronic messages is received from the network. The plurality of electronic message packets may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, the market may operate using characteristics that involve collecting orders over a period of time, such as a batch auction market. In such an embodiment, the period of time may be considered an order accumulation period. The period of time may involve a beginning time and an ending time, with orders placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an embodiment, the other data may be data indicating a particular time in which the action is to be executed. As such, the order may be considered a temporally specific order. The particular time in which an action is undertaken may be established with respect to any measure of absolute or relative time. In an embodiment, the time in which an action is undertaken may be established with reference to the beginning time of the time period or ending time of the time period in a batch auction embodiment. For example, the particular time may be a specific amount of time, such as 10 milliseconds, prior to the ending time of an order accumulation period in the batch auction. Further, the order accumulation period may involve dissecting the accumulation period into multiple consecutive, overlapping, or otherwise divided, sub-periods of time. For example, the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an embodiment, the electronic message may also include other actions to be taken with respect to the order. These other actions may be actions to be executed after the initial or primary action associated with the order. For example, the actions may involve modifying or canceling an already placed order. Further, in an embodiment, the other data may indicate order modification characteristics. For example, the other data may include a price or volume change in an order. The other actions may involve modifying the already placed order to align with the order modification characteristics, such as changing the price or volume of the already placed order.

In an embodiment, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of official related to a product being bought or sold in the electronic market, and/or any other event or combination of events which may be detected by an electronic trading system.

In an embodiment, the action, or a primary action, associated with an order may be executed. For example, an order extracted from electronic message order characteristics may be placed into a market, or an electronic order book for a market, such that the order may be matched with other order counter thereto.

In an embodiment involving a market operating using batch auction principles, the action, such as placing the order, may be executed subsequent to the beginning time of the order accumulation period, but prior to the ending time of the order accumulation period. Further, as indicated above, a message may also include other information for the order, such as a particular time the action is to be executed. In such an embodiment, the action may be executed at the particular time. For example, in an embodiment involving a batch auction process having sub-periods during an order accumulation period, an order may be placed during a specified sub-period of the order accumulation period. The disclosed embodiments may be applicable to batch auction processing, as well as continuous processing.

Also, it may be noted that messages may be received prior or subsequent to the beginning time of an order accumulation period. Orders extracted from messages received prior to the beginning time may have the associated actions, or primary actions such as placing the order, executed at any time subsequent to the beginning time, but prior to the ending time, of the order accumulation period when no particular time for the execution is indicated in the electronic message. In an embodiment, messages received prior to the beginning time but not having a particular time specified will have the associated action executed as soon as possible after the beginning time. Because of this, specifying a time for order action execution may allow a distribution and more definite relative time of order placement so as to allow resources of the electronic trading system to operate more efficiently.

In an embodiment, the execution of temporally specific messages may be controlled by the electronic trading system such that a limited or maximum number may be executed in any particular accumulation period, or sub-period. In an embodiment, the order accumulation time period involves a plurality of sub-periods involving distinct temporal windows, a particular time indicated by a message may be indicative of a particular temporal window of the plurality of temporal windows, and the execution of the at least one temporally specific message is limited to the execution of a specified sub-period maximum number of temporally specific messages during a particular sub-period. The electronic trading system may distribute the ability to submit temporally specific message to selected market participants. For example, only five temporally specific messages may be allowed in any one particular period or sub-period. Further, the ability to submit temporally specific messages within particular periods or sub-periods may be distributed based on any technique. For example, the temporally specific messages for a particular sub-period may be auctioned off or otherwise sold by the electronic trading system to market participants. Also, the electronic trading system may distribute the temporally specific messages to preferred market participants, or as an incentive to participate in a particular market.

In an embodiment, an event occurrence may be detected. The event occurrence may be the occurrence of an event that was specified as other information relating to an order extracted from an electronic message. The event may be a triggering event for a modification or cancelation action associated with an order. The event may be detected subsequent to the execution of the first action when an electronic message further comprises the data representative of the event and a secondary action associated with the order. In an embodiment involving a market operating on batch auction principles, the event may be detected subsequent to the execution of a first action, placing an order, but prior to the ending time of an order accumulation period in which the action was executed.

In an embodiment, other actions associated with an order may be executed. The other actions may be any action associated with an order. For example, the action may be a conditional action that is executed in response to a detection of an occurrence of an event. Further, in a market operating using batch auction principles, the conditional action may be executed after the placement of an order during an order accumulation period, but in response to a detection of an occurrence of an event prior to an ending time of the order accumulation period. In such an embodiment, the conditional action may be executed prior to the ending time of the order accumulation period. For example, the placed order may be canceled, or modified using other provided order characteristics in the message, in response to the detection of the occurrence of the event.

An event may be a release of an economic statistic or a fluctuation of prices in a correlated market. An event may also be a perceptible change in market sentiment of a correlated market. A change may be perceptible based on a monitoring of orders or social media for keywords in reference to the market in question. For example, electronic trading systems may be configured to be triggered for action by a use of keywords during a course of ongoing public statements of officials who may be in a position to impact markets, such as Congressional testimony of the Chairperson of the Federal Reserve System.

The other, secondary, or supplemental action may also be considered a modification of a first action executed with respect to an order. For example, a cancelation may be considered a cancelation of the placement of the order. Further, a secondary action may have other data in the message which indicates a specific time in which the secondary action may be executed. The specific time may be a time relative to a first action, or placement of the order, or relative to an accumulation period in a batch auction market. For example, the specific time for execution of the secondary action may be at a time specified relative and prior to the ending period of the order accumulation period. Further, multiple secondary actions may be provided for a single order. Also, with each secondary action a different triggering event may be provided.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail below. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Further, when a transaction is determined to be an order to buy or sell a financial product, or financial instrument, a quality of activity as related to the market participant associated with the order may be calculated. The quality may be calculated as a specific value indicative of such quality, or a quality value. A value indicative of a quality of market activity may be considered a value that indicates whether the market activity of the market participant is conducive to improving market liquidity. As such, a quality value may be indicative of previously received transactions from the market participant having increased a probability that the processor will successfully match a subsequently received incoming order to buy or sell the associated financial instrument with at least one other received but unsatisfied order for a transaction counter thereto for the associated financial instrument, to at least partially satisfy one or both of the incoming order or the at least one other received order. Further, the value may be calculated based on the price of the incoming order, previously stored quantities, previously stored data indicative of previously received orders to modify or cancel, and previously stored data indicative of a result of attempts to match previously received orders stored in association with the market participant.

A quality value may be considered a market quality index ("MQI"), indicative of the market participant's quality of market activity. As such, particular categories of market activity may be quantified as a particular score for respective particular categories. Further, the scores of each, or selected, particular categories of market activity may be summed or added together to calculate the quality value or MQI. In an embodiment, the scores for the particular categories may be determined as percentile scores for a market participant in the particular category, as compared with other or all market participants in the electronic market. Further, particular category scores may be determined using data limited to transactions received over a particular length of time, or a most recent number of received transactions. Also, the particular length of time may be a most recent length of time, and as such a rolling window of time indicative of recent market activity of the market participant.

One of the particular categories may be a price proximity category. A proximity category may involve a proximity score indicating a proximity of the received order price to a midpoint of a current price spread of currently unmatched orders. A price spread may be any type of price spread or range or available prices for the product of the electronic market. For example, a price spread may be a difference between a highest price associated with a buy order and a lowest price associated with a sell order. Further, a proximity may be determined using any technique. In an embodiment, a raw difference between the received order price and an average price of the price spread (i.e., bid-ask spread) may be used. For example, a bid-ask spread may be $93.00-$94.00 in a market. As such, the midpoint may be $93.50. An order to buy may then be placed into the market at $92.00, having a corresponding proximity to the midpoint of 1.5. Similarly, an order to buy may be placed in the market at $94.00, which provides a 0.5 proximity to midpoint. Further, the proximity to midpoint may include designations of over/under midpoint values. For example, prices for orders to buy may have a proximity to midpoint defined as the bid-ask spread minus the price, providing values of 1.5 and −0.5 respectively for the examples above. Similarly, offers to sell may have a proximity to midpoint determined as the offer price minus the midpoint, thus providing inverted designations from the offers to buy. In one embodiment, a lower absolute value of price proximity may be more desirable for market quality than larger proximity scores. Other statistical proximity indicators, such as a standard deviation, or variance, as compared with other open or unmatched orders in the electronic market may also be used.

Another particular category may be an order size category. Larger quantities may be more desirable for liquidity generation than smaller quantities, and as such a market may encourage larger orders by quantifying historical order sizes of market participants in the order size category. The size category may involve a size score indicative of an average quantity of previously received orders from the market participant determined using the previously stored quantities. The average may be determined using any technique, such as a statistical mean or arithmetic average.

Another particular category may be a matched order volume category. A market may consider a number of previously matched orders by a market participant an indicator of a willingness or propensity to trade. As such, the matched order volume may involve a volume score indicative of a number of matched previously received orders from the market participant determined using previously stored data indicative of a result of attempts to match previously received orders stored in association with the market participant.

Yet another particular category may be an order modification category. Market activity characterized by rapid entry and subsequent cancelation or modification of orders that may move an offer to buy to a lower price, or an offer to sell to a higher price, may be considered not conducive to market liquidity. As such, an order modification category may involve a modification score indicative of a frequency of order modifications or cancelations of the market participant determined using the previously stored data indicative of previously received orders to modify or cancel from the market participant. It may be noted that as orders may be modified multiple times, a measure of the number of modifications on a percentage of total orders by a market participant may be above 100%, or generally a larger number than the maximum total number of orders provided to the market by the market participant.

In an embodiment, the particular categories may be weighted by designated weighting factors prior to the summing. In such an embodiment, the calculation of the quality value, or MQI, may be characterized by Equation 1.

$$V = (W_P \times S_P) + (W_S \times S_S) + (W_V \times S_V) + (W_M \times S_M)$$ Equation 1:

In Equation 1, V is the value, $S_P$ is the proximity score, $W_P$ is the weighting factor for the proximity score, $S_S$ is the size score, $W_S$ is the weighting factor for the size score, $S_V$ is the volume score, $W_V$ is the weighting factor for the volume score, $S_M$ is the modification score, $W_M$ is the weighting factor for the modification score. The weighting factors may be provided by any weighting technique. For example, each of the weighting factors may be an allocated value, wherein all the weighting factors added together equal 100% of a total value. In an embodiment, each of the scored values may receive equal weighting, such as 25%. For example, if an order with an associated market participant receives a proximity score of 50, a size score of 70, a volume score of 60 and a modification score of 35, a corresponding calculated MQI may be 53.75 when the weighting factors are equalized at 0.25. Note, that in such an embodiment, total MQI scores will vary between 0 and 100. As such, with lower category scores indicating better market activity characteristics, 0 may represent the minimum possible, or best possible, score, whereas 100 may represent the maximum, or worst possible, score.

In an embodiment, each score may be determined as a percentile comparative to other market participants. For example, if there are 100 market participants and a particular market participant has a proximity score that ranks that market participant as having the $40^{th}$ best proximity score raw value, such a participant may be considered in the $60^{th}$ percentile, and receive a 60 value as a proximity score. In an alternative embodiment, the same market participant may receive a 40 value as a proximity score. As understood by those with experience in the art, a selection of whether a lower number or a higher number score is favorable may be determinative of how percentile scores are awarded or otherwise calculated.

An electronic market may then attempt to match the incoming order to buy or sell with an appropriate counter order to buy or sell. As such, the electronic market may generate and/or execute trades of financial products between market participants. Further, the attempts to match may be enhanced by providing that some orders to buy or sell in the electronic market are given priority in matching over other orders in the electronic market. As such, an identical order to buy or sell, i.e., an identical volume at an identical price, may be differentiated based on assigned priorities such that the order of the identical orders having a higher priority is matched prior to the order having a lower priority. Priorities may be determined using various techniques. In an embodiment, orders may be assigned priority deterministically, that is orders may be assigned priority based on when an order was placed in an electronic market, such that orders placed earlier may have higher priorities. Another technique for determining a priority for an order may be based on the quality value or MQI of an order. For example, orders having a better MQI, i.e., a smaller value, may be filled or otherwise selected for matching over and/or prior to orders having a worse MQI, i.e., a larger value.

In an embodiment involving a market operating using batch auction principles, orders to buy or sell a product of a market may be accumulated over a period of time, such as one minute. At the end of the accumulation period, attempts to match the accumulated orders are made. A matching process for a batch order market may involve filing accumulated orders at a singular price. For example, accumulated counter orders may be overlaid using a supply curve based on the prices and quantities of accumulated orders. As such, matches may be made using an intersect of the two, i.e., buy and sell, supply and demand curves as a singular price, or also known as an equilibrium price, for matching counter orders. Contrarily, when there is no price intersect of the supply and demand curves, no trades may be executed. Generally, when a price intersect is determined, more orders meet the matching price criteria on one curve than the other curve, and thus some number of matchable orders may not have corresponding counter orders, and consequentially may not be matched. Priority of orders may be used to determine which matchable orders are actually matched at the end of the order accumulation period in the electronic market. For example, orders having a better MQI score or value may be selected for matching over orders having a worse MQI score.

An MQI score may be used for purposes aside from matching trades. For example, an MQI score may be determined using characteristics specific to a particular market participant, such as an MQI involving just size, volume, and modification scores as indicated above. Such other uses may include any other use for a value indicative of a market participant's propensity for improving market liquidity.

In an embodiment, an MQI value may be used to establish a fee structure for the participation in a market of market participants. Exchanges may establish a fee structure that preferences certain market participants. As such, a fee structure may be established based on MQI values for market participants, so that better MQI values correlate to lower fees for the associated market participant.

In an embodiment, an MQI may be used to determine a focus for marketing or sales activities of a market exchange administrator. Marketing and/or sales activities are frequently focused on market participants of greater perceived importance. Reference to an MQI of a market participant may be used to determine such marketing or sales activity focus.

Data indicative of attempts to match incoming orders may also be saved. The data may be stored in any device, or using any technique, operable to store and provide recovery of data. For example, a memory 204 or computer readable medium 210, may be used to store data, as is described with respect to FIG. 2.

The acts of the process as described herein may also be repeated. As such, data for multiple received transactions for multiple market participants may be stored and used as describe herein.

The order processing module 136 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 710, as associated with particular market participants.

Also, the order processing module 136 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 136 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. This priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 136, and used for determining MQI scores of market participants.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting or pending orders.

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

In the exemplary embodiments, all transactions for a particular market may be ultimately received at the electronic trading system via one or more points of entry, e.g., one or more communications interfaces, at which the disclosed embodiments apply determinism, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see U.S. patent application Ser. No. 14/074,675, filed on Nov. 7, 2013, published as U.S. patent application Publication Ser. No. U.S. Patent Publication No. 2015/0127516, entitled "Transactionally Deterministic High Speed Financial Exchange Having Improved, Efficiency, Communication, Customization, Performance, Access, Trading Opportunities, Credit Controls, And Fault Tolerance", the entirety of which is incorporated by reference herein and relied upon.

Upon receipt of an incoming order to trade in a particular financial instrument, whether for a single-component financial instrument, e.g., a single futures contract, or for a multiple-component financial instrument, e.g., a combination contract such as a spread contract, a match engine, as will be described in detail below, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all). Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data, as was described above, reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price.

The exchange computer system, as will be described below, monitors incoming orders received thereby and attempts to identify, i.e., match or allocate, as will be described in more detail below, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearinghouse. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase transaction, and higher than the reference value if the transaction is a sell transaction. Said another way, for purchase transactions, lower values are better, and for relinquish or sell transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

As was noted above, an exchange must respond to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include:

Price Explicit Time
Order Level Pro Rata
Order Level Priority Pro Rata
Preference Price Explicit Time
Preference Order Level Pro Rata
Preference Order Level Priority Pro Rata
Threshold Pro-Rata
Priority Threshold Pro-Rata
Preference Threshold Pro-Rata
Priority Preference Threshold Pro-Rata
Split Price-Time Pro-Rata For example, the Price Explicit Time trading policy is based on the basic Price Time trading policy with Explicit Orders having priority over Implied Orders at the same price level. The order of traded volume allocation at a single price level may therefore be:

Explicit order with oldest timestamp first. Followed by
Any remaining explicit orders in timestamp sequence (First In, First Out—FIFO) next. Followed by
Implied order with oldest timestamp next. Followed by
Any remaining implied orders in timestamp sequence (FIFO).

In Order Level Pro Rata, also referred to as Price Pro Rata, priority is given to orders at the best price (highest for a bid, lowest for an offer). If there are several orders at this best price, equal priority is given to every order at this price and incoming business is divided among these orders in proportion to their order size. The Pro Rata sequence of events is:

1. Extract all potential matching orders at best price from the order book into a list.
2. Sort the list by order size, largest order size first. If equal order sizes, oldest timestamp first. This is the matching list.
3. Find the 'Matching order size, which is the total size of all the orders in the matching list.
4. Find the 'tradable volume', which is the smallest of the matching volume and the volume left to trade on the incoming order.
5. Allocate volume to each order in the matching list in turn, starting at the beginning of the list. If all the tradable volume gets used up, orders near the end of the list may not get allocation.
6. The amount of volume to allocate to each order is given by the formula:

(Order volume/Matching volume)*Tradable volume

The result is rounded down (for example, 21.99999999 becomes 21) unless the result is less than 1, when it becomes 1.

7. If tradable volume remains when the last order in the list had been allocated to, return to step 3.

Note: The matching list is not re-sorted, even though the volume has changed. The order which originally had the largest volume is still at the beginning of the list.

8. If there is still volume left to trade on the incoming order, repeat the entire algorithm at the next price level.

Order Level Priority Pro Rata, also referred to as Threshold Pro Rata, is similar to the Price (or 'Vanilla') Pro Rata algorithm but has a volume threshold defined. Any pro rata allocation below the threshold will be rounded down to 0. The initial pass of volume allocation is carried out in using pro rata; the second pass of volume allocation is carried out using Price Explicit Time. The Threshold Pro Rata sequence of events is:

1. Extract all potential matching orders at best price from the order book into a list.
2. Sort the list by explicit time priority, oldest timestamp first. This is the matching list.
3. Find the 'Matching volume', which is the total volume of all the orders in the matching list.
4. Find the 'tradable volume', which is the smallest of the matching volume and the volume left to trade on the incoming order.
5. Allocate volume to each order in the matching list in turn, starting at the beginning of the list.
6. The amount of volume to allocate to each order is given by the formula:

(Order volume/Matching volume)*Tradable volume

The result is rounded down to the nearest lot (for example, 21.99999999 becomes 21) unless the result is less than the defined threshold in which case it is rounded down to 0.

7. If tradable volume remains when the last order in the list had been allocated to, the remaining volume is allocated in time priority to the matching list.

8. If there is still volume left to trade on the incoming order, repeat the entire algorithm at the next price level.

In the Split Price Time Pro-Rata algorithms, a Price Time Percentage parameter is defined. This percentage of the matching volume at each price is allocated by the Price Explicit Time algorithm and the remainder is allocated by the Threshold Pro-Rata algorithm. There are four variants of this algorithm, with and without Priority and/or Preference. The Price Time Percentage parameter is an integer between 1 and 99. (A percentage of zero would be equivalent to using the respective existing Threshold Pro-Rata algorithm, and a percentage of 100 would be equivalent to using the respective existing Price Time algorithm). The Price Time Volume will be the residual incoming volume, after any priority and/or Preference allocation has been made, multiplied by the Price Time Percentage. Fractional parts will be rounded up, so the Price Time Volume will always be at least 1 lot and may be the entire incoming volume. The Price Time Volume is allocated to resting orders in strict time priority. Any remaining incoming volume after the Price Time Volume has been allocated will be allocated according to the respective Threshold Pro-Rata algorithm. The sequence of allocation, at each price level, is therefore:

1. Priority order, if applicable
2. Preference allocation, if applicable
3. Price Time allocation of the configured percentage of incoming volume 4. Threshold Pro-Rata allocation of any remaining incoming volume 5. Final allocation of any leftover lots in time sequence.

Any resting order may receive multiple allocations from the various stages of the algorithm.

It will be appreciated that there may be other allocation algorithms, including combinations of algorithms, now available or later developed, which may be utilized with the disclosed embodiments, and all such algorithms are contemplated herein. In one embodiment, the disclosed embodiments may be used in any combination or sequence with the allocation algorithms described herein.

One exemplary system for matching is described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon, discloses an adaptive match engine which draws upon different matching algorithms, e.g., the rules which dictate how a given order should be allocated among qualifying resting orders, depending upon market conditions, to improve the operation of the market. For example, for a financial product, such as a futures contract, having a future expiration date, the match engine may match incoming orders according to one algorithm when the remaining time to expiration is above a threshold, recognizing that during this portion of the life of the contract, the market for this product is likely to have high volatility. However, as the remaining time to expiration decreases, volatility may decrease. Accordingly, when the remaining time to expiration falls below the threshold, the match engine switches to a different match algorithm which may be designed to encourage trading relative to the declining trading volatility. Thereby, by conditionally switching among matching algorithms within the same financial product, as will be described, the disclosed match engine automatically adapts to the changing market conditions of a financial product, e.g., a limited life product, in a non-preferential manner, maintaining fair order allocation while improving market liquidity, e.g., over the life of the product.

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly} = \text{Leg1} - 2 \times \text{Leg2} + \text{Leg3} \quad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Thus an exchange may match outright orders, such as individual contracts or spread orders (which as discussed above could include multiple individual contracts). The exchange may also imply orders from outright orders. For example, exchange computer system 100 may derive, identify and/or advertise, publish, display or otherwise make available for trading orders based on outright orders.

For example, two different outright orders may be resting on the books, or be available to trade or match. The orders may be resting because there are no outright orders that match the resting orders. Thus, each of the orders may wait or rest on the books until an appropriate outright counteroffer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. Implied IN or implied OUT spread may be created when an electronic match system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs. Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 142.

One or more of the above-described modules of the exchange computer system 100 may be used to gather or obtain data to support the settlement price determination, as well as a subsequent margin requirement determination. For example, the order book module 110 and/or the data generation module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets" ("the '962 Publication"), the entire disclosure of which is incorporated by reference herein and relied upon. Settlement price determination techniques may be implemented to cover calendar month spread instruments having different deferred month contracts.

The disclosed embodiments may be implemented in a data transaction processing system that processes data items or objects. Customer or user devices (e.g., computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to buy or sell a quantity of a product at a given value. The instructions may also be conditional, e.g., buy or sell a quantity of a product at a given value if a trade for the product is executed at some other reference value. The data transaction processing system may include a specifically configured matching processor that matches, e.g., automatically, electronic data transaction request messages for the same one of the data items. The specifically configured matching processor may match electronic data transaction request messages based on multiple transaction matching parameters from the different client computers. The specifically configured matching processor may additionally generate information reported to data recipient computing systems via outbound messages published via one or more data feeds.

In one embodiment, the messages and/or values received for each object may be stored in queues according to value and/or priority techniques implemented by an exchange computing system 100. FIG. 3A illustrates an example data structure 300, which may be stored in a memory or other storage device, such as the memory 204 or storage device 206 described above with respect to FIG. 2, for storing and retrieving messages related to different values for the same action for an object. For example, data structure 300 may be a set of queues or linked lists for multiple values for an action, e.g., bid, on an object. Data structure 300 may be implemented as a database. It should be appreciated that the system may store multiple values for the same action for an object, for example, because multiple users submitted messages to buy specified quantities of an object at different values. Thus, in one embodiment, the exchange computing system can keep track of different orders or messages for buying or selling quantities of objects at specified values.

Although the application contemplates using queue data structures for storing messages in a memory, the implementation may involve additional pointers, i.e., memory address pointers, or linking to other data structures. Thus, in one embodiment, each queue may store different values, which could represent prices, where each value points to or is linked to the messages (which may themselves be stored in queues and sequenced according to priority techniques, such as prioritizing by value) that will match at that value. For example, as shown in FIG. 3A, all of the values relevant to executing an action at different values for an object are stored in a queue. Each value in turn points to, e.g., a linked list or queue logically associated with the values. The linked list stores the messages that instruct the exchange computing system to buy specified quantities of the object at the corresponding value.

The sequence of the messages in the message queues connected to each value may be determined by exchange implemented priority techniques. For example, in FIG. 3A, messages M1, M2, M3 and M4 are associated with performing an action (e.g., buying or selling) a certain number of units (may be different for each message) at Value 1. M1 has priority over M2, which has priority over M3, which has priority over M4. Thus, if a counter order matches at Value 1, the system fills as much quantity as possible associated with M1 first, then M2, then M3, and then M4.

In the illustrated examples, the values may be stored in sequential order, and the best or lead value for a given queue may be readily retrievable by and/or accessible to the disclosed routing system. Thus, in one embodiment, the value having the best priority may be illustrated as being in the topmost position in a queue, although the system may be configured to place the best priority message in some other predetermined position. In the example of FIG. 3A, Value 1 is shown as being the best value or lead value, or the top of the book value, for an example Action. In one embodiment, as discussed herein, the disclosed routing system may access the top of book information for a given action in a queue to determine whether a message betters or improves the queue for an object.

Figure 3A:
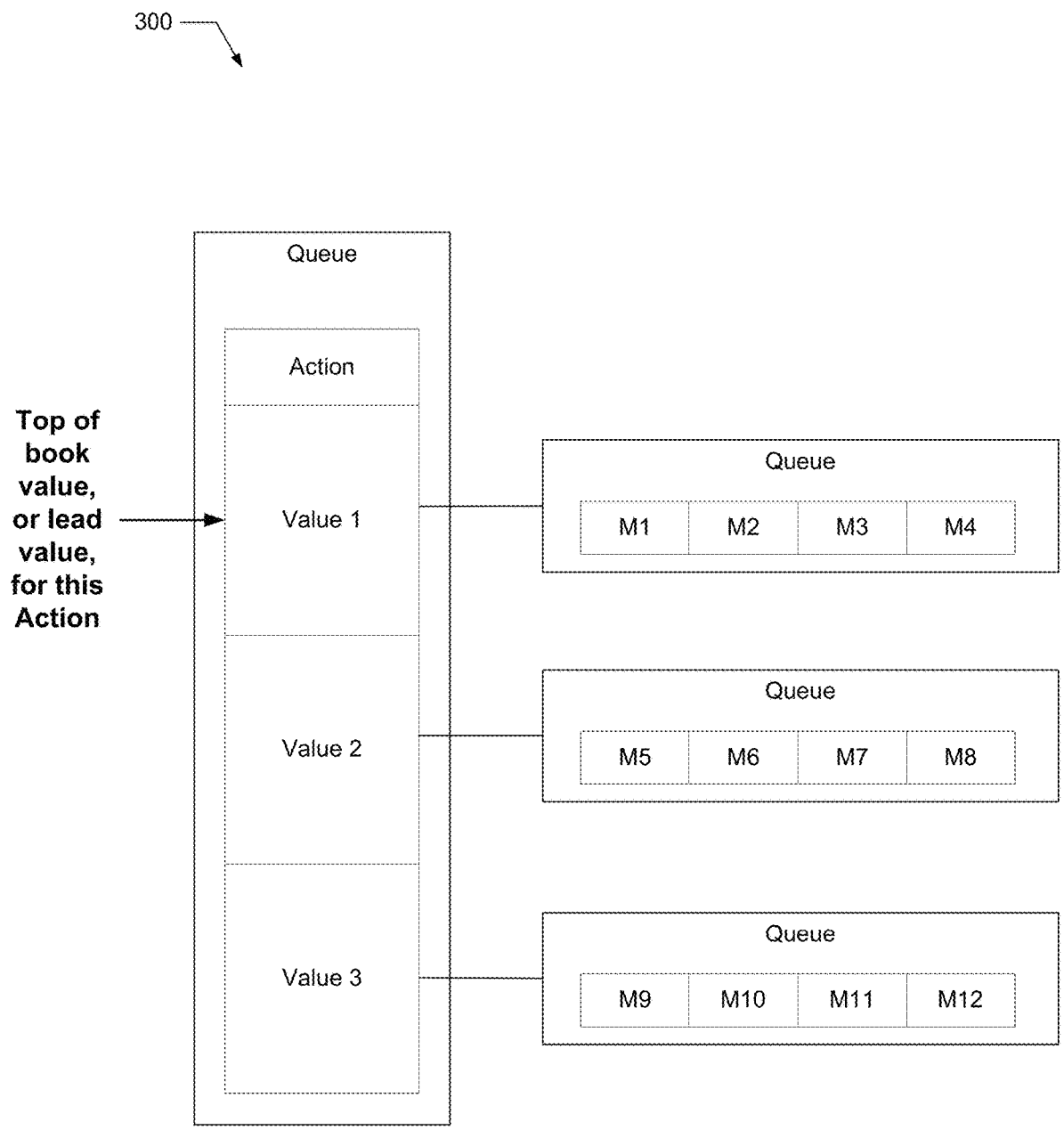
FIG. 3A depicts an illustrative embodiment of a data structure used to implement aspects of the disclosed embodiments.
Figure 3B:
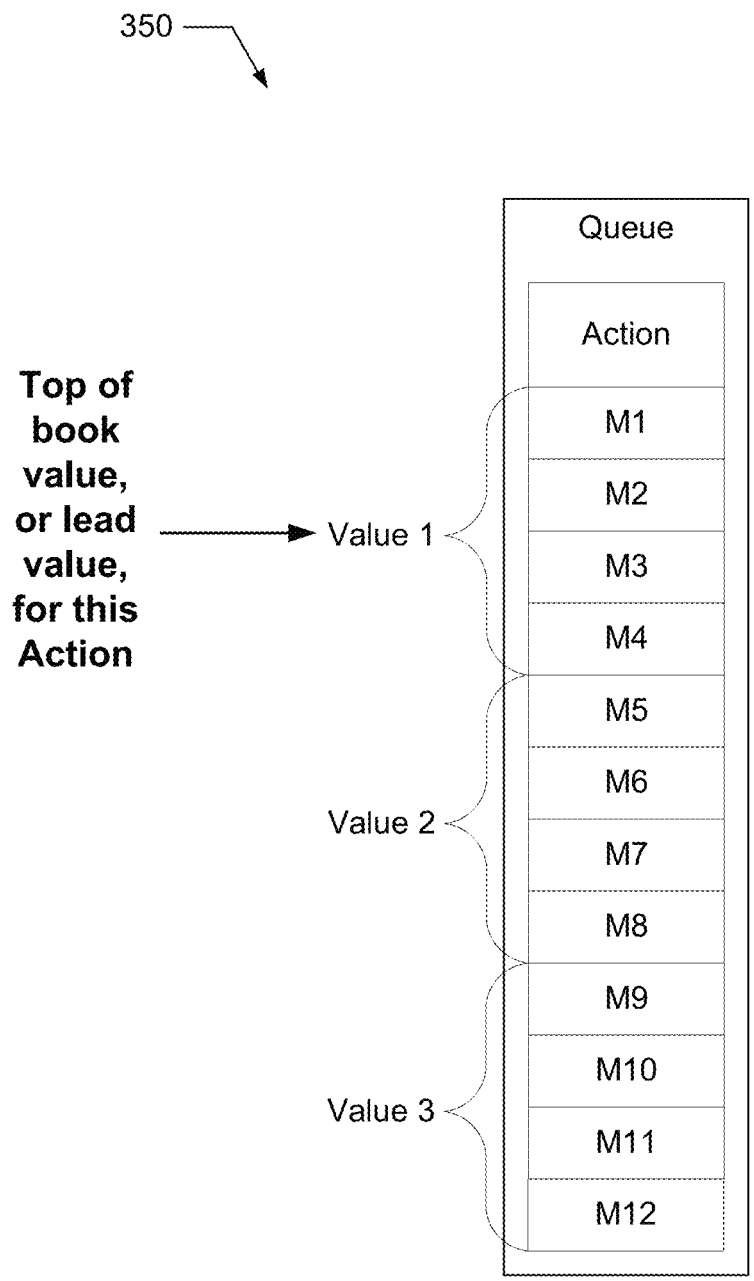
FIG. 3B depicts an illustrative embodiment of an alternative data structure used to implement aspects of the disclosed embodiments.

FIG. 3B illustrates an example alternative data structure 350 for storing and retrieving messages and related values. It should be appreciated that matches occur based on values, and so all the messages related to a given value may be prioritized over all other messages related to a different value. As shown in FIG. 3B, the messages may be stored in one queue and grouped by values according to the hierarchy of the values. The hierarchy of the values may depend on the action to be performed.

For example, if a queue is a sell queue (e.g., the Action is Sell), the lowest value may be given the best priority and the highest value may be given the lowest priority. Thus, as shown in FIG. 3B, if Value 1 is lower than Value 2 which is lower than Value 3, Value 1 messages may be prioritized over Value 2, which in turn may be prioritized over Value 3.

Within Value 1, M1 is prioritized over M2, which in turn is prioritized over M3, which in turn is prioritized over M4. Within Value 2, M5 is prioritized over M6, which in turn is prioritized over M7, which in turn is prioritized over M8. Within Value 3, M9 is prioritized over M10, which in turn is prioritized over M11, which in turn is prioritized over M12.

Alternatively, the messages may be stored in a tree-node data structure that defines the priorities of the messages. In one embodiment, the messages may make up the nodes.

In one embodiment, the system may traverse through a number of different values and associated messages when processing an incoming message. Traversing values may involve the processor loading each value, checking that value and deciding whether to load another value, i.e., by accessing the address pointed at by the address pointer value. In particular, referring to FIG. 3B, if the queue is for selling an object for the listed Values 1, 2 and 3 (where Value 1 is lower than Value 2 which is lower than Value 3), and if the system receives an incoming aggressing order to buy quantity X at a Value 4 that is greater than Values 1, 2, and 3, the system will fill as much of quantity X as possible by first traversing through the messages under Value 1 (in sequence M1, M2, M3, M4). If any of the quantity of X remains, the system traverses down the prioritized queue until all of the incoming order is filled (e.g., all of X is matched) or until all of the quantities of M1 through M12 are filled. Any remaining, unmatched quantity remains on the books, e.g., as a resting order at Value 4, which was the entered value or the message's value.

The system may traverse the queues and check the values in a queue, and upon finding the appropriate value, may locate the messages involved in making that value available to the system. When an outright message value is stored in a queue, and when that outright message is involved in a trade or match, the system may check the queue for the value, and then may check the data structure storing messages associated with that value.

In one embodiment, an exchange computing system may convert all financial instruments to objects. In one embodiment, an object may represent the order book for a financial instrument. Moreover, in one embodiment, an object may be defined by two queues, one queue for each action that can be performed by a user on the object. For example, an order book converted to an object may be represented by an Ask queue and a Bid queue. Resting messages or orders associated with the respective financial instrument may be stored in the appropriate queue and recalled therefrom.

In one embodiment, the messages associated with objects may be stored in specific ways depending on the characteristics of the various messages and the states of the various objects in memory. For example, a system may hold certain resting messages in queue until the message is to be processed, e.g., the message is involved in a match. The order, sequence or priority given to messages may depend on the characteristics of the message. For example, in certain environments, messages may indicate an action that a computer in the system should perform. Actions may be complementary actions, or require more than one message to complete. For example, a system may be tasked with matching messages or actions contained within messages. The messages that are not matched may be queued by the system in a data queue or other structure, e.g., a data tree having nodes representing messages or orders. Again, the best value for a given queue may be readily retrievable by and/or accessible to the disclosed routing system.

The queues are structured so that the messages are stored in sequence according to priority. Although the embodiments are disclosed as being implemented in queues, it should be understood that different data structures such as for example linked lists or trees may also be used.

The system may include separate data structures, e.g., queues, for different actions associated with different objects within the system. For example, in one embodiment, the system may include a queue for each possible action that can be performed on an object. The action may be associated with a value. The system prioritizes the actions based in part on the associated value.

Figure 4:
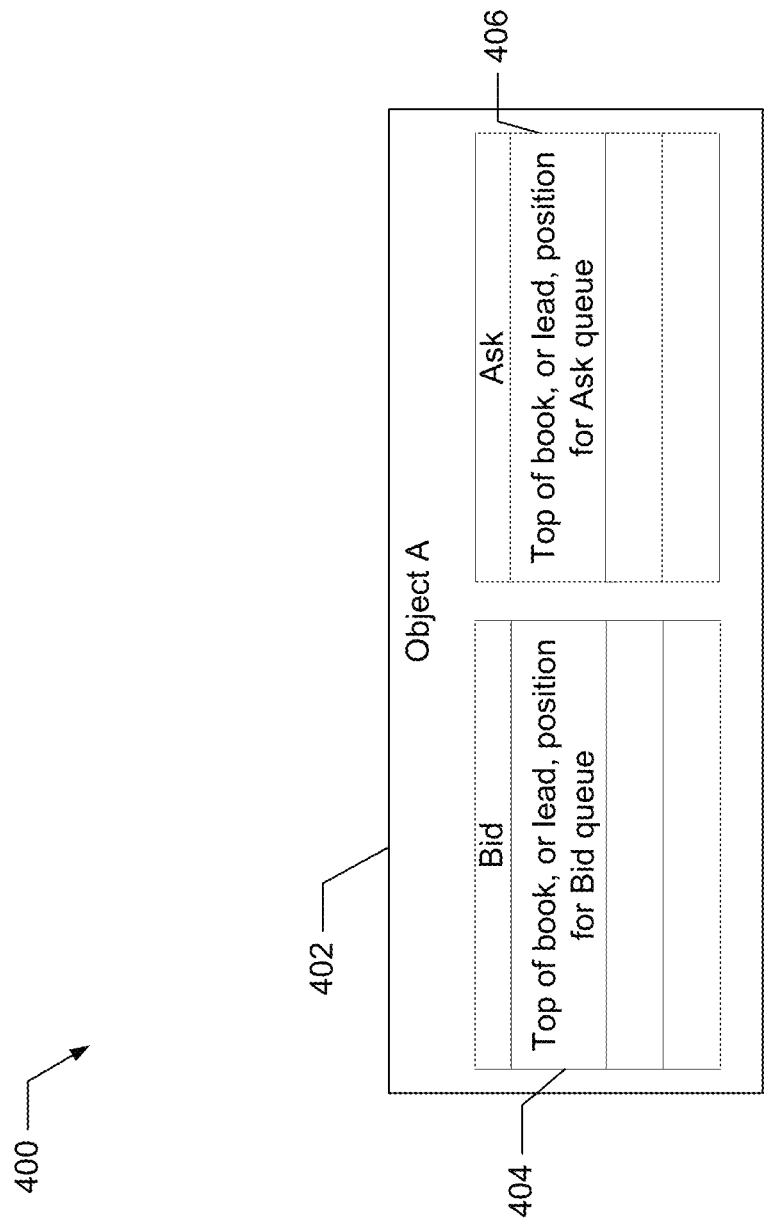
FIG. 4 depicts an illustrative embodiment of order book data structures holding example messages used to implement aspects of the disclosed embodiments.

For example, as shown in FIG. 4, the order book module of a computing system may include several paired queues, such as queues Bid and Ask for an object (e.g., Object A). The system may include two queues, or one pair of queues, for each object that is matched or processed by the system. In one embodiment, the system stores messages in the queues that have not yet been matched or processed. FIG. 4 may be an implementation of the data structures disclosed in FIGS. 3A and/or 3B. Each queue may have a top of book, or lead, position, such as positions 404 and 406, which stores data that is retrieved by the disclosed routing system.

The queues may define the priority or sequence in which messages are processed upon a match event. For example, two messages stored in a queue may represent performing the same action at the same value. When a third message is received by the system that represents a matching action at the same value, the system may need to select one of the two waiting, or resting, messages as the message to use for a match. Thus, when multiple messages can be matched at the same value, the exchange may have a choice or some flexibility regarding the message that is matched. The queues may define the priority in which orders that are otherwise equivalent (e.g., same action for the same object at the same value) are processed.

The system may include a pair of queues for each object, e.g., a bid and ask queue for each object. Each queue may be for example implemented utilizing the data structure of FIG. 3B. The exchange may be able to specify the conditions upon which a message for an object should be placed in a queue. For example, the system may include one queue for each possible action that can be performed on an object. The system may be configured to process messages that match with each other. In one embodiment, a message that indicates performing an action at a value may match with a message indicating performing a corresponding action at the same value. Or, the system may determine the existence of a match when messages for the same value exist in both queues of the same object.

The messages may be received from the same or different users or traders.

The queues illustrated in FIG. 4 hold or store messages received by a computing exchange, e.g., messages submitted by a user to the computing exchange, and waiting for a proper match. It should be appreciated that the queues may also hold or store implieds, e.g., implied messages generated by the exchange system, such as messages implied in or implied out as described herein. The system thus adds messages to the queues as they are received, e.g., messages submitted by users, or generated, e.g., implied messages generated by the exchanges. The sequence or prioritization of messages in the queues is based on information about the messages and the overall state of the various objects in the system.

The disclosed embodiments relate to data dissemination via electronic messages and data feeds, such as messages generated by an exchange computing system and sent to market participants, e.g., market data feeds.

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. Financial messages communicated to the electronic trading system, also referred to as "inbound" messages, may include associated actions that characterize the messages, such as trader orders, order modifications, order cancelations and the like, as well as other message types. Inbound messages may be sent from market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market.

Financial messages communicated from the electronic trading system, referred to as "outbound" messages, may include messages responsive to inbound messages, such as confirmation messages, or other messages such as market update messages, quote messages, and the like. Outbound messages may be disseminated via data feeds, discussed further herein.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to in one embodiment as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

Accordingly, an acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP", e.g., Aggregated By Value ("ABV") book, or Market By Order "MBO", e.g., Per Order ("PO") book format). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

It should be further appreciated that various types of market data feeds may be provided which reflect different markets and/or different aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, or may communicate only changes to the top 10 price levels. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order or Per Order, Market Depth (also known as Market by Price or Aggregated By Value to a designated depth of the book), e.g., CME offers a 10-deep market by price or value feed, Top of Book (a single depth Market by Price feed), and combinations thereof. There may also be all manner of specialized feeds in terms of the content, i.e., providing, for example, derived data, such as a calculated index.

Market data feeds may be characterized as providing a "view" or "overview" of a given market, an aggregation or a portion thereof or changes thereto. For example, a market data feed, such as an Aggregated By Value ("ABV") feed, may convey, with each message, the entire/current state of a market, or portion thereof, for a particular product as a result of one or more market impacting events. For example, an Aggregated By Value message may convey a total quantity of resting buy/sell orders at a particular price level or value in response to a new order being placed at that price or value. An Aggregated By Value message may convey a quantity of an instrument which was traded in response to an incoming order being matched with one or more resting orders. ABV messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An ABV feed may utilize different message formats for conveying different types of market impacting events. For example, when a new order is rested on (or added to) the order book, an ABV message may reflect the current state of the price or value level to which the order was added, e.g., the new aggregate quantity and the new aggregate number of resting orders for that value. As can be seen, such a message conveys no information about the resting orders, including the newly rested order, themselves to the market participants. Only the submitting market participant, who receives a separate private message acknowledging the event, knows that it was their order that was added to the book. Similarly, when a trade occurs, an ABV message may be sent which conveys the price or value at which the instrument was traded, the quantity traded and the number of participating orders, but may convey no information as to whose particular orders contributed to the trade. ABV feeds may further batch reporting of multiple events, i.e., report the result of multiple market impacting events in a single message.

Alternatively, a market data feed, referred to as a Per Order ("PO") feed, may convey data reflecting a change at the order level that occurred to the book, rather than the result of that change on a value level, e.g., that order ABC for quantity X was added to price level Y or that order ABC and order XYZ traded a quantity X at a price Y. PO messages may carry much more data than ABV messages because PO messages reflect information about each order, whereas ABV messages contain information about orders affecting some predetermined value levels. Furthermore, because specific orders, but not the submitting traders thereof, are identified in PO messages, other market participants may be able to follow that order as it progresses through the market, e.g., as it is modified, canceled, traded, etc.

An ABV book data object may include information about multiple values. The ABV book data object may be arranged and structured so that information about each value is aggregated together. Thus, for a given value V, the ABV book data object may aggregate all the information by value, such as for example, the number of orders having a certain position at value V, the quantity of total orders resting at value V, etc. Thus, the value field may be the key, or may be a unique field, within an ABV book data object. In one embodiment, the value for each entry within the ABV book data object is different. In one embodiment, information in an ABV book data object is presented in a manner such that the value field is the most granular field of information.

A PO book data object may include information about multiple orders. The PO book data object may be arranged and structured so that information about each order is represented. Thus, for a given order O, the PO book data object may provide all of the information for order O. Thus, the order field may be the key, or may be a unique field, within a PO book data object. In one embodiment, the order ID for each entry within the PO book data object is different.

In one embodiment, information in a PO book data object is presented in a manner such that the order field is the most granular field of information.

Thus, the PO book data object may include data about unique orders, e.g., all unique resting orders for a product, and the ABV book data object may include data about unique values, e.g., up to a predetermined level, e.g., top ten price or value levels, for a product.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. ABV and PO feeds may refer to categories/variations of market data feeds, distinguished by whether they provide an indication of the current state of value levels for a market resulting from a market impacting event (ABV) or an indication of the change in the current state of an order in a market due to a market impacting event (PO).

In one embodiment, an exchange computing system may generate multiple order book objects, one for each type of view that is published or provided. For example, the system may generate a PO book object and an ABV book object. It should be appreciated that each book object, or view for a product or market, may be derived from the Per Order book object, which includes all the orders for a given financial product or market.

An inbound message may include an order that affects the PO book object, the ABV book object, or both. An outbound message may include data from one or more of the structures within the exchange computing system, e.g., the PO book object queues or the ABV book object queues.

Figure 5:
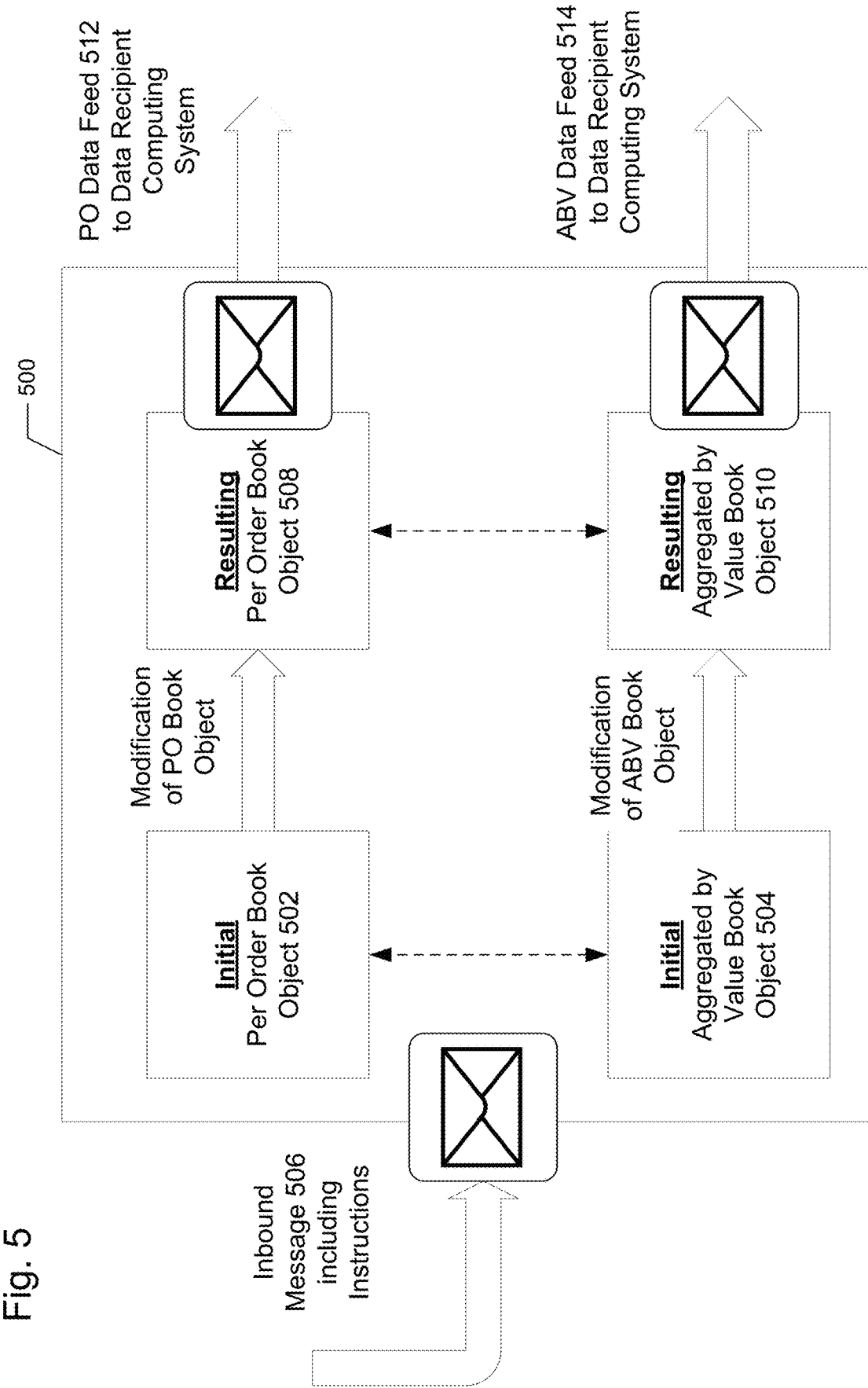
FIG. 5 illustrates an example data structure diagram of inbound and outbound messages used to implement aspects of the disclosed embodiments.

FIG. 5 illustrates an example exchange computing system 500 including multiple objects representing books or views of products, including Per Order Book Object 502 and Aggregated by Value Book Object 504. Exchange computing system 500 may receive an inbound message 506, which includes instructions or information about an order for a product associated with the PO Book Object 502 and the ABV Book Object 504. For example, the inbound message 506 may include instructions to perform a transaction on a financial product, which is may be represented by the book objects 502 and 504.

The book objects may be in communication with each other. In one embodiment, Book Objects 502 and 504 may depend on each other, i.e., Book Object 504 may be derived from Book Object 502. The instructions may cause the addition, modification, or cancellation of an order associated with the PO Book Object 502, which may in turn impact a value level represented by the ABV Book Object 504.

Alternatively, in one embodiment, Book Objects 502 and 504 may be independent of each other, i.e., Book Object 504 may not be derived from Book Object 502. The instructions received via inbound message 506 may directly impact the two book objects 502 and 504.

In one example, the instructions may cause one or more events to occur, e.g., a match event, or a modification to a book object event. For example, if the instructions do not cause a match event, the instructions may cause an add event, e.g., they may generate an order to be added to the order book, i.e., an order associated with the inbound message may become a resting order that is added to the PO Book Object 502. If the value associated with the order associated with the inbound message is a value that exists in the ABV Book Object 504, the order associated with the inbound message may cause modification of the information in the ABV Book Object as well.

The consolidation system may determine whether one or more book data objects have been modified, and may generate data indicating the modifications. The consolidation system may additionally generate messages including the data indicating the modifications to the data objects.

In one embodiment, the exchange computing system 500 may store multiple versions or instances of a book object, representing the book object at different times, e.g., before and after performing a transaction based on inbound message 506. For example, the exchange computing system 500 may store initial and resulting order book objects 502 and 508 respectively. The exchange computing system may store initial PO book object 502 in memory. Upon receipt of an inbound message 506, which may cause the occurrence of an event that updates or changes book objects, the exchange computing system may modify book object 502, resulting in PO book object 508. Similarly, the exchange computing system may store initial ABV book object 504 in memory. Upon receipt of an inbound message 506, the exchange computing system may modify book object 504, resulting in a resulting ABV book object 510.

As discussed with reference to FIGS. 3A, 3B and 4, an order book, in one embodiment, may be implemented as a collection of queues, e.g., queues of Ask resting orders and Buy resting orders, for a financial product.

In one embodiment, the exchange computing system 500 may be configured so that any change to a book causes the generation of a message reporting the change. For example, changes to an order in the PO Book Object 502, or changes to a quantity associated with a value level represented by the ABV Book Object 504, may cause the generation of a PO Book message and/or an ABV Book message, respectively, that is published to data recipient computing systems via PO data feed 512 and/or ABV data feed 514, respectively.

Accordingly, in one embodiment, an exchange computing system 500 may include an order book module that maintains/stores, in a memory in communication with the order book module, different types of views or perspectives of the positions for a product, such as a Per Order book or a By Value book. The exchange computing system 500 may also include a data generation module that generates outbound messages if inbound messages cause the modification of any of the book objects stored in association with the order book module. For example, a data generation module may generate a Per Order format message whenever the Per Order Book Object is modified and/or may generate an Aggregated by Value format message whenever the Aggregated by Value Book Object is modified.

In one embodiment, a data recipient computing system that consumes, or reads, PO or ABV messages may apply the data in the received messages to a locally maintained copy of a PO or ABV book object, respectively. It should be understood that a copy locally maintained by a data recipient computing system is independent of the order book object maintained and utilized by the exchange computing system. Thus, a recipient computing system may maintain its own copy of book objects, and apply changes indicated by received messages, e.g., via data feeds, to the object in order to arrive at the most current or accurate state of the book object.

It should be appreciated that the types of outbound financial messages transmitted to data recipient computing systems dictate how the messages are consumed and interpreted by the recipient system. In one embodiment, different message types, e.g., PO messages and ABV messages, require different receiving systems, or recipient computing systems that are configured differently. It should be appreciated that it may be necessary for a recipient computing system to be specifically configured to receive and decipher specific message types, e.g., a data recipient computing system may need different configurations to receive different types of messages.

Figures 6A, 6B:
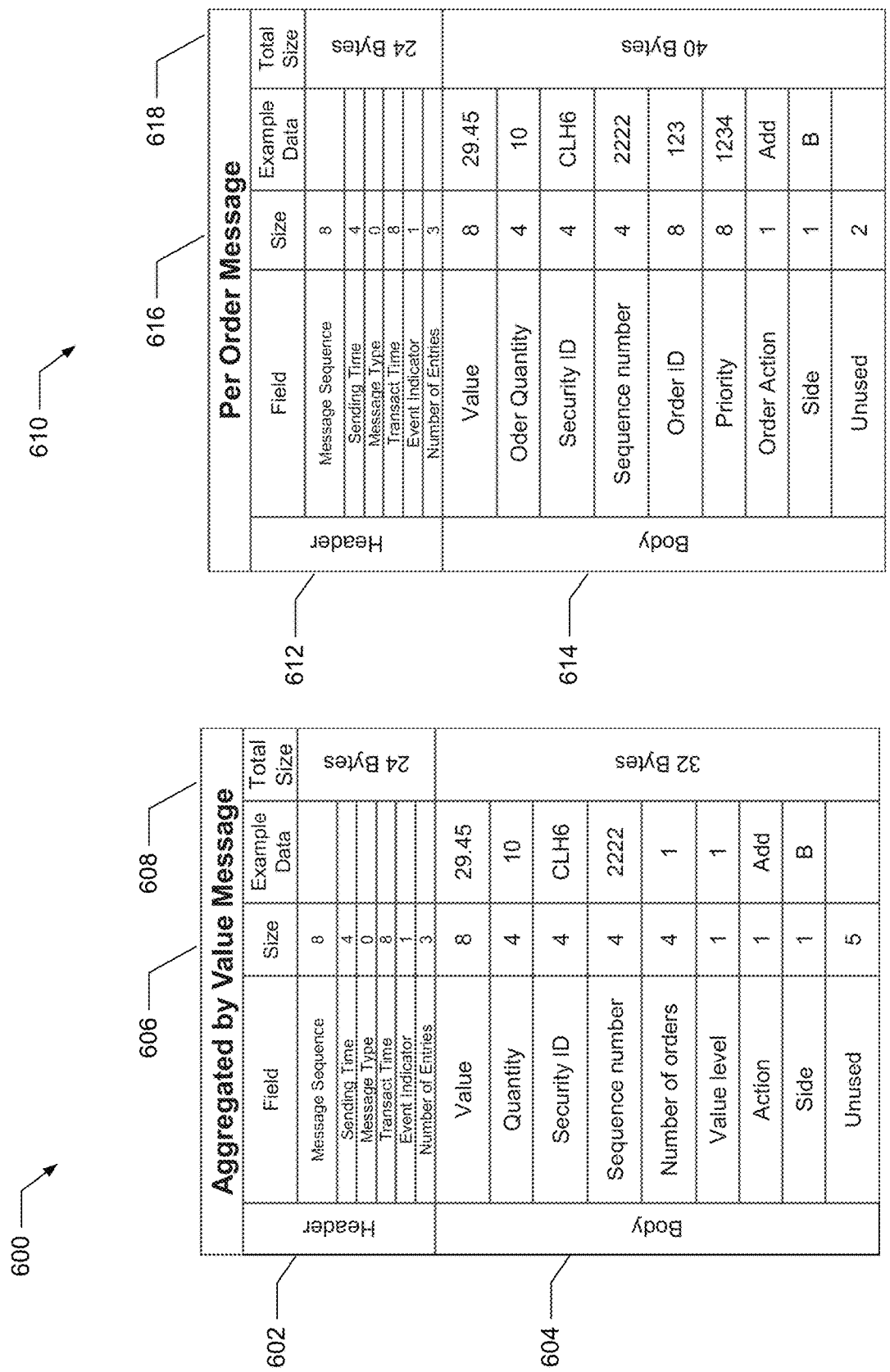
FIG. 6A illustrates an example Per Order object message.
FIG. 6B illustrates an example Aggregated by Value object message.

FIGS. 6A and 6B illustrate example message structures of different message types that may be generated by a data generation module and disseminated via data feeds by the exchange computing system to data recipient computing systems.

FIG. 6A illustrates an example ABV message 600, which includes information aggregated by value about a data object representing positions for a financial product. An example ABV message may include a header portion 602, which indicates a message sequence, sending time, message type, a transaction time, an event indicator, and the number of entries. The header portion 602 may be considered to provide or include general information about the message.

The ABV message 600 also includes a body portion 604 which indicates a value at which several orders have been aggregated in the ABV message, the quantity aggregated at the value, the subject security or product, a sequence number, the number of orders aggregated in the ABV message, the value level (e.g., first, second, etc.), the action to be performed on the associated ABV book data object, and a side (e.g., Buy or Sell). In particular, the example ABV message 600 body portion 604 indicates that the ABV book object includes an entry for Buying Security or Product CLH6 at a Price or Value 29.5 (which is the topmost or level 1 Value Level), which is associated with a Quantity of 10, and the Number of Orders is 1. If the exchange computing system subsequently receives an order to buy a quantity of 18 for the same security at the same price or value level, this order may then be added to the ABV book. The exchange computing system may generate a new ABV message (not shown) indicating that the ABV book object entry for Buying Security or Product CLH6 at a Price or Value 29.5 is now associated with a Quantity of 28 (10 plus 18), and the Number of Order is 2 (1 plus 1).

Column 606 indicates the size of each of the ABV message fields. Column 608 indicates the total sizes of the header portion 602 and body portion 604. As shown in FIG. 6A, the example ABV message is 56 bytes, namely, 24 bytes (header portion 602) plus 32 bytes (body portion 604).

In one embodiment, as may be understood in the art, message sizes are multiples of 8 bytes due to typical computer (both exchange computing system and data recipient computing system) architectural specifications. Thus, even though example ABV message body portion 604 includes 27 bytes of information, the body portion sizing is increased to the next multiple of 8, namely, 32 bytes.

FIG. 6B illustrates an example PO message 610, which conveys information about orders in a data object representing positions for a financial product. An example PO message may include a header portion 612, which, like ABV message header portion 602, indicates a message sequence, sending time, message type, a transaction time, an event indicator, and the number of entries, and may be considered to provide or include general information about the message.

The PO message 610 also includes a body portion 614 which indicates a value associated with a subject order represented in the PO message, the order quantity, the subject security or product, a sequence number, an order ID for the subject order, a priority for the subject order, the action to be performed on the associated PO hook data object, and a side (e.g., Buy or Sell). In particular, the example PO message 610 body portion 614 indicates that the subject order is Order ID 123, an order to Buy a Quantity of 10 of Security or Product CLH6 at Price or Value 29.45, having Priority 1234. If the exchange computing system subsequently receives a message from a trader computer to modify Order ID 123 to have a Quantity of 15, this new message would cause modification of the PO book data object. The exchange computing system may generate a new PO message (not shown) indicated that the PO book object entry for Order ID 123 is now associated with a Quantity of 15.

Column 616 indicates the size of each of the PO message fields. Column 618 indicates the total sizes of the header portion 612 and body portion 614. As shown in FIG. 6B, the example PO message is 64 bytes, namely, 24 bytes (header portion 612) plus 40 bytes (body portion 614). Even though example PO message body portion 614 includes 38 bytes of information, the body portion sizing is increased to the next multiple of 8, namely, 40 bytes, due to computing architectural specifications discussed herein.

It should be appreciated that messages, whether of a first type (e.g., ABV) or a second type (e.g., PO), may be generated responsive to book impacting events. The messages may be caused by an event that is associated with a single incoming order, such as a new order, an order cancelation, an order modification, etc. Alternatively, the messages may be caused by an event associated with multiple orders, such as a trade or match between multiple orders.

The same event may cause the generation of both ABV message 600 and PO message 610. In some cases, an event may cause only the generation of PO message 610. As discussed herein, match engine module 106 receives messages and performs actions according to the instructions contained therein. In one embodiment, the actions performed by match engine module 106 determine the events that cause the generation of data feed messages.

For example, if the match engine module determines that a received message matches with orders resting on the books, the exchange computing system may generate both PO messages and ABV messages describing the match event.

Or, if the match engine module determines that a received message does not match with any of the orders resting on the books, a new order may simply be added to the books. The addition of the new order would cause the generation of a PO message. If the newly added order is at a value level that impacts the ABV book data object, the exchange computing system (e.g., order book module 110 and/or data generation module 112) may additionally generate an ABV message.

In one embodiment, the exchange computing system may determine limit values (whether they be incoming limit orders, modifications of previous limit orders, or triggered limit values from a conditional order) and/or trade values (the value at which a quantity is actually matched or executed) associated with a message, depending on whether the message is fully matched, partially matched, or not matched at all.

In one embodiment, a match engine module may attempt to match a submitted value (e.g., a price included in an inbound electronic data transaction request message, or a triggered limit price from a stop order in a previously received electronic data transaction request message). In other words, values submitted to a match engine module may be values received via inbound messages (e.g., a limit price on a new incoming order, or a modification of a previous order), or recently triggered messages (e.g., a limit price in a stop order resting on the books that is triggered by a trade at the stop price).

In one embodiment, a stop order is not added to a PO book data object until the stop ordered is triggered, e.g., triggered by a trade at the stop price. If a stop ordered is triggered, e.g., changed to a limit order upon being triggered by a trade at the stop price, the new limit order is added to the PO book data object. The new limit order may additionally be added to the ABV book data object depending on the value associated with the limit order, e.g., depending on whether the value associated with the limit order is a value level that exists in the ABV book data object, or should be added to the ABV book data object.

The system may determine a trade value for each message, which may be the same or different than a submitted value. For example, a new incoming message may include an instruction to purchase 5 units of a product at a value of 7. Or, a conditional message may be triggered which includes an instruction to purchase 5 units of a product at a value of 7. In both cases (whether a new incoming message or a triggered conditional message), the submitted value may be considered to be 7. However, the system may determine that the 5 units (i.e., the submitted quantity) may all match with a resting order at a value of 4. Thus, the system concludes that the trade value (i.e., the match or execution value) is 4. It should be appreciated that the trade value may be the same as or "better than" (lower if buy order, higher if sell order) the submitted value.

PO and ABV messages may be published to data recipient computing systems via data feeds 512 and 514 as discussed in reference to FIG. 5. In scenarios that cause the generation of both PO and ABV messages, the respective messages would be published to data recipient computing systems via both data feeds 512 and 514.

Data feeds are typically configured to send a message type that can be deconstructed and/or interpreted by the recipient, e.g., a trader's computer that connects to an exchange computing system. The message structure is organized and structured according to the information contained therein, and the structures/computing systems receiving the message have to be configured to recognize and decipher the message. Thus, a messaging system may be understood to be a combination of a message generator, message feed, and message recipient working together to transmit the data contained therein.

If a data generator computing system, e.g., an exchange computing system, introduces a new data message type, or changes the characteristics or format of the message, the exchange computing system may implement a new data feed for sending the new message type. The data recipient computing system must then be configured to be able to accept the new data feed/data type. A data recipient computing system may need to be re-designed substantially to accept or consume new data, and existing systems and operational procedures may need to be modified and updated.

In some instances, the legacy (i.e., older) feed may still be faster, or optimized, for a small percentage of the incoming data. Thus, a data provider may maintain parallel data feeds (e.g., a 100% increase in required bandwidth) during a transition period, which can last a long time, e.g., a year. A parallel infrastructure with two feeds can be expensive to purchase and maintain. In one example application, the cost of deploying and maintaining the infrastructure for a parallel data feed at an exchange such as the CME is estimated to be $3 million per year.

For example, if an exchange computing system only publishes ABV messages, but plans to begin publishing PO messages, the exchange computing system may be required, in one embodiment, to set up a new data feed for publishing PO messages.

As illustrated in example ABV and PO messages 600 and 610, ABV or aggregated by value messages and PO or per order messages implemented by an exchange computing system may both be considered to report on, or provide a view of, the positions for a financial product. For example, ABV message 600 and PO message 610 both provide data regarding a financial product CLH6. The data provided in the two messages is different, but related. In some cases, the two messages may be caused by the same event. Or, the messages may be caused by different events. When ABV and PO messages are generated by the same events, the information may be considered to overlap. For example, an event that creates multiple order updates may affect both the ABV book object and the PO book object stored in the exchange computing system memory. In one embodiment, the data generation module of an exchange computing system generates a message (e.g., ABV or PO message) whenever the order book module reports or detects an update to a book object.

As can be seen in FIGS. 6A and 6B, some of the fields in the two messages may contain the same, or redundant, information.

In one embodiment, the header fields may always be the same size, e.g., 24 bytes, regardless of whether the message is an ABV message or a PO message. This is because the header fields 602 and 612 may be considered to contain information used to route and packet the information. In contract, the body portions 604 and 614 may be considered to include substantive order or value related information. However, even certain fields within body portions 604 and 614 may overlap, which may occur if the same events caused the generation of both ABV and PO messages. For example, the Value, Sequence Number, and Side fields within body portions 604 and 614 may contain the same information. The Quantity field in body portion 604 and Order Quantity field in body portion 614 may be related, but not identical, because in an ABV message, an order for a quantity of 10 may be aggregated with other existing orders. Said another way, if orders for a value already exist on the books, and an order for quantity is added, the ABV Quantity field will be higher than the PO Order Quantity field.

Thus, in specific scenarios as disclosed herein, information in ABV and PO messages may overlap.

Figure 7:
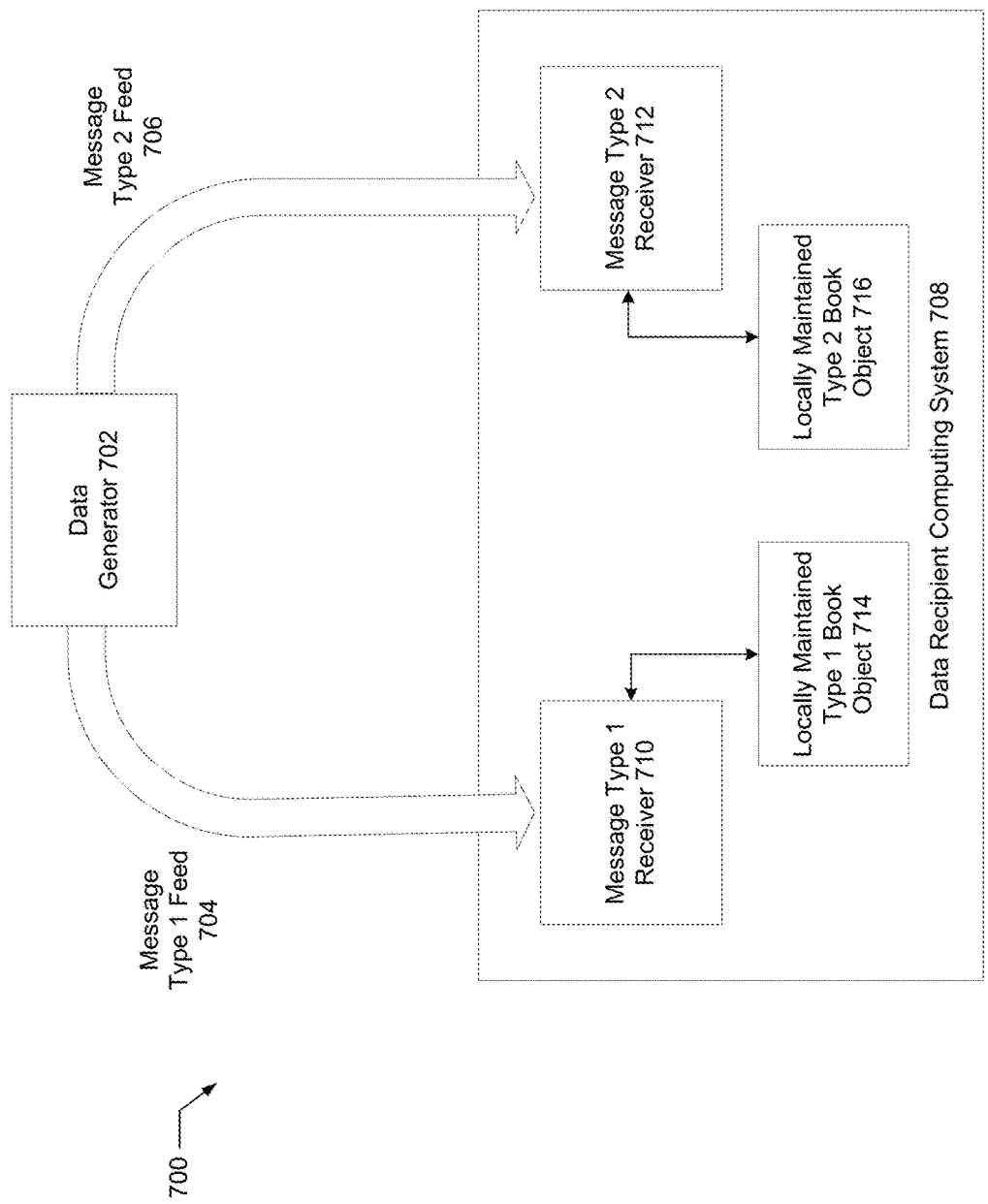
FIG. 7 illustrates an example data transaction processing system including a data recipient computing system subscribed to receive multiple data feeds from a data generator.

FIG. 7 illustrates an example data transaction processing system 700 including a data generator 702 that generates messages of different types to publish or send to different recipients, such as example data recipient computing system 708. The data generator 702 may be implemented in a data generation module 112. The data recipient computing system 708 includes different receivers 710 and 712 configured to receive and deconstruct messages of different types. For example, data recipient computing system 708 may generate messages of type 1 and type 2, and transmit the different type messages via feeds 704 and 706, respectively. Data feeds 704 and 706 may be related in that some inbound messages may cause the generation of messages of both data types.

System 700 thus may include two separate data feeds carrying data of different types that need to be separately consumed by a data recipient. A data recipient computing system may choose to receive, e.g., subscribe to, data of one type, or data of both types. An example situation where an exchange computing system including a data generator may publish two separate data feeds having messages of different types is if the exchange introduces a new data feed type but needs to maintain, or continue transmitting/publishing, an older or existing data feed during a transition period. Thus, an exchange computing system may decide to start publishing messages in a different data feed type, but may still need to publish messages in an existing data feed type because recipients may not be configured or ready to accept the new message type.

For example, message type 1 may be an ABV message, and message type 2 may be a PO message. Thus, the data generator 702 may be coupled to ABV and PO data feeds. As discussed herein, the two disparate feeds contain messages of different data formats, namely, ABV messages and PO messages, which can be received by specially configured recipient computing systems. The data recipient computing system 708 may include two different receivers to decipher the different messages received via the two different data feeds.

In one embodiment, the data recipient computing system may apply the contents of a received message to a locally maintained order book object. For example, Message Receiver 710 may be coupled to a Book Object 714, and Message Receiver 712 may be coupled to a Book Object 716. Book Objects 714 and 716 may be locally maintained at the data recipient computing system 708, and be modified and updated independently of book objects within the exchange computing system.

The disclosed system, in one embodiment, detects events that cause the generation of both PO and ABV type outbound messages, generates a single merged message, and then transmits the merged message over one feed that can be deciphered by data recipient computing systems with minimal configuration modification.

An exchange computing system, such as one implemented by the CME, may include a consolidation system which determines whether outbound messages can and should be generated in the disclosed consolidated data structure format. An exchange computing system may generate messages in response to events, as discussed herein. The messages may be indicative of the state of an environment. Or, the messages may be indicative of changes to be made to the state of an environment.

Figure 8:
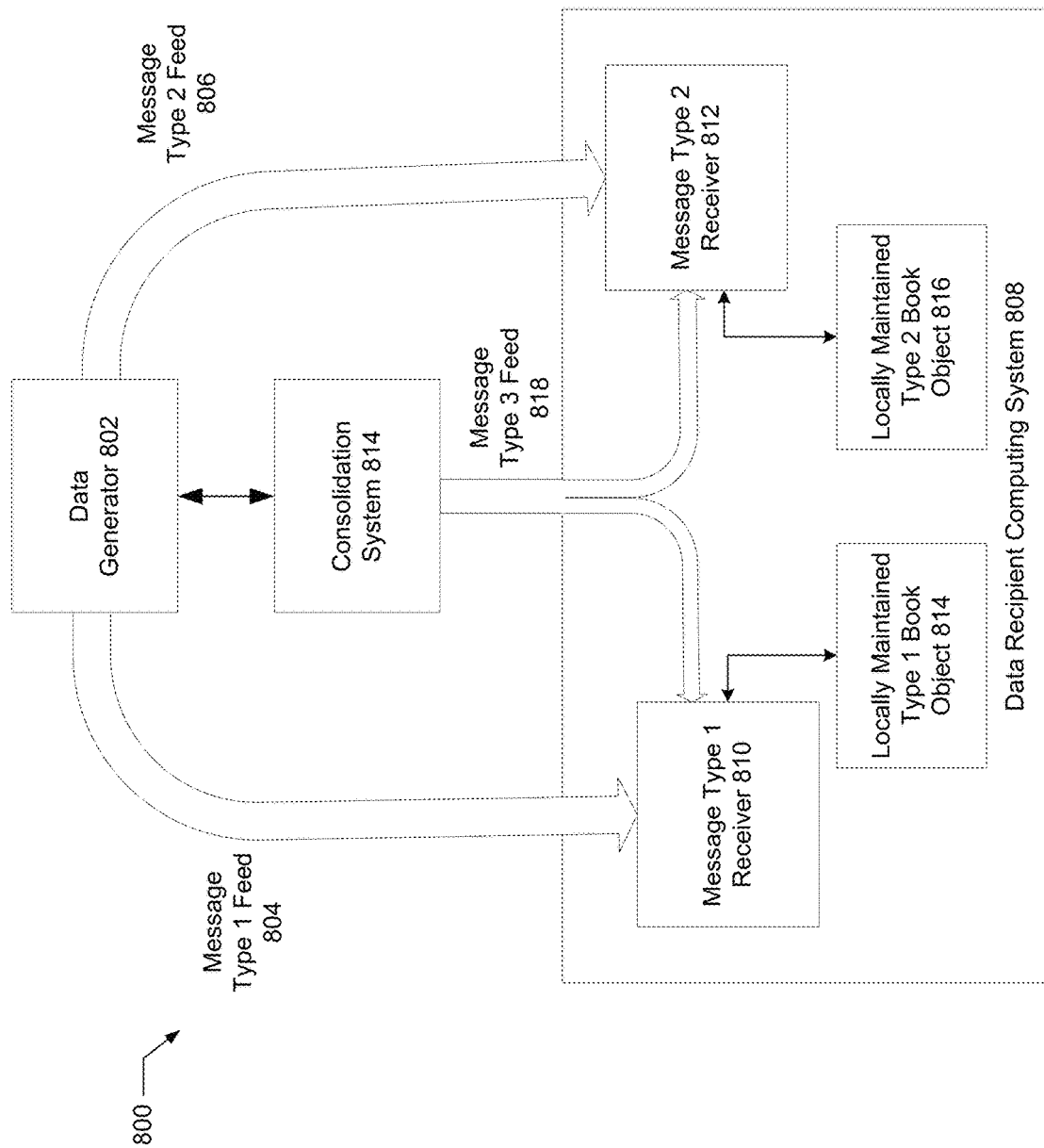
FIG. 8 illustrates an example data transaction processing system including data generator and a consolidation system in communication with a data recipient computing system.

As shown in FIG. 8, a system 800 may include a consolidation system 814 that selectively combines message types 1 and 2 (e.g., PO and ABV messages) to generate a new message type 3, which is published or transmitted to data recipient computing system 308 via message type 3 feed 818. In particular, consolidation system 814 is in communication with data generator 802 and identifies certain events that can be more efficiently and accurately communicated via the new message type 3 (e.g., a consolidated message), as discussed in additional detail herein. Data recipient computing system 308 may select to receive, or subscribe to, message type 3 feed 818.

The data recipient computing system 308 may be configured to route messages from data feed 818 to one or both of receivers 810 and 812. Each of receivers 810 and 812 may be configured to parse, for example, messages of type 3 and read only relevant information, e.g., information relevant to that particular receiver. For example, message type 1 receiver 810 may read just the portion of message type 3 that is relevant to message type 1. Similarly, message type 2 receiver 812 may read just the portion of message type 3 that is relevant to message type 2.

In one embodiment, a consolidated message combining information from a first and second message may include the same header as would have been present in one of the first or second message.

In one embodiment, the consolidation system merges data that has been generated by the data generation module into one consolidated message. For example, the consolidated message may include data that has been generated by the data generation module based on two different objects. For example, the data generation module generates data relevant to each of the data objects, e.g., PO data object and the ABV data object. The consolidation system then determines whether the generated data should be consolidated in one consolidated message.

For example, an event may cause (i) modification to a first data object, which results in the generation of first data specific to the first data object and second data not specific to the first data object, and (ii) modification to a second data object, which results in the generation of third data specific to the second data object and fourth data not specific to the second data object. The consolidation system, in one embodiment, may selectively determine to generate a consolidated message including the first, second and third data. Or, the consolidation system may determine to generate a consolidated message including the first, third and fourth data. In other words, the consolidation system reduces processing and transmission of data by avoiding sending one of the second data or fourth data, because the second and fourth data may be redundant.

Referring back to FIGS. 6A and 6B, an example of data that is not specific to the PO or the ABV object is the Value data 29.45, because that same data appears in both PO and ABV messages 600 and 610 respectively, and is accordingly not specific to, or uniquely found in, either of the messages. Similarly, Security ID data CLH6 is also not specific to either message, because it appears in both. An example of data that is specific to the ABV message 600 is the Number of Orders data 1, because that same data does not appear in the PO message 610.

It should accordingly be appreciated that the consolidation system avoids or eliminates sending information in certain state environments or scenarios. Detecting environments where information or data can be eliminated from messages improves the functioning of an exchange computing system by reducing data that needs to be published to data recipient computing systems over data feeds.

FIG. 9 illustrates an example consolidated message 900 generated by a data generation module. Consolidated message 900 in one embodiment combines information published via two different messages, e.g., an ABV message and a PO message. Example consolidated message 900 may include a header portion 902, which, like ABV message header portion 602 and PO message header portion 612, indicates a message sequence, sending time, message type, a transaction time, an event indicator, and the number of entries, and may be considered to provide or include general information about the message.

The consolidated message 900 also includes a body portion 904, which indicates both a value at which orders have been aggregated and a value associated with a subject order discussed below, the quantity aggregated at the value, the subject security or product, a sequence number, the number of orders aggregated in the message, the value level (e.g., first, second, etc.), the action to be performed on the associated book data object, a side (e.g., Buy or Sell), an action to be performed on an associated PO book data object, the subject order quantity, an order ID for the subject order, and a priority for the subject order.

For example, consolidated message 900 consolidates the information illustrated in ABV message 600 and PO message 610. Column 906 indicates the size of each of the consolidated message fields. Column 908 indicates the total sizes of the header portion 902 and body portion 904. As shown in FIG. 9, the example consolidated message is 72 bytes, namely, 24 bytes (header portion 902) plus 48 bytes (body portion 904). Even though example consolidated message body portion 904 includes 45 bytes of information, the body portion sizing is increased to the next multiple of 8, namely, 48 bytes, due to computing architectural specifications discussed herein.

It should be appreciated that 72 byte consolidated message includes all of the information from both the 56 byte ABV message and the 64 byte PO message. Thus, an exchange computing system that transmits ABV data, and intends to begin transmitting PO data in its own separate data feed, would have to at least double the amount of data feed bandwidth to support the additional PO data feed. In other words, transmitting PO data simultaneously with ABV data would typically require a parallel data feed infrastructure, and its attendant maintenance and timing control costs.

In contrast, implementing the disclosed consolidation system, which selectively generates a consolidated message that is backwards-compatible for all data recipient computing systems, would only increase the message size by approximately 8 or 16 bytes (e.g., 56 byte ABV message or 64 byte PO message compared to 70 byte consolidated message).

It should be appreciated that the data transmitted via consolidated message 900 may be presented in a different order, or grouped together in different ways, without altering the overall content that is transmitted to a data recipient computing system. For example, some of the ordering of the fields may be changed, or repeating information may be organized in different ways. A data recipient computing system could be appropriately configured to read and consume a modified version of consolidated message 900.

In one embodiment, the consolidated message 900 may be configured to contain all data relating to one or more relationships between two data objects whose modifications are contained in the consolidated message 900. For example, a consolidated message 900 may include data reflecting all modifications to two different data objects that present two different views of a single financial instrument.

In one embodiment, the consolidated message is configured to first provide all the data relevant to one feed first, and then provide all the data relevant to the second feed. For example, as shown in FIG. 9, a first, continuous portion of the body of the consolidated message may include all of the data 910 from one of the message types, followed by a second, continuous portion of the body of the consolidated message that includes all of the data 912 from the other of the message types.

In one embodiment, the consolidated message is backwards compatible so that receivers of either message type can read the consolidated message. For example, although a receiver 810 configured to read message type 1 may not be able to read message type 2, and a receiver 812 configured to read message type 2 may not be able to read message type 1, either receiver 810 or 812 may be able to read the relevant portions of the consolidated message.

For example, the consolidated message may include all of the ABV data, i.e., all of the data that would typically be included in an ABV message, such as ABV message 600, in a first continuous block or portion of the consolidated message that is read first by the data recipient computing system. The consolidated message may next include all of the PO specific data, i.e., all of the data that would typically be included in a PO message, such as PO message 610, minus any data already represented in the first continuous block of the consolidated message, in a second continuous block or portion of the consolidated message that is read second by the data recipient computing system.

In one embodiment, a consolidated message data structure consolidating two original messages may include all of the fields of the two original messages, except for any redundant or repeated fields. The consolidated message data structure may be configured to first include all of the fields of one of the messages, and then include any additional fields from the other of the two messages not yet included in the consolidated message, minus any redundant or repeated fields.

Thus, a data recipient computing system configured to read just one data feed, e.g., the information available in portion 910 of body portion 904, could be simply instructed by exchange computing system to simply ignore the other data feed, e.g., information available in portion 912 of body portion 904. If that data recipient computing system decides to incorporate the second data feed, or begin reading the second data feed, the data recipient computing system can begin to read information available in portion 912 of body portion 904.

In one embodiment, a data recipient computing system may be configured to transition its operations from using a first data message type, e.g., type 1, to a second data message type, e.g., type 2. Instead of modifying its receivers to read data of different types, the data recipient computing system could continue to receive data from the consolidation system and transition its operations by simply reading a different portion of the consolidated message.

A data recipient computing system may be configured to only accept or read messages of a predetermined size, e.g., 56 bytes, or the size of message 600 in FIG. 6A. If the data recipient computing system receives a message that is longer than the predetermined size, e.g., 72 bytes, or the size of message 900 in FIG. 9, the data recipient computing system may only read the first block of the consolidated message it can read, namely, the predetermined size of 56 bytes. Thus, a data recipient computing system configured to accept, read and consume ABV messages of size 56 bytes could begin accepting, reading and consuming consolidated messages of size 72 bytes without any modification. Subsequently, if the operators or administrators of the data recipient computing system desired to accept, read and consume PO messages, the data recipient computing system could be re-configured to read and consume PO data, e.g., the 64 bytes illustrated in FIG. 6B, from within the consolidated message.

The consolidation system may also decrease the overall message size and transmission data volume by minimizing the amount of unused space within byte-aligned consolidated messages. As discussed herein, messages may be sized to be multiple of 8 bytes, e.g., due to computer architectural specifications. Thus, messages may include some unused portions. In one embodiment, an ABV message and a PO message may each include unused portions. The consolidation system may generate a consolidated message that includes an unused portion that is smaller than the collective unused portions of constituent PO and ABV messages.

For example, ABV message 600 in FIG. 6A includes an unused portion of 5 bytes. PO message 610 in FIG. 6B includes an unused portion of 2 bytes. Thus, the collective unused portion of ABV and PO messages 600 and 610 is 7 bytes. However, consolidated message 900 in FIG. 9 generated by the consolidation system includes an unused portion of only 3 bytes, even though consolidated message 900 includes all of the data represented by messages 600 and 610.

Figure 2:
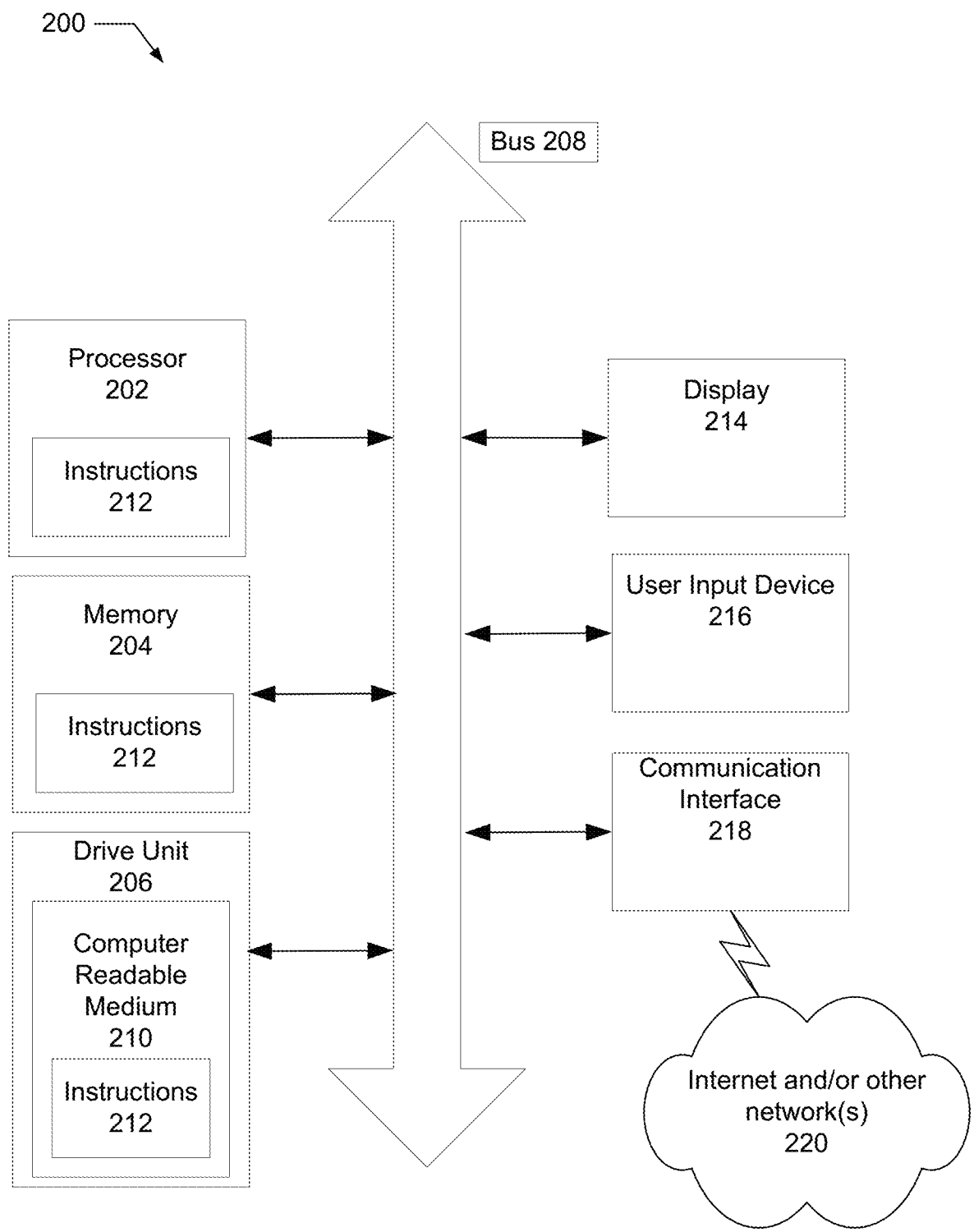
FIG. 2 depicts an illustrative embodiment of a general computer system for use with the disclosed embodiments.
Figure 10A:
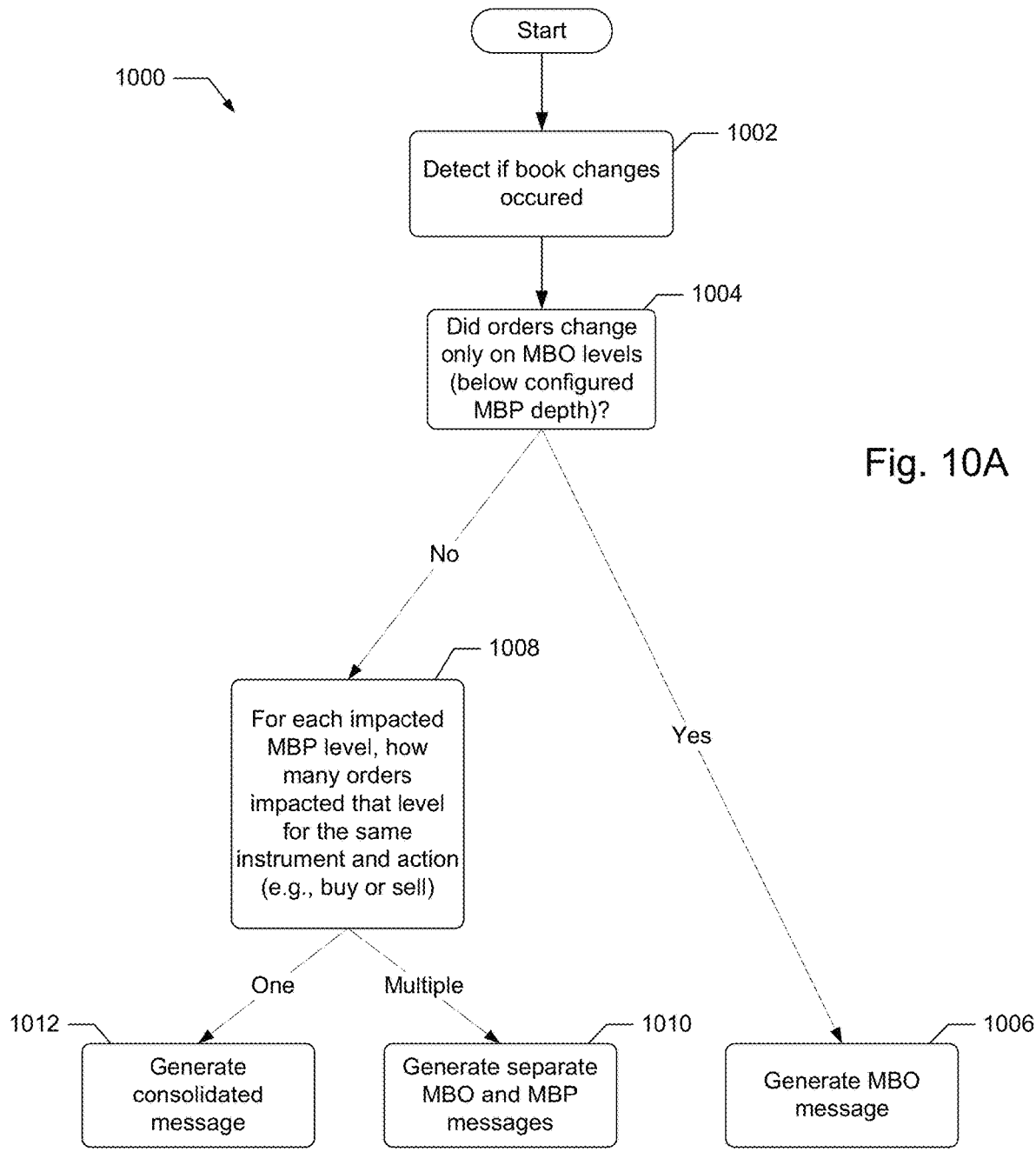
FIG. 10A depicts an example flowchart for implementing a consolidation system in accordance with the disclosed embodiments.

FIG. 10A illustrates an example flowchart 1000 indicating an example method of implementing a consolidation system, as may be implemented with computer devices and computer networks, such as those described with respect to FIGS. 1 and 2. Embodiments may involve all, more or fewer actions indicated by the blocks of FIG. 10A. The actions may be performed in the order or sequence shown or in a different sequence. In one embodiment, the steps of FIG. 10A may be carried out by data generation module 112.

The process begins when the consolidation system detects that the exchange computing system has generated data in response to processing an inbound message, as shown in block 1002. The data may be generated in response to an event within the match engine module. For example, processing an inbound message by a match engine module may cause modifications to one or more book objects stored in the exchange computing system. The modifications may then be reported by the data generation module.

If the exchange computing system, e.g., data generation module, has generated data which data recipient computing systems have subscribed to receive, the system determines if the modifications impact only orders represented by a PO data object, or also values represented by an ABV data object, as shown in block 1004. If the orders only affect the PO data object, the data generation module may generate a PO message, as shown in block 1006, and publish the PO message via a PO data feed.

If however, the orders affect both the PO data object and the ABV data object, the exchange computing system determines, for each impacted ABV value, how many orders impacted that value for the same instrument and action (e.g., buy or sell), as shown in block 1008. If multiple orders impacted the ABV value, the data generation module may generate a PO message and an ABV message, as shown in block 1010, and publish the PO and ABV messages via two different PO and ABV data feeds, respectively. If however only one order impacted the ABV value, the data generation module may generate a consolidated message, as shown in block 1012, and publish the consolidated message via a consolidated data feed.

Figure 10B:
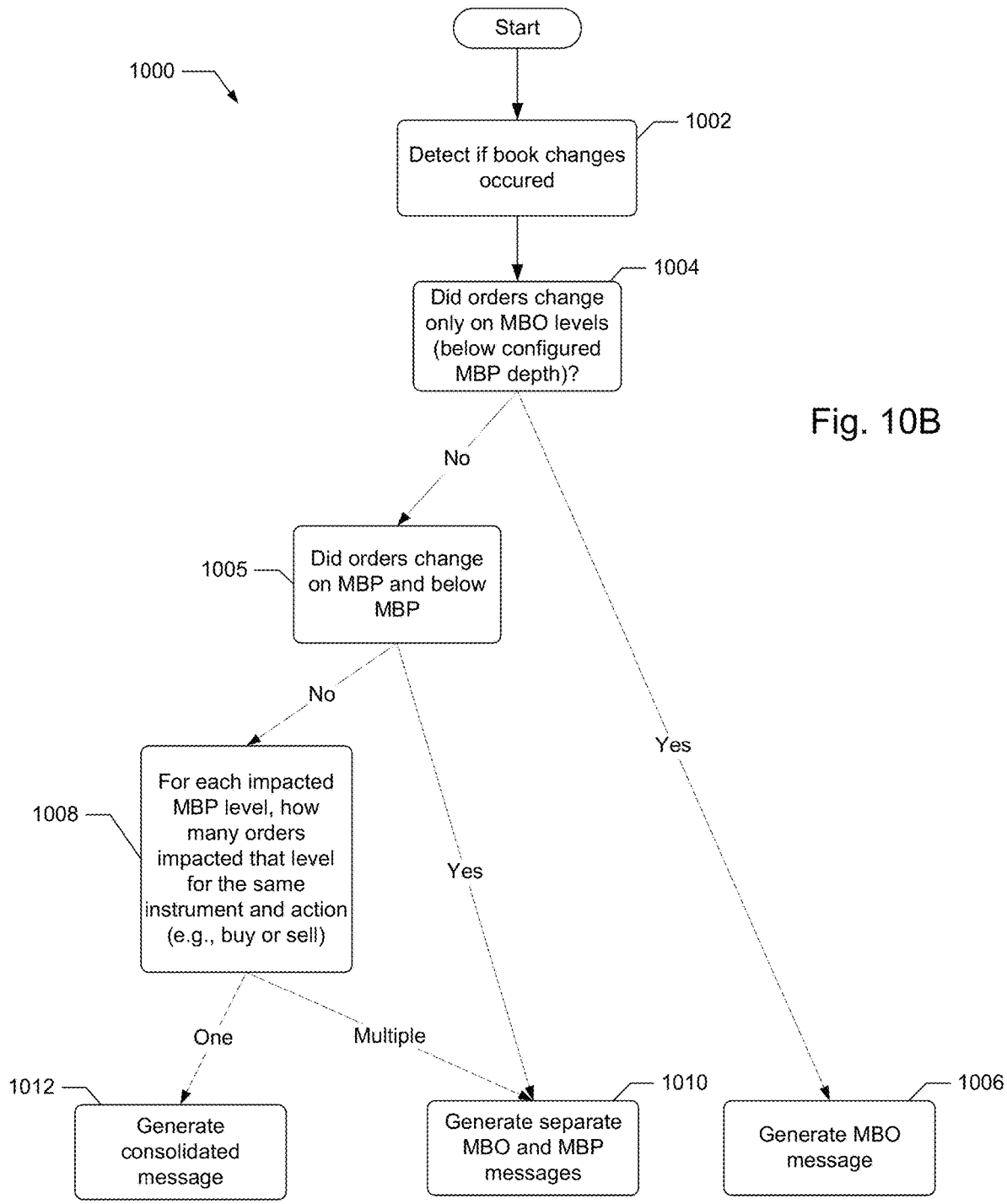
FIG. 10B depicts another example flowchart for implementing a consolidation system in accordance with the disclosed embodiments.

The exchange computing system may alternatively implement an alternative example flowchart illustrated in FIG. 10B. The steps of FIG. 10B are similar to the steps of FIG. 10A, except that FIG. 10B additionally includes step 1005, during which the data generation module determines whether orders impacted value levels within the ABV data object as well as value levels outside of the ABV data object, and if so, generates a PO message and an AB V message, as shown in block 1010, and publishes the PO and ABV messages via two different PO and ABV data feeds, respectively.

Figure 10C:
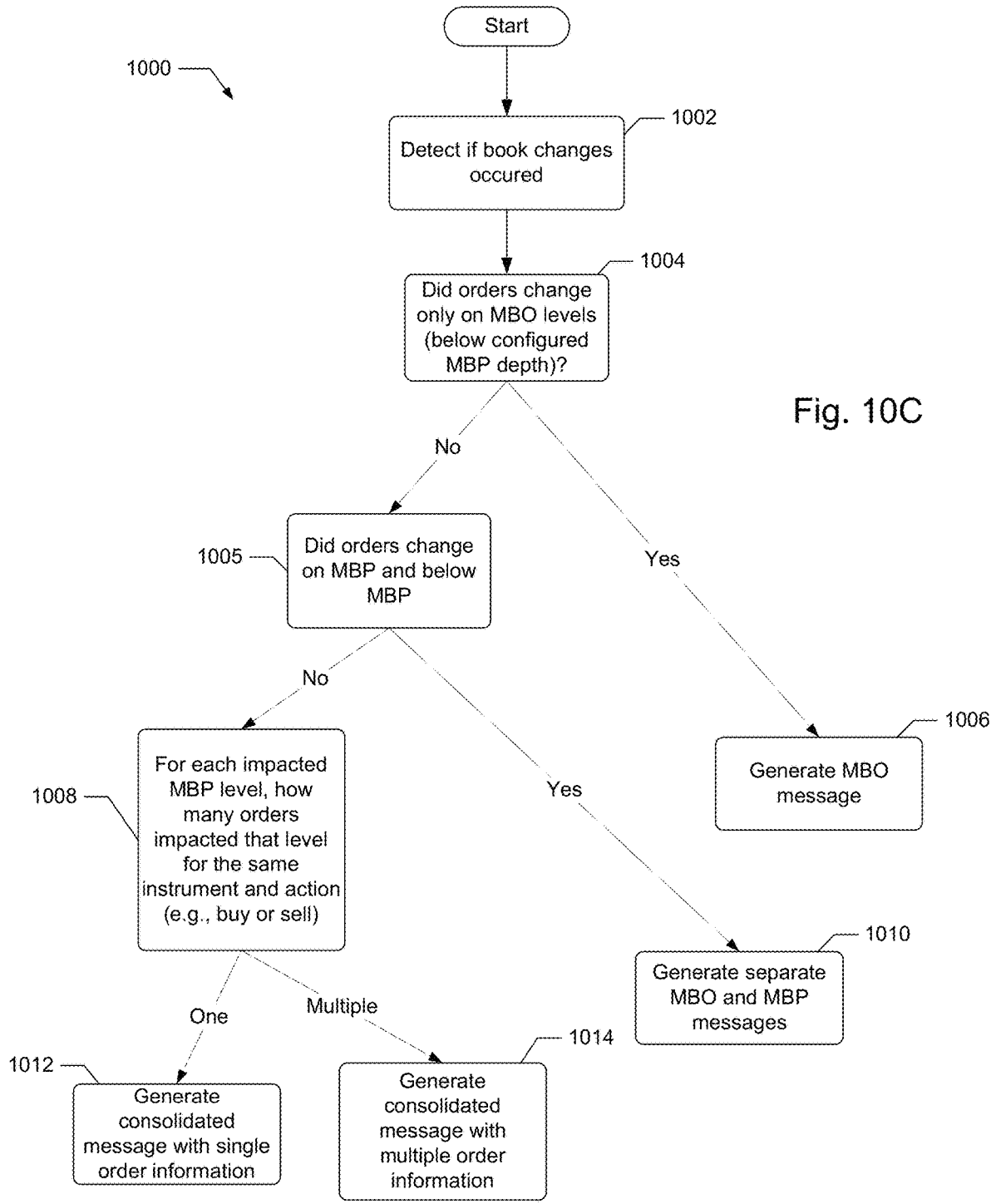
FIG. 10C depicts another example flowchart for implementing a consolidation system in accordance with the disclosed embodiments.

The exchange computing system may alternatively implement an alternative example flowchart illustrated in FIG. 10C. The steps of FIG. 10C are similar to the steps of FIG. 10B, except that FIG. 10C includes a modification to step 1012 and additionally includes step 1014. In FIG. 10C, if, for each ABV level, only one order impacts that ABV level, the data generation module generates a consolidated message with the single order information, but if multiple orders impacted that ABV level, the data generation module generates a consolidated message with multiple order information, as shown in blocks 1008, 1012 and 1014. For example, a consolidated message may include information about more than one order that impacted a same unique value level. FIG. 10D illustrates an example consolidated message 1050 with multi-order data. In particular, consolidated message 1050 includes information for two different orders, namely, portions 1052 and 1054. Portions 1052 and 1054 include information such as Order Action, Order Quantity, Order ID, Priority and Reference to Value Entry for two different orders, e.g., Order ID 123 in portion 1052 and Order 456 in portion 1054.

In one embodiment, the consolidation system (i) generates a consolidated message when an event causes a modification to one unique value level in the ABV book object and a modification to only one unique order in the PO book object, and also (ii) generates a consolidated message when an event causes modifications to many unique value levels in the ABV book object but a modification to only one unique order in the PO book object, but (iii) generates two different messages, namely, an ABV message and a PO message, if an event causes modifications to many unique orders in the PO book object but a modification to only one unique value level in the ABV book object, the exchange computing system. For example, multiple orders may impact the same value level if, for example, an aggressing order trades with or matches with multiple resting (e.g., pending) orders at the same value, which would generate one ABV message with a value level update, but would also generate many associated PO messages reporting updates to the multiple resting orders that traded therewith.

Figure 11:
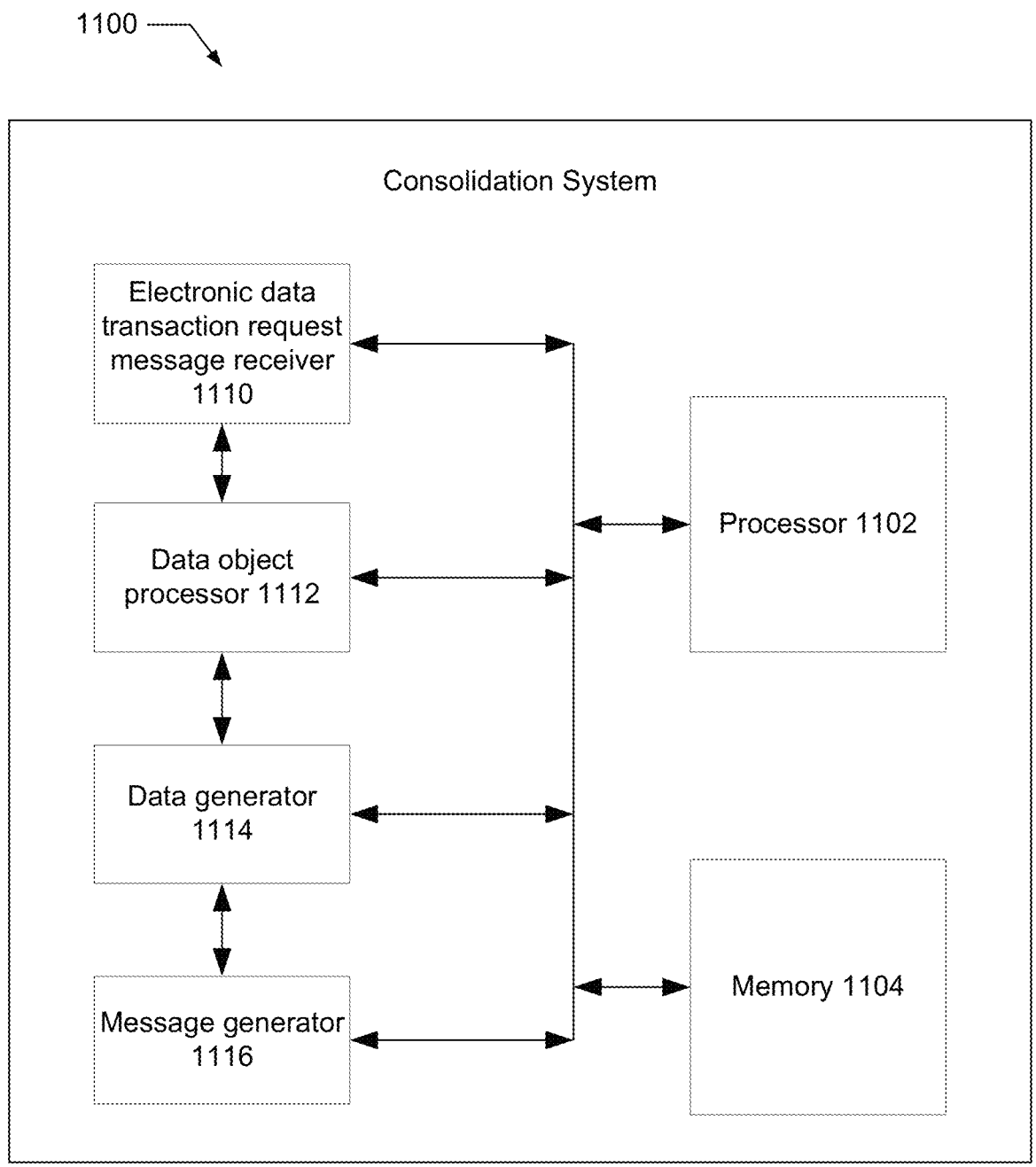
FIG. 11 depicts a block diagram of an exemplary implementation of a consolidation system in accordance with the disclosed embodiments.

FIG. 11 depicts a block diagram of a system 1100 for consolidating messages for a financial instrument order book, which in an exemplary implementation, is implemented as part of the data generation module 112 of the exchange computer system 100 described above.

The system 1100 includes a processor 1102 and a memory 1104 coupled therewith which may be implemented as a processor 202 and memory 204 as described with respect to FIG. 2.

In one embodiment, the system 1100 is coupled with the order books module 110 described above and monitors the relevant parameters of the order book maintained for the product. It will be appreciated that the system 1100 may be coupled to other modules of the exchange computer system 110 so as to have access to the relevant parameters as described herein and initiate the requisite actions as further described. The disclosed embodiments may be implemented separately for each market/order book to be monitored, such as a separate process or thread, or may be implemented as a single system for all markets/order books to be monitored thereby.

The system 1100 further includes an electronic data transaction request message receiver 1110 stored in the memory 1104 and executable by the processor 1102 to cause the processor 1102 to receive and/or analyze electronic data transaction request messages submitted, for example, by users of an exchange computing system implementing the disclosed consolidation system.

The system 1100 further includes a data object processor coupled with the electronic data transaction request message receiver for modifying data objects stored in the memory 1104. The data objects may include a first data object storing data about a plurality of unique orders, each unique order associated with a value and an order quantity, and a second data object storing data about a plurality of unique values, each unique value associated with an aggregate quantity and a number of orders aggregated. In one embodiment, the multiple data objects may provide different views of information from a same common database.

The system 1100 further includes a data generator coupled with the data object processor which, if the first data object has been modified and the second data object has not been modified, generates data indicating the modification to the first data object, and if a unique order of the first data object and the second data object have been modified, generates data indicating the modification to the unique order of the first data object and generates data indicating the modification to the second data object.

The system 1100 further includes a message generator coupled with the data generator which, if the first data object has been modified and the second data object has not been modified, generates a first message including the data indicating the modification to the first data object, and if a unique order of the first data object and the second data object have been modified, generates a consolidated message including the data indicating the modifications to the unique order of the first data object and the second data object.

EXAMPLE SCENARIOS

The following example scenarios discuss exemplary operation of an exchange computing system implementing the consolidation system.
Scenario 1—New Limit Order on MBP Level (MBP Add+ MBO Add)
Description:
A new limit bid order is accepted and added to the first level of the book, since there are no resting bid orders.
Given:
<Instrument> group is in <Open>
MBO and MBP Order Books in memory are empty.
When:
A new bid order Qty=10 and Limit Price=1000 is accepted and booked.
Then:
  Final Order Book
Order is added to Bid side level 1 at Limit Price.

| MBO Order book in memory is: | | | | | | | | |
|---|---|---|---|---|---|---|---|---|
| MD Order Priority | Bid OrderID | BookQuantity | BookPrice | Order Pos | Book Price | BookQuantity | Ask OrderID | MD Order Priority |
| 723654 | 111 | 10 | 1000 | 1 | | | | |
| | | | | 2 | | | | |

| 1. MBP Book: | | | | | |
|---|---|---|---|---|---|
| Bid | | | | | Ask |
| NumOfOrders | Quantity | Price | PriceLevel | Quantity | NumOfOrders |
| 1 | 10 | 1000 | 1 | | |

Market Data FIX Messages generated:
The consolidation system generates a consolidated message:
35=X, Tag 60 TransactTime=UTCTimestamp, Tag 5799 MatchEventIndicator=10000100, Tag 268 NoMDEntries=1
→279=0 269=0 48=<instrument>83=1 271=10 270=1000 346=1 1023=1
Tag 37705 NoOrderIDEntries=1
→Tag 37 OrderID=111, Tag 37707 MDOrderPriority=723654, Tag 37707 MDDisplayQty=10, Tag 37708 OrderUpdateAction=0, Tag 9633 RefID=1
Exchange computing system may generate separate MBO and MBP messages:
MBO Message:
35=X Tag 60 TransactTime=UTCTimestampTag 5799 MatchEventIndicator=00000100 Tag 268 NoMDEntries=1
→Tag 279 MDUpdateAction=0 (Add), Tag 37 OrderID=111, Tag 37707 MDOrderPriority=723654, Tag 270 MDEntryPx=1000, Tag 37706 MDDisplayQty=10, Tag 48 SecurityID=<instrument>, Tag 269 MDEntryType=0 (Bid)
MBP Message:
35=X Tag 60 TransactTime=UTCTimestamp, Tag 5799 MatchEventIndicator=10000100 Tag 268 NoMDEntries=1
→279=0 269=0 48=<instrument>83=1 270=1000 271=10 346=1 1023=1
Scenario 2—New Limit Order Below MBP Levels (MBO Add)
A new limit bid order is accepted and added to the book. There are multiple bid orders resting on the book for the same instrument. The new order is past the 10 levels displayed in the MBP Book.
Given:
<Instrument> group is in <Open>

| MBO Order book in memory is: | | | | | | | | |
|---|---|---|---|---|---|---|---|---|
| MD Order Priority | Bid OrderID | Book Quantity | Book Price | Order Pos | Book Price | Book Quantity | Ask OrderID | MD Order Priority |
| 723654 | 111 | 10 | 1000 | 1 | | | | |
| 723699 | 759 | 120 | 1000 | 2 | | | | |
| 724123 | 901 | 50 | 980 | 3 | | | | |
| 722598 | 959 | 7 | 970 | 4 | | | | |
| 725111 | 987 | 25 | 960 | 5 | | | | |
| 722095 | 555 | 300 | 950 | 6 | | | | |
| 722511 | 721 | 100 | 950 | 7 | | | | |
| 724002 | 844 | 35 | 940 | 8 | | | | |
| 724169 | 888 | 50 | 930 | 9 | | | | |
| 723849 | 365 | 10 | 910 | 10 | | | | |
| 724731 | 677 | 5 | 900 | 11 | | | | |

-continued

| MBO Order book in memory is: | | | | | | | | |
|---|---|---|---|---|---|---|---|---|
| MD Order Priority | Bid OrderID | Book Quantity | Book Price | Order Pos | Book Price | Book Quantity | Ask OrderID | MD Order Priority |
| 723373 | 689 | 75 | 880 | 12 | | | | |
| 724815 | 702 | 40 | 870 | 13 | | | | |
| 722962 | 291 | 200 | 800 | 14 | | | | |

| MBP Book: | | | | | |
|---|---|---|---|---|---|
| Bid | | | | | Ask |
| NumOfOrders | Quantity | Price | Price Level | Quantity | NumOfOrders |
| 2 | 130 | 1000 | 1 | | |
| 1 | 50 | 980 | 2 | | |
| 1 | 7 | 970 | 3 | | |
| 1 | 25 | 960 | 4 | | |
| 2 | 400 | 950 | 5 | | |
| 1 | 35 | 940 | 6 | | |
| 1 | 50 | 930 | 7 | | |
| 1 | 10 | 910 | 8 | | |

MBP Book:

| Bid NumOfOrders | Quantity | Price | Price Level | Quantity | Ask NumOfOrders |
|---|---|---|---|---|---|
| 1 | 5 | 900 | 9 | | |
| 1 | 75 | 880 | 10 | | |

When:

A new bid order Qty=20 and Limit Price=850 is accepted and booked.

Then:

Final Order Books

MBO:

Order is added to Bid side level 14 at Limit Price=850.

MBO Order book in memory is:

| MD Order Priority | Bid OrderID | Book Quantity | Book Price | Order Pos | Book Price | Book Quantity | Ask OrderID | MD Order Priority |
|---|---|---|---|---|---|---|---|---|
| 723654 | 111 | 10 | 1000 | 1 | | | | |
| 723699 | 759 | 120 | 1000 | 2 | | | | |
| 724123 | 901 | 50 | 980 | 3 | | | | |
| 722598 | 959 | 7 | 970 | 4 | | | | |
| 725111 | 987 | 25 | 960 | 5 | | | | |
| 722095 | 555 | 300 | 950 | 6 | | | | |
| 722511 | 721 | 100 | 950 | 7 | | | | |
| 724002 | 844 | 35 | 940 | 8 | | | | |
| 724169 | 888 | 50 | 930 | 9 | | | | |
| 723849 | 365 | 10 | 910 | 10 | | | | |
| 724731 | 677 | 5 | 900 | 11 | | | | |
| 723373 | 689 | 75 | 880 | 12 | | | | |
| 724815 | 702 | 40 | 870 | 13 | | | | |
| 723822 | 890 | 20 | 850 | 14 | | | | |
| 722962 | 291 | 200 | 800 | 15 | | | | |

MBP:

The new order is below the 10 levels that are disseminated to customers, therefore there are no changes to the MBP book.

MBP Order book is:

| Bid NumOfOrders | Quantity | Price | PriceLevel | Quantity | Ask NumOfOrders |
|---|---|---|---|---|---|
| 2 | 130 | 1000 | 1 | | |
| 1 | 50 | 980 | 2 | | |
| 1 | 7 | 970 | 3 | | |
| 1 | 25 | 960 | 4 | | |
| 2 | 400 | 950 | 5 | | |
| 1 | 35 | 940 | 6 | | |
| 1 | 50 | 930 | 7 | | |
| 1 | 10 | 910 | 8 | | |
| 1 | 5 | 900 | 9 | | |
| 1 | 75 | 880 | 10 | | |

Market Data FIX Messages Generated:

MBO Message:

35=X Tag 60 TransactTime=UTCTimestamp, Tag 5799 MatchEventIndicator=10000100, Tag 268 NoMDEntries=1 →Tag 279 MDUpdateAction=0 (Add), Tag 37 OrderID=890, Tag 37707 MDOrderPriority=723822, Tag 270 MDEntryPx=850, Tag 37706 MDDisplayQty=20, Tag 48 SecurityID=<instrument>, Tag 269 MDEntryType=0 (Bid)

MBP Message:

No message will be generated since the order is past the 10 levels that are communicated to customers.

Scenario 3—Modify Qty of Resting Order MBP Levels (MBP & MBO Updates)

The quantity of a resting order within the 10 MBP Levels is increased from 30 to 50.

The order will lose priority in the book.

Given:

<Instrument> group is in <Open>

MBO Order book in memory is:

| MD Order Priority | Bid OrderID | BookQuantity | BookPrice | Order Pos | Book Price | BookQuantity | Ask OrderID | MD Order Priority |
|---|---|---|---|---|---|---|---|---|
| 723654 | 111 | 10 | 1000 | 1 | | | | |
| 723699 | 759 | 120 | 1000 | 2 | | | | |
| 724123 | 901 | 50 | 980 | 3 | | | | |
| 722598 | 959 | 7 | 970 | 4 | | | | |
| 725111 | 987 | 25 | 960 | 5 | | | | |
| 722095 | 555 | 30 | 950 | 6 | | | | |
| 722511 | 721 | 100 | 950 | 7 | | | | |
| 724002 | 844 | 35 | 940 | 8 | | | | |
| 724169 | 888 | 50 | 930 | 9 | | | | |
| 723849 | 365 | 10 | 910 | 10 | | | | |
| 724731 | 677 | 5 | 900 | 11 | | | | |
| 723373 | 689 | 75 | 880 | 12 | | | | |
| 724815 | 702 | 40 | 870 | 13 | | | | |
| 723822 | 890 | 20 | 850 | 14 | | | | |

MBP Book:

| Bid NumOfOrders | Quantity | Price | PriceLevel | Quantity | Ask NumOfOrders |
|---|---|---|---|---|---|
| 2 | 130 | 1000 | 1 | | |
| 1 | 50 | 980 | 2 | | |
| 1 | 7 | 970 | 3 | | |
| 1 | 25 | 960 | 4 | | |
| 2 | 130 | 950 | 5 | | |
| 1 | 35 | 940 | 6 | | |
| 1 | 50 | 930 | 7 | | |
| 1 | 10 | 910 | 8 | | |
| 1 | 5 | 900 | 9 | | |
| 1 | 75 | 880 | 10 | | |

When:
OrderID 555 quantity is increased from 30 to 50.
Then:
Final Order Books
MBO:
Order quantity is increased from 30 to 50. The order loses priority in the book, and moves from level 6 to level 7.

MBO Order book in memory is:

| MD Order Priority | Bid OrderID | BookQuantity | BookPrice | Order Pos | Book Price | BookQuantity | Ask OrderID | MD Order Priority |
|---|---|---|---|---|---|---|---|---|
| 723654 | 111 | 10 | 1000 | 1 | | | | |
| 723699 | 759 | 120 | 1000 | 2 | | | | |
| 724123 | 901 | 50 | 980 | 3 | | | | |
| 722598 | 959 | 7 | 970 | 4 | | | | |
| 725111 | 987 | 25 | 960 | 5 | | | | |
| 722511 | 721 | 100 | 950 | 6 | | | | |
| 725392 | 555 | 50 | 950 | 7 | | | | |
| 724002 | 844 | 35 | 940 | 8 | | | | |
| 724169 | 888 | 50 | 930 | 9 | | | | |
| 723849 | 365 | 10 | 910 | 10 | | | | |
| 724731 | 677 | 5 | 900 | 11 | | | | |
| 723373 | 689 | 75 | 880 | 12 | | | | |
| 724815 | 702 | 40 | 870 | 13 | | | | |
| 723822 | 890 | 20 | 850 | 14 | | | | |

MBP:
The quantity has changed from 130 to 150.

MBP Order book is:

| Bid NumOfOrders | Quantity | Price | PriceLevel | Quantity | Ask NumOfOrders |
|---|---|---|---|---|---|
| 2 | 130 | 1000 | 1 | | |
| 1 | 50 | 980 | 2 | | |
| 1 | 7 | 970 | 3 | | |
| 1 | 25 | 960 | 4 | | |
| 2 | 150 | 950 | 5 | | |
| 1 | 35 | 940 | 6 | | |
| 1 | 50 | 930 | 7 | | |
| 1 | 10 | 910 | 8 | | |
| 1 | 5 | 900 | 9 | | |
| 1 | 75 | 880 | 10 | | |

Market Data FIX Message Generated:
The consolidation system generates a consolidated message:
35=X Tag 60 TransactTime=UTCTimestampTag, 5799 MatchEventIndicator=10000100, Tag 268 NoMDEntries=2
→279=1 269=0 48=<instrument>83=5 271=150 270=950 346=2 1023=5 Tag 37705 NoOrderIDEntries=1
→Tag 37 OrderID=555, Tag 37707 MDOrderPriority=723095, Tag 37707 MDDisplayQty=50, Tag 37708 OrderUpdateAction=1, Tag 9633 RefID=1
Exchange Computing System May Generate Separate MBO and MBP Messages:
MBO Message: EoBook, not EoE
35=X Tag 60 TransactTime=UTCTimestamp, Tag 5799 MatchEventIndicator=00000100, Tag 268 NoMDEntries=1
→Tag 279 MDUpdateAction=1 (Update), Tag 37 OrderID=555, Tag 37707 MDOrderPriority=725392, Tag 270 MDEntryPx=950, Tag 37706 MDDisplayQty=50, Tag 48 SecurityID=<instrument>, Tag 269 MDEntryType=0 (Bid)
MBP Message: EoBook, EoE
35=X Tag 60 TransactTime=UTCTimestamp, Tag 5799 MatchEventIndicator=10000100, Tag 268 NoMDEntries=1
→279=1 269=0 48=<instrument>83=5 270=950 271=150 346=2 1023=5
Scenario 4—Modify Order Priority of Resting Order Below MBP Level (MBO Update)
Order priority changes without qty or price change for the resting order below the 10 MBP Levels.

Given:
<Instrument> group is in <Open>

MBO Order book in memory is:

| MD Order Priority | Bid OrderID | Book Quantity | Book Price | Order Pos | Book Price | Book Quantity | Ask OrderID | MD Order Priority |
|---|---|---|---|---|---|---|---|---|
| 723654 | 111 | 10 | 1000 | 1 | | | | |
| 723699 | 759 | 120 | 1000 | 2 | | | | |
| 724123 | 901 | 50 | 980 | 3 | | | | |
| 722598 | 959 | 7 | 970 | 4 | | | | |
| 725111 | 987 | 25 | 960 | 5 | | | | |
| 722511 | 721 | 100 | 950 | 6 | | | | |
| 725392 | 555 | 50 | 950 | 7 | | | | |
| 724002 | 844 | 35 | 940 | 8 | | | | |
| 724169 | 888 | 50 | 930 | 9 | | | | |
| 723849 | 365 | 10 | 910 | 10 | | | | |
| 724731 | 677 | 5 | 900 | 11 | | | | |
| 723373 | 689 | 75 | 880 | 12 | | | | |
| 724815 | 702 | 40 | 870 | 13 | | | | |

-continued

MBO Order book in memory is:

| MD Order Priority | Bid OrderID | Book Quantity | Book Price | Order Pos | Book Price | Book Quantity | Ask OrderID | MD Order Priority |
|---|---|---|---|---|---|---|---|---|
| 723822 | 1890 | 20 | 850 | 14 | | | | |
| 725212 | 251 | 25 | 850 | 15 | | | | |

MBP Book:

| Bid NumOfOrders | Quantity | Price | PriceLevel | Quantity | Ask NumOfOrders |
|---|---|---|---|---|---|
| 2 | 130 | 1000 | 1 | | |
| 1 | 50 | 980 | 2 | | |
| 1 | 7 | 970 | 3 | | |
| 1 | 25 | 960 | 4 | | |
| 2 | 150 | 950 | 5 | | |
| 1 | 35 | 940 | 6 | | |
| 1 | 50 | 930 | 7 | | |
| 1 | 10 | 910 | 8 | | |
| 1 | 5 | 900 | 9 | | |
| 1 | 75 | 880 | 10 | | |

When:
For OrderID 1890 Order priority number changes and no other changes
Then:
Final Order Books
MBO:
The order priority number changes due to a change in the order information.

MBO Order book in memory is:

| MD Order Priority | Bid OrderID | Book Quantity | Book Price | Order Pos | Book Price | Book Quantity | Ask OrderID | MD Order Priority |
|---|---|---|---|---|---|---|---|---|
| 723849 | 365 | 10 | 910 | 10 | | | | |
| 724731 | 677 | 5 | 900 | 11 | | | | |
| 723373 | 689 | 75 | 880 | 12 | | | | |
| 724815 | 702 | 40 | 870 | 13 | | | | |
| 725543 | 1890 | 20 | 850 | 14 | | | | |
| 725212 | 251 | 25 | 850 | 15 | | | | |

MBP:
The same—no changes on 10 price levels
Market Data FIX Messages generated:
MBO Message: EoBook, EoE
35=X Tag 60 TransactTime=UTCTimestampTag 5799 MatchEventIndicator=10000100 Tag 268 NoMDEntries=1
→Tag 279 MDUpdateAction=1 (Update), Tag 37 OrderID=1890, Tag 37707 MDOrderPriority=725543, Tag 270 MDEntryPx=850, Tag 37706 MDDisplayQty=20, Tag 48 SecurityID=<instrument>, Tag 269 MDEntryType=0 (Bid)
MBP Message:
No message.
Scenario 5—Modify Price of Resting Order MBP Levels (MBP & MBO Updates)
The price of a resting order within the 10 MBP Levels changes from 910 to 980.
Given:
<Instrument> group is in <Open>

MBO Order book in memory is:

| MD Order Priority | Bid OrderID | BookQuantity | BookPrice | Order Pos | Book Price | BookQuantity | Ask OrderID | MD Order Priority |
|---|---|---|---|---|---|---|---|---|
| 723654 | 111 | 10 | 1000 | 1 | | | | |
| 723699 | 759 | 120 | 1000 | 2 | | | | |
| 724123 | 901 | 50 | 980 | 3 | | | | |
| 722598 | 959 | 7 | 970 | 4 | | | | |
| 725111 | 987 | 25 | 960 | 5 | | | | |
| 722511 | 721 | 100 | 950 | 6 | | | | |
| 725392 | 555 | 50 | 950 | 7 | | | | |
| 724002 | 844 | 35 | 940 | 8 | | | | |
| 724169 | 888 | 50 | 930 | 9 | | | | |
| 723849 | 365 | 10 | 910 | 10 | | | | |
| 724731 | 677 | 5 | 900 | 11 | | | | |
| 723373 | 689 | 75 | 880 | 12 | | | | |
| 724815 | 702 | 40 | 870 | 13 | | | | |
| 723822 | 890 | 20 | 850 | 14 | | | | |
| 725212 | 251 | 25 | 850 | 15 | | | | |

MBO Order book in memory is:

| MD Order Priority | Bid OrderID | Book Quantity | Book Price | Order Pos | Book Price | Book Quantity | Ask OrderID | MD Order Priority |
|---|---|---|---|---|---|---|---|---|
| 723654 | 111 | 10 | 1000 | 1 | | | | |
| 723699 | 759 | 120 | 1000 | 2 | | | | |
| 724123 | 901 | 50 | 980 | 3 | | | | |
| 722598 | 959 | 7 | 970 | 4 | | | | |
| 725111 | 987 | 25 | 960 | 5 | | | | |
| 722511 | 721 | 100 | 950 | 6 | | | | |
| 725392 | 555 | 50 | 950 | 7 | | | | |
| 724002 | 844 | 35 | 940 | 8 | | | | |
| 724169 | 888 | 50 | 930 | 9 | | | | |

MBP Order book is:

| Bid NumOfOrders | Quantity | Price | Price Level | Quantity | Ask NumOfOrders |
|---|---|---|---|---|---|
| 2 | 130 | 1000 | 1 | | |
| 1 | 50 | 980 | 2 | | |
| 1 | 7 | 970 | 3 | | |
| 1 | 25 | 960 | 4 | | |
| 2 | 150 | 950 | 5 | | |
| 1 | 35 | 940 | 6 | | |
| 1 | 50 | 930 | 7 | | |
| 1 | 10 | 910 | 8 | | |

-continued

MBP Order book is:

| Bid NumOfOrders | Quantity | Price | Price Level | Quantity | Ask NumOfOrders |
|---|---|---|---|---|---|
| 1 | 5 | 900 | 9 | | |
| 1 | 75 | 880 | 10 | | |

When:
For OrderID 365, price is changed from 910 to 980.
Then:
Final Order Books
MBO:
The price is modified from 910 to 980. The order moves to price level 980 and the order priority number changes.

MBO Order book in memory is:

| MD Order Priority | Bid OrderID | Book Quantity | Book Price | Order Pos | Book Price | Book Quantity | Ask OrderID | MD Order Priority |
|---|---|---|---|---|---|---|---|---|
| 723654 | 111 | 10 | 1000 | 1 | | | | |
| 723699 | 759 | 120 | 1000 | 2 | | | | |
| 724123 | 901 | 50 | 980 | 3 | | | | |
| 725750 | 365 | 10 | 980 | 4 | | | | |
| 722598 | 959 | 7 | 970 | 5 | | | | |
| 725111 | 987 | 25 | 960 | 6 | | | | |
| 722511 | 721 | 100 | 950 | 7 | | | | |
| 725392 | 555 | 50 | 950 | 8 | | | | |
| 724002 | 844 | 35 | 940 | 9 | | | | |
| 724169 | 888 | 50 | 930 | 10 | | | | |
| 724731 | 677 | 5 | 900 | 11 | | | | |
| 723373 | 689 | 75 | 880 | 12 | | | | |
| 724815 | 702 | 40 | 870 | 13 | | | | |
| 723822 | 890 | 20 | 850 | 14 | | | | |
| 725212 | 251 | 25 | 850 | 15 | | | | |

MBP:
The price of the order has been modified. Since the price has changed and there is already an order at that price, the orders are combined at Level 2 at a price of 980. The price level of 910 is deleted and price level 10 added from off the book order levels:

MBP Order book is:

| Bid NumOfOrders | Quantity | Price | PriceLevel | Quantity | Ask NumOfOrders |
|---|---|---|---|---|---|
| 2 | 130 | 1000 | 1 | | |
| 2 | 60 | 980 | 2 | | |
| 1 | 7 | 970 | 3 | | |
| 1 | 25 | 960 | 4 | | |
| 2 | 150 | 950 | 5 | | |
| 1 | 35 | 940 | 6 | | |
| 1 | 50 | 930 | 7 | | |
| 1 | 5 | 900 | 8 | | |
| 1 | 75 | 880 | 9 | | |
| 1 | 40 | 870 | 10 | | |

Market Data FIX Messages Generated:
The consolidation system generates a consolidated message:
35=X Tag 60 TransactTime=UTCTimestamp, Tag 5799 MatchEventIndicator=10000100, Tag 268 NoMDEntries=3
→279=1 269=0 48=<instrument>83=14 271=60 270=980 346=2 1023=2
→279=2 269=0 48=<instrument>83=15 270=910 271=10 346=1 1023=8
→279=0 269=0 48=<instrument>83=16 270=870 271=40 346=1 1023=10

Tag 37705 NoOrderIDEntries=1
→Tag 37 OrderID=365, Tag 37707 MDOrderPriority=725750, Tag 37707 MDDisplayQty=10, Tag 37708 OrderUpdateAction=1, Tag 9633 RefID=1 (references MD Entry for the new order price)
Exchange computing system may generate two separate MBO and MBP messages:
MBO Message: EoBook, not EoE
35=X Tag 60 TransactTime=UTCTimestamp, Tag 5799 MatchEventIndicator=00000100, Tag 268 NoMDEntries=1
Tag 279 MDUpdateAction=1 (Modify), Tag 37 OrderID=365, Tag 37707 MDOrderPriority=725750, Tag 270 MDEntryPx=980, Tag 37706 MDDisplayQty=10, Tag 48 SecurityID=<instrument>, Tag 269 MDEntryType=0 (Bid)
MBP message: EoBook and EOE
35=X Tag 60 TransactTime=UTCTimestamp, Tag 5799 MatchEventIndicator=10000100, Tag 268 NoMDEntries=3
→279=1 269=0 48=<instrument>83=14 271=60 270=980 346=2 1023=2
→279=2 269=0 48=<instrument>83=15 270=910 271=10 346=1 1023=8
→279=0 269=0 48=<instrument>83=16 270=870 271=40 346=1 1023=10

Scenario 6—Modify Price of Resting Order Below MBP Levels (MBO Update)
The price of a resting order below the 10 MBP Levels changes from 850 to 820.
Given:
<Instrument> group is in <Open>

MBO Order book in memory is:

| MD Order Priority | Bid OrderID | Book Quantity | Book Price | Order Pos | Book Price | Book Quantity | Ask OrderID | MD Order Priority |
|---|---|---|---|---|---|---|---|---|
| 723654 | 111 | 10 | 1000 | 1 | | | | |
| 723699 | 759 | 120 | 1000 | 2 | | | | |
| 724123 | 901 | 50 | 980 | 3 | | | | |
| 725750 | 365 | 10 | 980 | 4 | | | | |
| 722598 | 959 | 7 | 970 | 5 | | | | |
| 725111 | 987 | 25 | 960 | 6 | | | | |
| 722511 | 721 | 100 | 950 | 7 | | | | |
| 725392 | 555 | 50 | 950 | 8 | | | | |
| 724002 | 844 | 35 | 940 | 9 | | | | |
| 724169 | 888 | 50 | 930 | 10 | | | | |
| 724731 | 677 | 5 | 900 | 11 | | | | |
| 723373 | 689 | 75 | 880 | 12 | | | | |
| 724815 | 702 | 40 | 870 | 13 | | | | |
| 723822 | 890 | 20 | 850 | 14 | | | | |
| 725212 | 251 | 25 | 850 | 15 | | | | |

MBP Order book is:

| Bid NumOfOrders | Quantity | Price | Price Level | Quantity | Ask NumOfOrders |
|---|---|---|---|---|---|
| 2 | 130 | 1000 | 1 | | |
| 2 | 60 | 980 | 2 | | |
| 1 | 7 | 970 | 3 | | |
| 1 | 25 | 960 | 4 | | |
| 2 | 150 | 950 | 5 | | |
| 1 | 35 | 940 | 6 | | |
| 1 | 50 | 930 | 7 | | |
| 1 | 5 | 900 | 8 | | |
| 1 | 75 | 880 | 9 | | |
| 1 | 40 | 870 | 10 | | |

When:
For OrderID 890, the price is changed from 850 to 820.
Then: Final Order Books
MBO:
The price is modified from 850 to 820. The order moves to price level 820 and is sequenced after the order at the next highest price level.

MBO Order book in memory is:

| MD Order Priority | Bid OrderID | Book Quantity | Book Price | Order Pos | Book Price | Book Quantity | Ask OrderID | MD Order Priority |
|---|---|---|---|---|---|---|---|---|
| 723654 | 111 | 10 | 1000 | 1 | | | | |
| 723699 | 759 | 120 | 1000 | 2 | | | | |
| 724123 | 901 | 50 | 980 | 3 | | | | |
| 725750 | 365 | 10 | 980 | 4 | | | | |
| 722598 | 959 | 7 | 970 | 5 | | | | |
| 725111 | 987 | 25 | 960 | 6 | | | | |
| 722511 | 721 | 100 | 950 | 7 | | | | |
| 725392 | 555 | 50 | 950 | 8 | | | | |
| 724002 | 844 | 35 | 940 | 9 | | | | |
| 724169 | 888 | 50 | 930 | 10 | | | | |
| 724731 | 677 | 5 | 900 | 11 | | | | |
| 723373 | 689 | 75 | 880 | 12 | | | | |
| 724815 | 702 | 40 | 870 | 13 | | | | |
| 725212 | 251 | 25 | 850 | 14 | | | | |
| 725731 | 890 | 20 | 820 | 15 | | | | |

MBP:
The price of the order has been modified to a price level that is past the 10 levels disseminated to customers, therefore there are no changes to the MBP book.

| Bid NumOfOrders | Quantity | Price | Price Level | Quantity | Ask NumOfOrders |
|---|---|---|---|---|---|
| 2 | 130 | 1000 | 1 | | |
| 2 | 60 | 980 | 2 | | |
| 1 | 7 | 970 | 3 | | |
| 1 | 25 | 960 | 4 | | |
| 2 | 150 | 950 | 5 | | |
| 1 | 35 | 940 | 6 | | |
| 1 | 50 | 930 | 7 | | |
| 1 | 5 | 900 | 8 | | |
| 1 | 75 | 880 | 9 | | |
| 1 | 40 | 870 | 10 | | |

3. Market Data FIX Messages Generated:
MBO Message: EoBook, EoE
35=X Tag 60 TransactTime=UTCTimestamp, Tag 5799 MatchEventIndicator=10000100, Tag 268 NoMDEntries=1 →Tag 279 MDUpdateAction=1 (Mod), Tag 37 OrderID=890, Tag 37707 MDOrderPriority=725731, Tag 270 MDEntryPx=820, Tag 37706 MDDisplayQty=20, Tag 48 SecurityID=<instrument>, Tag 269 MDEntryType=0 (Bid)
MBP Message:
No message.

Scenario 7—Cancel Resting Order on MBP Level (MBP & MBO Updates)
Cancel a resting order at price 950 which is within the 10 MBP Levels.
Given:
<Instrument> group is in <Open>

MBO Order book in memory is:

| MD Order Priority | Bid OrderID | Book Quantity | Book Price | Order Pos | Book Price | Book Quantity | Ask OrderID | MD Order Priority |
|---|---|---|---|---|---|---|---|---|
| 723654 | 111 | 10 | 1000 | 1 | | | | |
| 723699 | 759 | 120 | 1000 | 2 | | | | |
| 724123 | 901 | 50 | 980 | 3 | | | | |
| 725750 | 365 | 10 | 980 | 4 | | | | |
| 722598 | 959 | 7 | 970 | 5 | | | | |
| 725111 | 987 | 25 | 960 | 6 | | | | |
| 722511 | 721 | 100 | 950 | 7 | | | | |
| 725392 | 555 | 50 | 950 | 8 | | | | |
| 724002 | 844 | 35 | 940 | 9 | | | | |
| 724169 | 888 | 50 | 930 | 10 | | | | |
| 724731 | 677 | 5 | 900 | 11 | | | | |
| 723373 | 689 | 75 | 880 | 12 | | | | |
| 724815 | 702 | 40 | 870 | 13 | | | | |
| 725212 | 251 | 25 | 850 | 14 | | | | |
| 725731 | 890 | 20 | 820 | 15 | | | | |

MBP Book:

| Bid NumOfOrders | Quantity | Price | PriceLevel | Quantity | Ask NumOfOrders |
|---|---|---|---|---|---|
| 2 | 130 | 1000 | 1 | | |
| 1 | 50 | 980 | 2 | | |
| 1 | 7 | 970 | 3 | | |
| 1 | 25 | 960 | 4 | | |
| 2 | 150 | 950 | 5 | | |
| 1 | 35 | 940 | 6 | | |
| 1 | 50 | 930 | 7 | | |
| 1 | 5 | 900 | 8 | | |
| 1 | 75 | 880 | 9 | | |
| 1 | 40 | 870 | 10 | | |

When:
Cancel OrderID 721 at price 950 for a quantity of 100.
Then:
Final Order Books
OrderID 721 for 100 at price of 950 is cancelled.

MBO Order book in memory is:

| MD Order Priority | Bid OrderID | BookQuantity | BookPrice | Order Pos | Book Price | BookQuantity | Ask OrderID | MD Order Priority |
|---|---|---|---|---|---|---|---|---|
| 723654 | 111 | 10 | 1000 | 1 | | | | |
| 723699 | 759 | 120 | 1000 | 2 | | | | |
| 724123 | 901 | 50 | 980 | 3 | | | | |
| 725750 | 365 | 10 | 980 | 4 | | | | |
| 722598 | 959 | 7 | 970 | 5 | | | | |
| 725111 | 987 | 25 | 960 | 6 | | | | |
| 725392 | 555 | 50 | 950 | 7 | | | | |
| 724002 | 844 | 35 | 940 | 8 | | | | |
| 724169 | 888 | 50 | 930 | 9 | | | | |
| 724731 | 677 | 5 | 900 | 10 | | | | |
| 723373 | 689 | 75 | 880 | 11 | | | | |

-continued

| MD Order Priority | Bid OrderID | BookQuantity | BookPrice | Order Pos | Book Price | BookQuantity | Ask OrderID | MD Order Priority |
|---|---|---|---|---|---|---|---|---|
| 724815 | 702 | 40 | 870 | 12 | | | | |
| 725212 | 251 | 25 | 850 | 13 | | | | |
| 725731 | 890 | 20 | 820 | 14 | | | | |

MBO Order book in memory is:

MBP:
The order with quantity of 100 at price 950 has been cancelled. Level 5 is modified to quantity of 50 and NumOfOrders equal to 1.

MBP Order book is:

| Bid NumOfOrders | Quantity | Price | PriceLevel | Quantity | Ask NumOfOrders |
|---|---|---|---|---|---|
| 2 | 130 | 1000 | 1 | | |
| 2 | 60 | 980 | 2 | | |
| 1 | 7 | 970 | 3 | | |
| 1 | 25 | 960 | 4 | | |
| 1 | 50 | 950 | 5 | | |
| 1 | 35 | 940 | 6 | | |
| 1 | 50 | 930 | 7 | | |
| 1 | 5 | 900 | 8 | | |
| 1 | 75 | 880 | 9 | | |
| 1 | 40 | 870 | 10 | | |

Market Data FIX Message generated:
The consolidation system generates a consolidated message:
35=X, Tag 60 TransactTime=<UTCTimestamp>, Tag 5799 MatchEventIndicator=10000100 (End of Book updates and End of Event)
Tag 268 NoMDEntries=1
→279=1 269=0 48=<instrument>83=17 271=50 270=950 346=1 1023=5 Tag 37705 NoOrderIDEntries=1
→Tag 37 OrderID=721, Tag 37707 MDOrderPriority=722511, Tag 37707 MDDisplayQty=100, Tag 37708 OrderUpdateAction=2, Tag 9633 RefID=1
Exchange computing system may generate messages:
MBO Message: End of Book updates, Not End of Event
35=X Tag 60 TransactTime=UTCTimestampTag 5799 MatchEventIndicator=00000100 Tag 268 NoMDEntries=1
→Tag 279 MDUpdateAction=2 (Delete), Tag 37 OrderID=721, Tag 37707 MDOrderPriority=722511, Tag 270 MDEntryPx=950, Tag 37706 MDDisplayQty=100, Tag 48 SecurityID=<instrument>, Tag 269 MDEntryType=0 (Bid)
MBP Message: End of Book updates, End of Event
35=X, Tag 60 TransactTime=UTCTimestamp, Tag 5799 MatchEventIndicator=10000100, Tag 268 NoMDEntries=1
→279=1 269=0 48=<instrument>83=17 270=950 271=50 346=1 1023=5

Scenario 8—Cancel Resting Order Below MBP Levels (MBO Update)
Cancel a resting order at price 850 which is below the 10 MBP Levels.
Given:
<Instrument> group is in <Open>

MBO Order book in memory is

| MD Order Priority | Bid OrderID | BookQuantity | BookPrice | Order Pos | Book Price | BookQuantity | Ask OrderID | MD Order Priority |
|---|---|---|---|---|---|---|---|---|
| 723654 | 111 | 10 | 1000 | 1 | | | | |
| 723699 | 759 | 120 | 1000 | 2 | | | | |
| 724123 | 901 | 50 | 980 | 3 | | | | |
| 725750 | 365 | 10 | 980 | 4 | | | | |
| 722598 | 959 | 7 | 970 | 5 | | | | |
| 725111 | 987 | 25 | 960 | 6 | | | | |
| 725392 | 555 | 50 | 950 | 7 | | | | |
| 724002 | 844 | 35 | 940 | 8 | | | | |
| 724169 | 888 | 50 | 930 | 9 | | | | |
| 724731 | 677 | 5 | 900 | 10 | | | | |
| 723373 | 689 | 75 | 880 | 11 | | | | |
| 724815 | 702 | 40 | 870 | 12 | | | | |
| 725212 | 251 | 25 | 850 | 13 | | | | |
| 725731 | 890 | 20 | 820 | 14 | | | | |

MBP book:

| Bid NumOfOrders | Quantity | Price | PriceLevel | Quantity | Ask NumOfOrders |
|---|---|---|---|---|---|
| 2 | 130 | 1000 | 1 | | |
| 2 | 60 | 980 | 2 | | |
| 1 | 7 | 970 | 3 | | |
| 1 | 25 | 960 | 4 | | |
| 1 | 50 | 950 | 5 | | |
| 1 | 35 | 940 | 6 | | |
| 1 | 50 | 930 | 7 | | |
| 1 | 5 | 900 | 8 | | |
| 1 | 75 | 880 | 9 | | |
| 1 | 40 | 870 | 10 | | |

When:
Cancel OrderID 251 at price 850 for a quantity of 25.
Then:
Final Order Books
MBO:
OrderID 251 for 25 at price of 850 is cancelled.

MBO Order book in memory is:

| MD Order Priority | Bid OrderID | Book Quantity | Book Price | Order Pos | Book Price | Book Quantity | Ask OrderID | MD Order Priority |
|---|---|---|---|---|---|---|---|---|
| 723654 | 111 | 10 | 1000 | 1 | | | | |
| 723699 | 759 | 120 | 1000 | 2 | | | | |
| 724123 | 901 | 50 | 980 | 3 | | | | |
| 725750 | 365 | 10 | 980 | 4 | | | | |
| 722598 | 959 | 7 | 970 | 5 | | | | |
| 725111 | 987 | 25 | 960 | 6 | | | | |
| 725392 | 555 | 50 | 950 | 7 | | | | |
| 724002 | 844 | 35 | 940 | 8 | | | | |
| 724169 | 888 | 50 | 930 | 9 | | | | |
| 724731 | 677 | 5 | 900 | 10 | | | | |
| 723373 | 689 | 75 | 880 | 11 | | | | |
| 724815 | 702 | 40 | 870 | 12 | | | | |
| 725731 | 890 | 20 | 820 | 13 | | | | |

MBP:
Order 251 at price 850 is below the 10 levels disseminated to customers, therefore there are no changes to the MBP order book.

MBP Order book is:

| Bid NumOfOrders | Quantity | Price | Price Level | Quantity | Ask NumOfOrders |
|---|---|---|---|---|---|
| 2 | 130 | 1000 | 1 | | |
| 2 | 60 | 980 | 2 | | |
| 1 | 7 | 970 | 3 | | |
| 1 | 25 | 960 | 4 | | |
| 1 | 50 | 950 | 5 | | |
| 1 | 35 | 940 | 6 | | |
| 1 | 50 | 930 | 7 | | |
| 1 | 5 | 900 | 8 | | |
| 1 | 75 | 880 | 9 | | |
| 1 | 40 | 870 | 10 | | |

Market Data FIX Messages generated:
MBO Message: EoBook, EoE
35=X Tag 60 TransactTime=UTCTimestampTag 5799 MatchEventIndicator=10000100 Tag 268 NoMDEntries=1 →Tag 279 MDUpdateAction=2 (Delete), Tag 37 OrderID=251, Tag 37707 MDOrderPriority=725212, Tag 270 MDEntryPx=850, Tag 37706 MDDisplayQty=25, Tag 48 SecurityID=<instrument>, Tag 269 MDEntryType=0 (Bid)
MBP Message:
No message.

Scenario 9—New FAK Order (No Fill & No Updates)
A Fill And Kill order is entered but not executed due to not enough quantity in the book to meet the Min Qty on the FAK order.
Given:
<Instrument> group is in <Open>

MBO Order book in memory is:

| MD Order Priority | Bid OrderID | Book Quantity | Book Price | Order Pos | Book Price | Book Quantity | Ask OrderID | MD Order Priority |
|---|---|---|---|---|---|---|---|---|
| 723654 | 111 | 10 | 1000 | 1 | 1010 | 5 | 885 | 725101 |
| 723699 | 759 | 120 | 1000 | 2 | 1020 | 1 | 371 | 724333 |
| 724123 | 901 | 50 | 980 | 3 | 1020 | 2 | 688 | 724516 |
| 722598 | 959 | 7 | 970 | 4 | 1020 | 20 | 937 | 724808 |
| 725111 | 987 | 25 | 960 | 5 | 1030 | 7 | 664 | 723944 |
| 725392 | 555 | 50 | 950 | 6 | 1030 | 15 | 713 | 724003 |
| 724002 | 844 | 35 | 940 | 7 | 1030 | 50 | 725 | 724350 |
| 724169 | 888 | 50 | 930 | 8 | 1030 | 100 | 811 | 724691 |
| 724731 | 677 | 5 | 900 | 9 | 1030 | 35 | 922 | 724787 |
| 723373 | 689 | 75 | 880 | 10 | 1030 | 10 | 1001 | 724933 |
| 724815 | 702 | 40 | 870 | 11 | | | | |
| 723822 | 890 | 20 | 850 | 12 | | | | |
| 725212 | 251 | 25 | 850 | 13 | | | | |

MBP Book:

| Bid NumOfOrders | Quantity | Bid Price | PriceLevel | Ask Price | Quantity | Ask NumOfOrders |
|---|---|---|---|---|---|---|
| 2 | 130 | 1000 | 1 | 1010 | 5 | 1 |
| 1 | 50 | 980 | 2 | 1020 | 23 | 3 |
| 1 | 7 | 970 | 3 | 1030 | 217 | 6 |
| 1 | 25 | 960 | 4 | | | |
| 1 | 50 | 950 | 5 | | | |
| 1 | 35 | 940 | 6 | | | |
| 1 | 50 | 930 | 7 | | | |
| 1 | 5 | 900 | 8 | | | |
| 1 | 75 | 880 | 9 | | | |
| 1 | 40 | 870 | 10 | | | |

When:
New FAK OrderID 1224 with TIF=3 (FAK) and MinQty=10.
Then:
Final Order Books
MBO:
No changes
MBP:
No changes
Market Data FIX Messages generated:
Not sent
Scenario 10—New Stop Order—Book Qty=0 (No Updates)
Unelected Stop order is Acknowledged, Order is not placed on the book until it is triggered.

Given:
<Instrument> group is in <Open>, Last Traded Price=1000

| MBO Order Book in memory is: | | | | | | | | |
|---|---|---|---|---|---|---|---|---|
| MD Order Priority | BID OrderID | Book Quantity | Book Price | Order Pos | Book Price | Book Quantity | ASK OrderID | MD Order Priority |
| 724401 | 201 | 10 | 1000 | 1 | 1005 | 10 | 205 | 724866 |
| 723195 | 202 | 10 | 980 | 2 | 1010 | 20 | 206 | 724333 |
| 722432 | 203 | 5 | 980 | 3 | 1020 | 15 | 207 | 723998 |
|  |  |  |  | 4 | 1020 | 50 | 209 | 723444 |
|  |  |  |  | 5 | 1030 | 70 | 215 | 723767 |

| MBP Book: | | | | | | |
|---|---|---|---|---|---|---|
| Bid NumOfOrders | Quantity | Price | PriceLevel | Price | Quantity | Ask NumOfOrders |
| 1 | 10 | 1000 | 1 | 1005 | 10 | 1 |
| 2 | 15 | 980 | 2 | 1010 | 20 | 1 |
|  |  |  | 3 | 1020 | 65 | 2 |
|  |  |  | 4 | 1030 | 70 | 1 |

When:
Customer sends New Bid Stop Order with Stop Price=1010 and Order Px=1030
Then:
Final Order Books
MBO:
No changes
MBP:
No changes
Market Data FIX Messages generated:
Not sent Scenario 11—Cancel Stop Order
Unelected Stop order with OrderID 233 is being held in memory (stop orders are not placed on the book until they are triggered). OrderID 233 is cancelled.
Given:
<Instrument> group is in <Open>, Last Traded Price=1000

| MBO Order Book in memory is: | | | | | | | | |
|---|---|---|---|---|---|---|---|---|
| MD Order Priority | BID OrderID | Book Quantity | Book Price | Order Pos | Book Price | Book Quantity | ASK OrderID | MD Order Priority |
| 724401 | 201 | 10 | 1000 | 1 | 1005 | 10 | 205 | 724866 |
| 723195 | 202 | 10 | 980 | 2 | 1010 | 20 | 206 | 724333 |
| 722432 | 203 | 5 | 980 | 3 | 1020 | 15 | 207 | 723998 |
|  |  |  |  | 4 | 1020 | 50 | 209 | 723444 |
|  |  |  |  | 5 | 1030 | 70 | 215 | 723767 |

| MBP Book: | | | | | | |
|---|---|---|---|---|---|---|
| Bid NumOfOrders | Quantity | Price | PriceLevel | Price | Quantity | Ask NumOfOrders |
| 1 | 10 | 1000 | 1 | 1005 | 10 | 1 |
| 2 | 15 | 980 | 2 | 1010 | 20 | 1 |
|  |  |  | 3 | 1020 | 65 | 2 |
|  |  |  | 4 | 1030 | 70 | 1 |

When:
Customer sends cancellation of Stop Order with Stop Price=1010, Order Px=1030, and OrderID 233.
Then:
Final Order Books
MBO:
No changes
MBP:
No changes Market Data FIX Messages Generated:
Not sent
Scenario 12—Stop Order Qty Modification
Unelected Stop order with OrderID 285 is being held in memory (stop orders are not placed on the book until they are triggered). For OrderID 285, the quantity is changed from 10 to 5.
Given:
<Instrument> group is in <Open>, Last Traded Price=1000

| MBO Order Book in memory is: | | | | | | | | |
|---|---|---|---|---|---|---|---|---|
| MD Order Priority | BID OrderID | Book Quantity | Book Price | Order Pos | Book Price | Book Quantity | ASK OrderID | MD Order Priority |
| 724401 | 201 | 10 | 1000 | 1 | 1005 | 10 | 205 | 724866 |
| 723195 | 202 | 10 | 980 | 2 | 1010 | 20 | 206 | 724333 |
| 722432 | 203 | 5 | 980 | 3 | 1020 | 15 | 207 | 723998 |
| | | | | 4 | 1020 | 50 | 209 | 723444 |
| | | | | 5 | 1030 | 70 | 215 | 723767 |

| MBP Book: | | | | | | |
|---|---|---|---|---|---|---|
| Bid NumOfOrders | Quantity | Price | PriceLevel | Price | Quantity | Ask NumOfOrders |
| 1 | 10 | 1000 | 1 | 1005 | 10 | 1 |
| 2 | 15 | 980 | 2 | 1010 | 20 | 1 |
| | | | 3 | 1020 | 65 | 2 |
| | | | 4 | 1030 | 70 | 1 |

When:
Customer sends cancel/replace of Stop OrderID 285 with Stop Price=1005 and Order Px=1015.
Then:
Final Order Books
MBO:
No changes
MBP:
No changes
Market Data FIX Messages generated:
Not sent
Scenario 13—Stop Order Price Modification
Unelected Stop order with OrderID 399 is being held in memory (stop orders are not placed on the book until they are triggered). For OrderID 395, the order price is changed from 1015 to 1020.
Given:
<Instrument> group is in <Open>, Last Traded Price=1000

| MBO Order Book in memory is: | | | | | | | | |
|---|---|---|---|---|---|---|---|---|
| MD Order Priority | BID OrderID | Book Quantity | Book Price | Order Pos | Book Price | Book Quantity | ASK OrderID | MD Order Priority |
| 724401 | 201 | 10 | 1000 | 1 | 1005 | 10 | 205 | 724866 |
| 723195 | 202 | 10 | 980 | 2 | 1010 | 20 | 206 | 724333 |
| 722432 | 203 | 5 | 980 | 3 | 1020 | 15 | 207 | 723998 |
| | | | | 4 | 1020 | 50 | 209 | 723444 |
| | | | | 5 | 1030 | 70 | 215 | 723767 |

-continued

| MBP Book: | | | | | | |
|---|---|---|---|---|---|---|
| Bid NumOfOrders | Quantity | Price | PriceLevel | Price | Quantity | Ask NumOfOrders |
| 1 | 10 | 1000 | 1 | 1005 | 10 | 1 |
| 2 | 15 | 980 | 2 | 1010 | 20 | 1 |
|  |  |  | 3 | 1020 | 65 | 2 |
|  |  |  | 4 | 1030 | 70 | 1 |

When:
Customer sends cancel/replace of Stop OrderID 395 with Stop Price=1005, and changes Order Price from 1015 to 1020.
Then:
Final Order Books
MBO:
No changes
MBP:
No changes
3. Market Data FIX Messages Generated:
Not sent Scenario 14—Stop Order Trigger Price Modification (Change in Order Priority)

Unelected Stop order with OrderID 454 is being held in memory (stop orders are not placed on the book until they are triggered). For OrderID 454, the trigger price is changed from 1015 to 1005.
Given:
<Instrument> group is in <Open>, Last Traded Price=1000

| MBO Order Book in memory is: | | | | | | | | |
|---|---|---|---|---|---|---|---|---|
| MD Order Priority | BID OrderID | Book Quantity | Book Price | Order Pos | Book Price | Book Quantity | ASK OrderID | MD Order Priority |
| 724401 | 201 | 10 | 1000 | 1 | 1005 | 10 | 205 | 724866 |
| 723195 | 202 | 10 | 980 | 2 | 1010 | 20 | 206 | 724333 |
| 722432 | 203 | 5 | 980 | 3 | 1020 | 15 | 207 | 723998 |
|  |  |  |  | 4 | 1020 | 50 | 209 | 723444 |
|  |  |  |  | 5 | 1030 | 70 | 215 | 723767 |

| MBP Book: | | | | | | |
|---|---|---|---|---|---|---|
| Bid NumOfOrders | Quantity | Price | PriceLevel | Price | Quantity | Ask NumOfOrders |
| 1 | 10 | 1000 | 1 | 1005 | 10 | 1 |
| 2 | 15 | 980 | 2 | 1010 | 20 | 1 |
|  |  |  | 3 | 1020 | 65 | 2 |
|  |  |  | 4 | 1030 | 70 | 1 |

When:
Customer sends cancel/replace of Stop OrderID 454 to change Trigger Price from 1015 to 1005.
Then:
Final Order Books
MBO:
No changes
MBP:
No changes
Market Data FIX Messages generated:
Not sent Scenario 15—Stop Order Type Change to Limit within MBP Levels (MBP & MBO Updates)
Unelected Stop order with OrderID 591 is being held in memory (stop orders are not placed on the book until they are triggered). For OrderID 591, the trigger price is removed and the order is modified to a limit order.

Given:
<Instrument> group is in <Open>, Last Traded Price=1000

MBO Order Book in memory is:

| MD Order Priority | BID OrderID | Book Quantity | Book Price | Order Pos | Book Price | Book Quantity | ASK OrderID | MD Order Priority |
|---|---|---|---|---|---|---|---|---|
| 724401 | 201 | 10 | 1000 | 1 | 1005 | 10 | 205 | 724866 |
| 723195 | 202 | 10 | 980 | 2 | 1010 | 20 | 206 | 724333 |
| 722432 | 203 | 5 | 980 | 3 | 1020 | 15 | 207 | 723998 |
|  |  |  |  | 4 | 1020 | 50 | 209 | 723444 |
|  |  |  |  | 5 | 1030 | 70 | 215 | 723767 |

MBP Book:

| Bid NumOfOrders | Quantity | Price | PriceLevel | Price | Quantity | Ask NumOfOrders |
|---|---|---|---|---|---|---|
| 1 | 10 | 1000 | 1 | 1005 | 10 | 1 |
| 2 | 15 | 980 | 2 | 1010 | 20 | 1 |
|  |  |  | 3 | 1020 | 65 | 2 |
|  |  |  | 4 | 1030 | 70 | 1 |

When:
Customer sends cancel/replace of Stop OrderID 591 to change the order from a Stop to a Limit order.
Then:
Final Order Books

MBO:

| MD Order Priority | BID OrderID | Book Quantity | Book Price | Order Pos | Book Price | Book Quantity | ASK OrderID | MD Order Priority |
|---|---|---|---|---|---|---|---|---|
| 724401 | 201 | 10 | 1000 | 1 | 1005 | 10 | 205 | 724866 |
| 727884 | 591 | 25 | 990 | 2 | 1010 | 20 | 206 | 724333 |
| 723195 | 202 | 10 | 980 | 3 | 1020 | 15 | 207 | 723998 |
| 722432 | 203 | 5 | 980 | 4 | 1020 | 50 | 209 | 723444 |
|  |  |  |  | 5 | 1030 | 70 | 215 | 723767 |

MBP:

| Bid NumOfOrders | Quantity | Price | PriceLevel | Price | Quantity | Ask NumOfOrders |
|---|---|---|---|---|---|---|
| 1 | 10 | 1000 | 1 | 1005 | 10 | 1 |
| 1 | 25 | 990 | 2 | 1010 | 20 | 1 |
| 2 | 15 | 980 | 3 | 1020 | 65 | 2 |
|  |  |  | 4 | 1030 | 70 | 1 |

Market Data FIX Messages generated:
The consolidation system generates a consolidated message:
35=X Tag 60 TransactTime=UTCTimestamp, Tag 5799 MatchEventIndicator=10000100, Tag 268 NoMDEntries=1
→279=1 269=0 48=<instrument>83=22, 271=25, 270=990, 346=1, 1023=2 Tag 37705 NoOrderIDEntries=1
→Tag 37 OrderID=591, Tag 37707 MDOrderPriority=727884, Tag 37707 MDDisplayQty=25, Tag 37708 OrderUpdateAction=0, Tag 9633 RefID=1
Exchange computing system may generate messages:
MBO Message: EoBook, not EoE
35=X Tag 60 TransactTime=UTCTimestampTag 5799 MatchEventIndicator=00000100 Tag 268 NoMDEntries=1
→Tag 279 MDUpdateAction=0 (Add), Tag 37 OrderID=591, Tag 37707 MDOrderPriority=727884, Tag 270 MDEntryPx=990, Tag 37706 MDDisplayQty=25, Tag 48 SecurityID=<instrument>, Tag 269 MDEntryType=0 (Bid)
MBP Message: EoBook, EoE
35=X Tag 60 TransactTime=UTCTimestampTag 5799 MatchEventIndicator=10000100 Tag 268 NoMDEntries=1
→279=1 269=0 48=<instrument>83=22 270=990 271=25 346=1 1023=2

Scenario 16—Stop Order Type Change to Limit Below MBP Levels (MBO Updates)
Untriggered Stop order with OrderID 222 is being held in memory (stop orders are not placed on the book until they are triggered). For OrderID 222, the trigger price is removed and the order is modified to a limit order.

Given:
<Instrument> group is in <Open>, Last Traded Price=1000
MBO Order Book in Memory is:

| | | | | MBO Order Book in memory is: | | | | |
|---|---|---|---|---|---|---|---|---|
| MD Order Priority | BID OrderID | Book Quantity | Book Price | Order Pos | Book Price | Book Quantity | ASK OrderID | MD Order Priority |
| 724401 | 201 | 10 | 1000 | 1 | 1005 | 10 | 205 | 724866 |
| 727884 | 591 | 25 | 990 | 2 | 1010 | 20 | 206 | 724333 |
| 723195 | 202 | 10 | 980 | 3 | 1020 | 15 | 207 | 723998 |
| 722432 | 203 | 5 | 980 | 4 | 1020 | 50 | 209 | 723444 |
| 724037 | 208 | 40 | 970 | 5 | 1030 | 70 | 215 | 723767 |
| 724186 | 216 | 10 | 960 | 6 | | | | |
| 723985 | 199 | 75 | 950 | 7 | | | | |
| 724906 | 218 | 2 | 950 | 8 | | | | |
| 721921 | 150 | 50 | 940 | 9 | | | | |
| 724999 | 220 | 5 | 930 | 10 | | | | |
| 725133 | 221 | 11 | 920 | 11 | | | | |
| 725201 | 225 | 5 | 920 | 12 | | | | |
| 723506 | 183 | 35 | 910 | 13 | | | | |
| 591837 | 101 | 500 | 900 | 14 | | | | |
| 724007 | 214 | 50 | 900 | 15 | | | | |

| | | | MBP Book: | | | |
|---|---|---|---|---|---|---|
| Bid NumOfOrders | Quantity | Price | PriceLevel | Price | Quantity | Ask NumOfOrders |
| 1 | 10 | 1000 | 1 | 1005 | 10 | 1 |
| 1 | 25 | 990 | 2 | 1010 | 20 | 1 |
| 2 | 15 | 980 | 3 | 1020 | 65 | 2 |
| 1 | 40 | 970 | 4 | 1030 | 70 | 1 |
| 1 | 10 | 960 | 5 | | | |
| 2 | 77 | 950 | 6 | | | |
| 1 | 50 | 940 | 7 | | | |
| 1 | 5 | 930 | 8 | | | |
| 2 | 16 | 920 | 9 | | | |
| 1 | 35 | 910 | 10 | | | |

When:
Customer sends cancel/replace of Stop OrderID 222 to change the order from a Stop to a Limit order.
Then:
Final Order Books

| | | | | MBO: | | | | |
|---|---|---|---|---|---|---|---|---|
| MD Order Priority | BID OrderID | Book Quantity | Book Price | Order Pos | Book Price | Book Quantity | ASK OrderID | MD Order Priority |
| 724401 | 201 | 10 | 1000 | 1 | 1005 | 10 | 205 | 724866 |
| 727884 | 591 | 25 | 990 | 2 | 1010 | 20 | 206 | 724333 |
| 723195 | 202 | 10 | 980 | 3 | 1020 | 15 | 207 | 723998 |
| 722432 | 203 | 5 | 980 | 4 | 1020 | 50 | 209 | 723444 |
| 724037 | 208 | 40 | 970 | 5 | 1030 | 70 | 215 | 723767 |
| 724186 | 216 | 10 | 960 | 6 | | | | |
| 723985 | 199 | 75 | 950 | 7 | | | | |
| 724906 | 218 | 2 | 950 | 8 | | | | |
| 721921 | 150 | 50 | 940 | 9 | | | | |
| 724999 | 220 | 5 | 930 | 10 | | | | |
| 725133 | 221 | 11 | 920 | 11 | | | | |
| 725201 | 225 | 5 | 920 | 12 | | | | |
| 723506 | 183 | 35 | 910 | 13 | | | | |
| 591837 | 101 | 500 | 900 | 14 | | | | |
| 724007 | 214 | 50 | 900 | 15 | | | | |
| 725123 | 222 | 100 | 900 | 16 | | | | |

| | | | MBP: | | | |
|---|---|---|---|---|---|---|
| Bid NumOfOrders | Quantity | Price | PriceLevel | Price | Quantity | Ask NumOfOrders |
| 1 | 10 | 1000 | 1 | 1005 | 10 | 1 |
| 1 | 25 | 990 | 2 | 1010 | 20 | 1 |
| 2 | 15 | 980 | 3 | 1020 | 65 | 2 |

-continued

| | | | | | | |
|---|---|---|---|---|---|---|
| 1 | 40 | 970 | 4 | 1030 | 70 | 1 |
| 1 | 10 | 960 | 5 | | | |
| 2 | 77 | 950 | 6 | | | |
| 1 | 50 | 940 | 7 | | | |
| 1 | 5 | 930 | 8 | | | |
| 2 | 16 | 920 | 9 | | | |
| 1 | 35 | 910 | 10 | | | |

3. Market Data FIX Message is Generated:
MBO Message: EoBook, EoE
35=X Tag 60 TransactTime=UTCTimestamp, Tag 5799 MatchEventIndicator=10000100, Tag 268 NoMDEntries=1
→Tag 279 MDUpdateAction=0 (Add), Tag 37 OrderID=222, Tag 37707 MDOrderPriority=725123, Tag 270 MDEntryPx=900, Tag 271 MDEntrySize=100, Tag 48 SecurityID=<instrument>, Tag 269 MDEntryType=0 (Bid)
MBP Message:
Not sent Scenario 17—Limit Order Type Change to Stop within MBP Levels (MBP & MBO Updates)
An order modified from a Limit to a Stop order within MBP Levels.
Given:
<Instrument> group is in <Open>, Last Traded Price=1000

| MBO Order Book in memory is: | | | | | | | | |
|---|---|---|---|---|---|---|---|---|
| MD Order Priority | BID OrderID | Book Quantity | Book Price | Order Pos | Book Price | Book Quantity | ASK OrderID | MD Order Priority |
| 724401 | 201 | 10 | 1000 | 1 | 1005 | 10 | 205 | 724866 |
| 727884 | 591 | 25 | 990 | 2 | 1010 | 20 | 206 | 724333 |
| 723195 | 202 | 10 | 980 | 3 | 1020 | 15 | 207 | 723998 |
| 722432 | 203 | 5 | 980 | 4 | 1020 | 50 | 209 | 723444 |
| 724037 | 208 | 40 | 970 | 5 | 1030 | 70 | 215 | 723767 |
| 724186 | 216 | 10 | 960 | 6 | | | | |
| 723985 | 199 | 75 | 950 | 7 | | | | |
| 724906 | 218 | 2 | 950 | 8 | | | | |
| 721921 | 150 | 50 | 940 | 9 | | | | |
| 724999 | 220 | 5 | 930 | 10 | | | | |
| 725133 | 221 | 11 | 920 | 11 | | | | |
| 725201 | 225 | 5 | 920 | 12 | | | | |
| 723506 | 183 | 35 | 910 | 13 | | | | |
| 591837 | 101 | 500 | 900 | 14 | | | | |
| 724007 | 214 | 50 | 900 | 15 | | | | |
| 725123 | 222 | 100 | 900 | 16 | | | | |

| MBP Book: | | | | | | |
|---|---|---|---|---|---|---|
| Bid NumOfOrders | Quantity | Price | PriceLevel | Price | Quantity | Ask NumOfOrders |
| 1 | 10 | 1000 | 1 | 1005 | 10 | 1 |
| 1 | 25 | 990 | 2 | 1010 | 20 | 1 |
| 2 | 15 | 980 | 3 | 1020 | 65 | 2 |
| 1 | 40 | 970 | 4 | 1030 | 70 | 1 |
| 1 | 10 | 960 | 5 | | | |
| 2 | 77 | 950 | 6 | | | |
| 1 | 50 | 940 | 7 | | | |
| 1 | 5 | 930 | 8 | | | |
| 2 | 16 | 920 | 9 | | | |
| 1 | 35 | 910 | 10 | | | |

When:
Customer sends cancel/replace of Limit OrderID 208 to change the order from a Limit to a Stop order with Trigger price=1005 and Limit price=1015.

Then:
Final Order Books

MBO:

| MD Order Priority | BID OrderID | Book Quantity | Book Price | Order Pos | Book Price | Book Quantity | ASK OrderID | MD Order Priority |
|---|---|---|---|---|---|---|---|---|
| 724401 | 201 | 10 | 1000 | 1 | 1005 | 10 | 205 | 724866 |
| 727884 | 591 | 25 | 990 | 2 | 1010 | 20 | 206 | 724333 |
| 723195 | 202 | 10 | 980 | 3 | 1020 | 15 | 207 | 723998 |
| 722432 | 203 | 5 | 980 | 4 | 1020 | 50 | 209 | 723444 |
| 724186 | 216 | 10 | 960 | 5 | 1030 | 70 | 215 | 723767 |
| 723985 | 199 | 75 | 950 | 6 | | | | |
| 724906 | 218 | 2 | 950 | 7 | | | | |
| 721921 | 150 | 50 | 940 | 8 | | | | |
| 724999 | 220 | 5 | 930 | 9 | | | | |
| 725133 | 221 | 11 | 920 | 10 | | | | |
| 725201 | 225 | 5 | 920 | 11 | | | | |
| 723506 | 183 | 35 | 910 | 12 | | | | |
| 591837 | 101 | 500 | 900 | 13 | | | | |
| 724007 | 214 | 50 | 900 | 14 | | | | |
| 725123 | 222 | 100 | 900 | 15 | | | | |

MBP:

| Bid NumOfOrders | Quantity | Price | PriceLevel | Price | Quantity | Ask NumOfOrders |
|---|---|---|---|---|---|---|
| 1 | 10 | 1000 | 1 | 1005 | 10 | 1 |
| 1 | 25 | 990 | 2 | 1010 | 20 | 1 |
| 2 | 15 | 980 | 3 | 1020 | 65 | 2 |
| 1 | 10 | 960 | 4 | 1030 | 70 | 1 |
| 2 | 77 | 950 | 5 | | | |
| 1 | 50 | 940 | 6 | | | |
| 1 | 5 | 930 | 7 | | | |
| 2 | 16 | 920 | 8 | | | |
| 1 | 35 | 910 | 9 | | | |
| 3 | 650 | 900 | 10 | | | |

3. Market Data FIX Message is Generated:
The consolidation system generates a consolidated message:
EoBook, EoE
35=X Tag 60 TransactTime=UTCTimestamp, Tag 5799 MatchEventIndicator=10000100, Tag 268 NoMDEntries=2
→279=2 269=0 48=<instrument>83=27 270=970 271=40 346=1 1023=4
→279=0 269=0 48=<instrument>83=28 270=900 271=650 346=3 1023=10 37705=1

→Tag 37 OrderID=208, Tag 37707 MDOrderPriority=725551, Tag 37707 MDDisplayQty=40, Tag 37708 OrderUpdateAction=2 (Del), Tag 9633 RefID=1 (references a delete block for Px 970)

Scenario 18—Limit Order Type Change to Stop Below MBP Levels (MBO Updates)
An order modified from a Limit to a Stop order below MBP Levels.
Given:
<Instrument> group is in <Open>, Last Traded Price=1000

MBO Order Book in memory is:

| MD Order Priority | BID OrderID | Book Quantity | Book Price | Order Pos | Book Price | Book Quantity | ASK OrderID | MD Order Priority |
|---|---|---|---|---|---|---|---|---|
| 724401 | 201 | 10 | 1000 | 1 | 1005 | 10 | 205 | 724866 |
| 727884 | 591 | 25 | 990 | 2 | 1010 | 20 | 206 | 724333 |
| 723195 | 202 | 10 | 980 | 3 | 1020 | 15 | 207 | 723998 |
| 722432 | 203 | 5 | 980 | 4 | 1020 | 50 | 209 | 723444 |
| 724186 | 216 | 10 | 960 | 5 | 1030 | 70 | 215 | 723767 |
| 723985 | 199 | 75 | 950 | 6 | | | | |
| 724906 | 218 | 2 | 950 | 7 | | | | |
| 721921 | 150 | 50 | 940 | 8 | | | | |
| 724999 | 220 | 5 | 930 | 9 | | | | |
| 725133 | 221 | 11 | 920 | 10 | | | | |
| 725201 | 225 | 5 | 920 | 11 | | | | |
| 723506 | 183 | 35 | 910 | 12 | | | | |
| 591837 | 101 | 500 | 900 | 13 | | | | |
| 724007 | 214 | 50 | 900 | 14 | | | | |
| 725123 | 222 | 100 | 900 | 15 | | | | |
| 723862 | 195 | 10 | 890 | 16 | | | | |
| 723761 | 193 | 1 | 880 | 17 | | | | |

| MBP Book: | | | | | | |
|---|---|---|---|---|---|---|
| Bid NumOfOrders | Quantity | Price | PriceLevel | Price | Quantity | Ask NumOfOrders |
| 1 | 10 | 1000 | 1 | 1005 | 10 | 1 |
| 1 | 25 | 990 | 2 | 1010 | 20 | 1 |
| 2 | 15 | 980 | 3 | 1020 | 65 | 2 |
| 1 | 10 | 960 | 4 | 1030 | 70 | 1 |
| 2 | 77 | 950 | 5 | | | |
| 1 | 50 | 940 | 6 | | | |
| 1 | 5 | 930 | 7 | | | |
| 2 | 16 | 920 | 8 | | | |
| 1 | 35 | 910 | 9 | | | |
| 3 | 650 | 900 | 10 | | | |

When:
Customer sends cancel/replace of Limit OrderID 195 to change the order from a Limit to a Stop order with Trigger price=1010 and Limit price=1020.
Then:
Final Order Books

| MBO: | | | | | | | | |
|---|---|---|---|---|---|---|---|---|
| MD Order Priority | BID OrderID | Book Quantity | Book Price | Order Pos | Book Price | Book Quantity | ASK OrderID | MD Order Priority |
| 724401 | 201 | 10 | 1000 | 1 | 1005 | 10 | 205 | 724866 |
| 727884 | 591 | 25 | 990 | 2 | 1010 | 20 | 206 | 724333 |
| 723195 | 202 | 10 | 980 | 3 | 1020 | 15 | 207 | 723998 |
| 722432 | 203 | 5 | 980 | 4 | 1020 | 50 | 209 | 723444 |
| 724186 | 216 | 10 | 960 | 5 | 1030 | 70 | 215 | 723767 |
| 723985 | 199 | 75 | 950 | 6 | | | | |
| 724906 | 218 | 2 | 950 | 7 | | | | |
| 721921 | 150 | 50 | 940 | 8 | | | | |
| 724999 | 220 | 5 | 930 | 9 | | | | |
| 725133 | 221 | 11 | 920 | 10 | | | | |
| 725201 | 225 | 5 | 920 | 11 | | | | |
| 723506 | 183 | 35 | 910 | 12 | | | | |
| 591837 | 101 | 500 | 900 | 13 | | | | |
| 724007 | 214 | 50 | 900 | 14 | | | | |
| 725123 | 222 | 100 | 900 | 15 | | | | |
| 723761 | 193 | 1 | 880 | 16 | | | | |

| MBP: | | | | | | |
|---|---|---|---|---|---|---|
| Bid NumOfOrders | Quantity | Price | PriceLevel | Price | Quantity | Ask NumOfOrders |
| 1 | 10 | 1000 | 1 | 1005 | 10 | 1 |
| 1 | 25 | 990 | 2 | 1010 | 20 | 1 |
| 2 | 15 | 980 | 3 | 1020 | 65 | 2 |
| 1 | 10 | 960 | 4 | 1030 | 70 | 1 |
| 2 | 77 | 950 | 5 | | | |
| 1 | 50 | 940 | 6 | | | |
| 1 | 5 | 930 | 7 | | | |
| 2 | 16 | 920 | 8 | | | |
| 1 | 35 | 910 | 9 | | | |
| 3 | 650 | 900 | 10 | | | |

Market Data FIX Message is generated:
MBO Message: EoBook, EoE
35=X Tag 60 TransactTime=UTCTimestamp, Tag 5799 MatchEventIndicator=10000100, Tag 268 NoMDEntries=1
→Tag 279 MDUpdateAction=2 (Delete), Tag 37 OrderID=195, Tag 37707 MDOrderPriority=725702, Tag 270 MDEntryPx=890, Tag 37706 MDDisplayQty=10, Tag 48 SecurityID=<instrument>, Tag 269 MDEntryType=0 (Bid)
MBP Message:
Not sent Referring back to FIG. 1A, the trading network environment shown in FIG. 1A includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1A, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1A also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1A may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1A is merely an example and that the components shown in FIG. 1A may include other components not shown and be connected by numerous alternative topologies.

Referring back to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for generating messages in response to electronic data transaction request messages processed in a data transaction processing system, the computer implemented method including:

receiving, by a processor, an electronic data transaction request message;

modifying, by the processor, at least one of first and second data objects stored in a memory based on the electronic data transaction request message, wherein the first data object includes data about a plurality of unique orders, each unique order associated with a value and an order quantity, and wherein the second data object includes data about a plurality of unique values, each unique value associated with an aggregate quantity and a number of orders aggregated;

upon determining, by the processor, that the first data object has been modified and the second data object has not been modified, generating data indicating the modification to the first data object and generating a first message including the data indicating the modification to the first data object; and upon determining, by the processor, that a unique order of the first data object and the second data object have been modified, generating data indicating the modification to the unique order of the first data object, generating data indicating the modification to the second data object, and generating a consolidated message including the data indicating the modifications to the unique order of the first data object and the second data object.

2. The computer implemented method of claim 1, wherein values associated with at least two of the unique orders of the first data object correspond to one of the unique values of the second data object.

3. The computer implemented method of claim 1, wherein each of the unique values of the second data object values corresponds to at least one of the unique orders of the first data object.

4. The computer implemented method of claim 1, wherein the electronic data transaction request message includes a request to perform a transaction related to a product represented by one of the data objects.

5. The computer implemented method of claim 1, which includes, upon determining, by the processor, that multiple unique orders of the first data object corresponding to the same unique value of the second data object have been modified and the second data object has been modified, generating data indicating the modifications to the multiple unique orders of the first data object, generating a first message including the data indicating the modifications to the multiple unique orders of the first data object, generating data indicating the modification to the second data object, and generating a second message including the data indicating the modification to the second data object.

6. The computer implemented method of claim 1, which includes determining that one unique order of the first data object has been modified by determining that one of: (i) a unique order has been added to the first data object, (ii) a unique order has been removed from the first data object or (iii) a quantity, a priority, or a value associated with the unique order has been modified.

7. The computer implemented method of claim 1, which includes determining that the second data object has been modified by determining that one of: (i) a unique value has been added to the second data object, (ii) a unique value has been removed from the second data object, or (iii) an aggregate quantity or a number of orders associated with a unique value of the second data object has been modified.

8. The computer implemented method of claim 1, wherein the first and consolidated messages are published to data recipient computing system via different data feeds.

9. The computer implemented method of claim 1, wherein the data objects comprise queues, and wherein the method includes, for each data object, storing data related to transactions of a first type in a first queue, and storing data related to transactions of a second type in a second queue.

10. The computer implemented method of claim 9, wherein transactions of the first type are one of purchasing or relinquishing a financial instrument, and transactions of the second type are the other of purchasing or relinquishing the financial instrument.

11. The computer implemented method of claim 1, wherein the data transaction processing system is an exchange computing system, and wherein the data objects represent order books for a financial instrument traded in the exchange computing system.

12. The computer implemented method of claim 11, wherein the first data object includes data about all unique orders pending and related to the financial instrument.

13. The computer implemented method of claim 12, wherein the second data object includes data about a predetermined number of unique values corresponding to the orders.

14. The computer implemented method of claim 12, wherein at least one unique value corresponding to an order in the first data object is not included in the second data object.

15. The computer implemented method of claim 1, wherein the first data object is a per order ("PO") data object and the second data object is an aggregated by value ("ABV") data object.

16. The computer implemented method of claim 1, wherein the electronic data transaction request messages are submitted by client computers in communication with the data transaction processing system.

17. A computer system operative to generate messages in response to processing of electronic data transaction request messages in a data transaction processing system, the computer system including a computer processor coupled with a memory, the computer processor specifically configured to:

receive, by the processor, an electronic data transaction request message;

modify, by the processor, at least one of first and second data objects stored in the memory based on the electronic data transaction request message, the first data object including data about a plurality of unique orders, each unique order associated with a value and an order quantity, and the second data object including data about a plurality of unique values, each unique value associated with an aggregate quantity and a number of orders aggregated;

upon determining, by the processor, that the first data object has been modified and the second data object has not been modified, generate data indicating the modification to the first data object and generate a first message including the data indicating the modification to the first data object; and upon determining, by the processor, that a unique order of the first data object and the second data object have been modified, generate data indicating the modification to the unique order of the first data object, generate data indicating the modification to the second data object, and generate a consolidated message including the data indicating the modifications to the unique order of the first data object and the second data object.

18. The computer system of claim 17, wherein the computer processor is further specifically configured to, upon determining that multiple unique orders of the first data object corresponding to the same unique value of the second data object have been modified and the second data object has been modified, generate data indicating the modifications to the multiple unique orders of the first data object, generate a first message including the data indicating the modifications to the multiple unique orders of the first data object, generate data indicating the modification to the second data object, and generate a second message including the data indicating the modification to the second data object.

19. A computer system which processes electronic data transaction request messages for a data object in a data transaction processing system, the system comprising:

an electronic data transaction request message receiver that receives an electronic data transaction request message to perform a transaction on a data object;

a data object processor coupled with the electronic data transaction request message receiver for modifying at least one of first and second data objects stored in a memory, wherein the first data object includes data about a plurality of unique orders, each unique order associated with a value and an order quantity, and wherein the second data object includes data about a plurality of unique values, each unique value associated with an aggregate quantity and a number of orders aggregated; and a data generator coupled with the data object processor which, upon determining, by the data object processor, that the first data object has been modified and the second data object has not been modified, generates data indicating the modification to the first data object; and upon determining, by the data object processor, that a unique order of the first data object and the second data object have been modified, generates data indicating the modification to the unique order of the first data object and generates data indicating the modification to the second data object; and a message generator coupled with the data generator which, upon determining, by the data object processor, that the first data object has been modified and the second data object has not been modified, generates a first message including the data indicating the modification to the first data object; and upon determining, by the data object processor, that a unique order of the first data object and the second data object have been modified, generates a consolidated message including the data indicating the modifications to the unique order of the first data object and the second data object.

20. The computer system of claim 19, wherein upon determining, by the data object processor, that multiple unique orders of the first data object corresponding to the same unique value of the second data object have been modified and the second data object has been modified, the data generator generates data indicating the modifications to the multiple unique orders of the first data object and data indicating the modification to the second data object, and the message generator generates a first message including the data indicating the modifications to the multiple unique orders of the first data object and a second message including the data indicating the modification to the second data object.

* * * * *